United States Patent
Hiyokawa et al.

(10) Patent No.: US 6,333,702 B1
(45) Date of Patent: *Dec. 25, 2001

(54) NAVIGATION DEVICE

(75) Inventors: Toyoji Hiyokawa; Mitsuhiro Nimura; Akimasa Nanba, all of Anjo (JP)

(73) Assignee: Aisin AW CO., LTD., Anjo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/756,936

(22) Filed: Dec. 2, 1996

(30) Foreign Application Priority Data

Nov. 30, 1995 (JP) .................................................. 7-313379
Jan. 31, 1996 (JP) .................................................. 8-039004
Jan. 31, 1996 (JP) .................................................. 8-039005

(51) Int. Cl.[7] .................................................. G08G 1/123
(52) U.S. Cl. .................. 340/995; 340/988; 340/990; 701/211; 701/210; 701/212
(58) Field of Search .................. 340/995, 988, 340/990; 701/208, 209, 210, 201, 211, 217, 212; 73/178 R; 345/146

(56) References Cited

U.S. PATENT DOCUMENTS

| | | | |
|---|---|---|---|
| 4,937,752 | * 6/1990 | Nanba et al. ................. | 701/208 |
| 5,109,344 | * 4/1992 | Kakihara et al. .............. | 701/209 |
| 5,119,301 | * 6/1992 | Shimizu et al. ............... | 701/217 |
| 5,243,528 | * 9/1993 | Lefebvre ....................... | 701/211 |
| 5,323,152 | * 6/1994 | Morita .......................... | 340/988 |
| 5,359,529 | * 10/1994 | Snider .......................... | 701/210 |
| 5,452,212 | * 9/1995 | Yoloyama et al. ............ | 701/211 |
| 5,519,392 | * 5/1996 | Oder et al. .................... | 340/995 |
| 5,550,538 | * 8/1996 | Fujii et al. .................... | 340/995 |
| 5,559,511 | * 9/1996 | Ito et al. ....................... | 340/995 |
| 5,559,707 | * 9/1996 | DeLorme et al. ............. | 701/200 |
| 5,635,953 | * 6/1997 | Hayami et al. ............... | 345/146 |
| 5,652,706 | * 7/1997 | Morimoto et al. ............ | 701/210 |
| 5,682,525 | * 10/1997 | Bouve et al. .................. | 340/995 |

* cited by examiner

Primary Examiner—Benjamin C. Lee
(74) Attorney, Agent, or Firm—Oliff & Berridge PLC

(57) ABSTRACT

Even when the present position does not exist on a guide road after deviation from an established guide route, a guide road is identified and a more advantageous route is identified. Furthermore, only a minimum amount of required data are displayed on the map picture. The searching again is executed by taking the direction of progress of the car into consideration. Street names of the roads are displayed on the guide map, enabling a guide route to be easily recognized. A particular area is specified by a postal code number or by a telephone number, and the streets or the facilities in the specified area are displayed. This makes it easier to search the destination.

19 Claims, 64 Drawing Sheets

DATA STORAGE MEDIUM 37

- DISK MANAGEMENT DATA
- PROGRAM
- MAP DATA FILE
- INSC. DATA FILE
- NODE DATA FILE
- ROAD DATA FILE
- PHOTO DATA FILE
- DES. DATA FILE
- GUIDE POINT DATA FILE
- DETAILED DES. DATA FILE
- DES. READ DATA FILE
- HOUSE SHAPE DATA FILE
- OTHER DATA FILES

| | |
|---|---|
| PROGRAM REGION | PL |
| PRESENT POS. DATA | MP |
| ABSOLUTE DIR. DATA | ZD |
| RELATIVE DIR. DATA | Dθ |
| TRAVELLED DIS. DATA | ML |
| PRESENT POS. DATA | PI |
| VICS DATA | VD |
| ATIS DATA | AD |
| REGISTERED DES. DATA | TP |
| START POINT OF ROUTE DATA | SP |
| END POINT OF ROUTE DATA | ED |
| GUIDE ROUTE DATA | MW |
| MODE-SETTING DATA | MD |
| DES. DIR. DATA | MH |
| INSC. POINT DATA | CP |
| SEARCH-AGAIN FLAG | SF |
| ROUTE-SETTING FLAG | KF |
| EXTERNAL DATA | GD |

GUIDE ROAD DATA 50

| | |
|---|---|
| n | NO. (n) OF ROADS RD |
| 1 | ROAD NO. RDN |
| | LENGTH RDL |
| | ROAD ATTRIBUTE DATA RDA |
| | SHAPE DATA ADDRESS FDA, SIZE FDS |
| | GUIDE DATA ADDRESS GDA, SIZE GDS |
| | OBJECT OF GUIDE FLAG |
| ⋮ | ⋮ |
| n | ROAD NO. RDN |
| | LENGTH RDL |
| | ROAD ATTRIBUTE DATA RDA |
| | SHAPE DATA ADDRESS FDA, SIZE FDS |
| | GUIDE DATA ADDRESS GDA, SIZE GDS |
| | OBJECT OF GUIDE FLAG |

FIG.34

SHAPE DATA 55

| | NO. OF NODES NC (m) |
|---|---|
| 1 | EAST LONGITUDE EO |
| | NORTH LATITUDE NO |
| 2 | EAST LONGITUDE EO |
| | NORTH LATITUDE NO |
| | . . . . . . . . |
| 3 | EAST LONGITUDE EO |
| | NORTH LATITUDE NO |

FIG.35

GUIDE DATA 60

| INSC. NAME CN |
|---|
| CAUTION POINT DATA AD |
| ROAD NAME DATA RND |
| ROAD NAME VOICE DATA ADDRESS ROA, SIZE ROS |
| DES. DATA ADDRESS DOA, SIZE DOS |

FIG.36

DES. DATA 65

| k | NO. OF DES. ES(k) |
|---|---|
| 1 | DES. ROAD NO. ERB |
|   | DES. ROAD NAME ERN |
|   | DES. ROAD NAME VOICE DATA ADDRESS EDA, SIZE EDS |
|   | DES. DIRECTION DATA ESA |
|   | RUNNING GUIDE DATA EID |
|   | . . . . . . . . |
| k | DES. ROAD NO. ERB |
|   | DES. ROAD NAME ERN |
|   | DES. ROAD NAME VOICE DATA ADDRESS EDA, SIZE EDS |
|   | DES. DIRECTION DATA ESA |
|   | RUNNING GUIDE DATA EID |

FIG.37

ROAD ATTRIBUTE DATA 70

| ELEVATED-UNDERPASS DATA | ELEVATED ROAD | | |
|---|---|---|---|
| | SIDE OF ELEVATED ROAD | | |
| | UNDERPASS | ◯ | ～71 |
| | SIDE OF UNDERPASS | | |
| NO. OF LANES | 3 OR MORE LANES | | |
| | 2 LANES | ◯ | ～72 |
| | 1 LANE | | |
| | NO CENTER LINE | | |

FIG.38

CAUTION POINT DATA

| RAILWAY CROSSING | ◯ | |
|---|---|---|
| INLET OF TUNNEL | | ～75 |
| OUTLET OF TUNNEL | | |
| POINT WHERE ROAD WIDTH DECREASES | | |
| NONE | | |

FIG.39

RUNNING GUIDE DATA

| GET IN THE RIGHT | | ～80 |
|---|---|---|
| GET IN THE LEFT | | |
| GET IN THE CENTER | ◯ | |
| NONE | | |

FIG.40

POSTAL CODE NO. SELECTION DATA 150

| | NO. OF POSTAL CODE NUMBERS PC (n) | |
|---|---|---|
| 1 | POSTAL CODE NO. PCN | |
| | STREET ADDRESS LA, SIZE LD | |
| | FACILITY GENRE LIST ADDRESS NA, SIZE ND | |
| | EAST LONGITUDE COORDINATE PEO OF A REPRESENTATIVE POINT | |
| | NORTH LATITUDE COORDINATE PNO OF A REPRESENTATIVE POINT | |
| | AREA SHAPE DATA ADDRESS EA, SIZE ED | |
| ⋮ | ⋮ | |
| n | POSTAL CODE NO. PCN | |
| | STREET ADDRESS LA, SIZE LD | |
| | FACILITY GENRE LIST ADDRESS NA, SIZE ND | |
| | EAST LONGITUDE COORDINATE PEO OF A REPRESENTATIVE POINT | |
| | NORTH LATITUDE COORDINATE PNO OF A REPRESENTATIVE POINT | |
| | AREA SHAPE DATA ADDRESS EA, SIZE ED | |

FIG.55

| | STREET LIST DATA 155 |
|---|---|
| | NO. OF STREETS SS (m) |
| 1 | STREET NAME SSN |
| | EAST LONGITUDE COORDINATE SEO OF A REPRESENTATIVE POINT |
| | NORTH LATITUDE COORDINATE SNO OF A REPRESENTATIVE POINT |
| | SHAPE DATA ADDRESS SEA, SIZE SED |
| | ⋮ |
| m | STREET NAME SSN |
| | EAST LONGITUDE COORDINATE SEO OF A REPRESENTATIVE POINT |
| | NORTH LATITUDE COORDINATE SNO OF A REPRESENTATIVE POINT |
| | SHAPE DATA ADDRESS SEA, SIZE SED |

FIG.56

FACILITY GENRE LIST DATA  160

| | |
|---|---|
| | NO. OF FACILITY GENRES NC (k) |
| 1 | FACILITY GENRE NAME NM |
| | FACILITY LIST ADDRESS NLA, SIZE NLD |
| 2 | FACILITY GENRE NAME NM |
| | FACILITY LIST ADDRESS NLA, SIZE NLD |
| | ⋮ |
| k | FACILITY GENRE NAME NM |
| | FACILITY LIST ADDRESS NLA, SIZE NLD |

FIG.57

STREET SHAPE DATA                              165

| | |
|---|---|
| | NO. OF NODES ES (t) |
| 1 | EAST LONGITUDE COORDINATE EEO |
| | NORTH LATITUDE COORDINATE ENO |
| | ADDRESS EB |
| | |
| t | EAST LONGITUDE COORDINATE EEO |
| | NORTH LATITUDE COORDINATE ENO |
| | ADDRESS EB |

FIG.58

FACILITY LIST DATA 170

| | |
|---|---|
| | NO. OF FACILITIES IS (u) |
| 1 | FACILITY NAME IM |
| | EAST LONGITUDE COORDINATE IEO |
| | NORTH LATITUDE COORDINATE INO |
| | ADDRESS IB |
| | STREET NAME SSN |
| ⋮ | ⋮ |
| u | FACILITY NAME IM |
| | EAST LONGITUDE COORDINATE IEO |
| | NORTH LATITUDE COORDINATE INO |
| | ADDRESS IB |
| | STREET NAME SSN |

FIG.59

AREA SHAPE DATA 175

| | NO. OF NODES ANC (v) |
|---|---|
| 1 | EAST LONGITUDE COORDINATES AEO |
| | NORTH LATITUDE COORDINATES ANO |
| 2 | EAST LONGITUDE COORDINATES AEO |
| | NORTH LATITUDE COORDINATES ANO |
| | ⋮ |
| v | EAST LONGITUDE COORDINATES AEO |
| | NORTH LATITUDE COORDINATES ANO |

FIG.60

NAVIGATION DEVICE

BACKGROUND OF THE INVENTION

1. Field of Invention

The invention relates to a navigation device. More specifically, the invention relates to a device which resets a guide route when a car (present position) has deviated from the guide route. The invention further relates to a device which is provided detailed road data by the operator. The invention further relates to a navigation device which makes it possible to easily set a destination.

2. Description of Related Art

In a conventional navigational device, a destination is set by a user and, then, a route to the destination is registered by manual operation, or the shortest route, the most suitable route or a recommended route to the destination is automatically found. The route to the destination is displayed as a guide route using a conspicuous line, such as thick line on a map picture, and the guidance is offered so that the car may move along the guide route. When the present position deviates from the guide route that is set at the time of departure, a new guide route is searched again starting from the present position.

Even when the car deviates from the guide route, however, the new guide route is not searched in case the present position is not included in the road data in the navigation device. That is, the guide route that was set at the time of departure is kept displayed or the guide route that was set at the time of departure is erased. Therefore, although there may exist another most suitable road to the destination in addition to the guide route that was set at the time of departure, the new most suitable road is not displayed as a new guide route. Besides, when the initially set guide route is erased, the driver quite loses his way to the destination. Moreover, when the start point of the newly searched route is located in a direction opposite to the direction of progress of the car, the driver must return to the start point.

The object of the invention, therefore, is to make it possible to search a guide route to a destination from a point on a guide road near the present position even when the present position does not exist on the guide road.

The navigation device is further equipped with a data storage medium (CD-ROM) storing road data covering over a predetermined range. Based upon the road data, a road map is displayed on the screen of the navigation device. This enables a moving body (car, other vehicle, such as a truck or bus, or any conveyance equipped with the invention), which will be called a car from here forward, to move favorably from the present position to the destination. The operator is furnished with various kinds of information, such as the name of a next intersection where the car should turn, the distance to the intersection, the direction of turn, etc.

The roads include those roads having street names in addition to national roads, such as Constitution Avenue, Washington Street, and Dachauer Street. According to the above-described navigation device, the operator is not informed of the name of a street into which he has entered when turning at the intersection.

When the name of the street has been widely known, therefore, it would be convenient if the operator is informed of the name of the street, like a signpost along the road indicating the name of the road. In such a case, the operator (driver) finds it better to learn the name of the street onto which he is going to proceed than to learn the name of the intersection where he should turn. In European countries and in the United States, in particular, every street has a name. Depending upon the guidance of the street names, therefore, it is possible to easily determine whether the direction in which the car is running is in agreement with the direction guided by the navigation device.

The object of the invention is as described below. That is, the street name of every road can be displayed on the picture, and the guidance route is displayed using the street name.

Using the navigation device, furthermore, the destination is set as described below. For instance, a mouse cursor is indicated on a map displayed on the screen of the navigation device. The cursor can be moved by the operator. The cursor is moved to any position on the map, and any point on the picture is specified as a destination. Alternatively, any building or facility is selected based upon the index data of telephone numbers and addresses in a list of various facilities stored in the CD-ROM, and the building or the facility is set as a destination.

When the destination is to be set using the conventional navigation device, as described above, the operator must be aware of the detailed address or the telephone number of the destination. When the operator is aware of neither the telephone number nor the detailed address of the destination, then, he must have the detailed map displayed to find the destination on the map. In this case, the map displayed on the navigation device may be scrolled to search for the destination.

The object of the invention is as described below. That is, the conditions for searching a desired destination are stepwisely changed, enabling the destination to be easily identified.

SUMMARY OF THE INVENTION

According to a first embodiment, when the present position is deviated from the guide route that has been set, and when a new route is to be searched again, a guide route to a destination from a point on a guide road close to the present position is searched even in the case where the present position does not exist on the guide road. It is then determined which route is most advantageous between the newly searched route and the guide route that had been previously, and the route that is most advantageous is displayed as a new guide route. Thus, even when the present position does not exist on the guide road at the time when the route is searched again, the guide route is displayed to arrive at the destination advantageously enabling the driver to proceed to the destination without losing his/her way. The guide route to the destination may be the entire route from a point on the guide road near the present position to the end point of the route (destination) or may be the route returning from a point on the guide road near the present position back to the guide route. In the invention, furthermore, the search area is set by taking the direction of progress of the car into consideration, the guide road near the present position is searched within the search area, and the guide route is searched again without greatly changing the direction of progress.

According to a second embodiment, the road data, the data of street names of the road data, and the position data of the road data are related to each other, data related to the road data are stored, a road corresponding to the present position of the car that is detected is determined from the position data of the road data, the data of street name of the determined road is read from the road data storage means and is output based upon the present position of the car.

Thus, the driver is informed of the name of the street and is able to easily confirm the guide route.

According to a third embodiment, the positions, shapes and names of the streets in the area are stored for the area of the whole or part of the identification number corresponding to the area. The whole postal code number or some significant digits thereof are input, or the whole telephone number or some significant digits thereof are input. The area is specified by the number that is input. Then, the street names in the area are read out and are output. When a particular street is selected from the streets that are output, a map including the selected street is displayed on the display. The area is determined based upon the input of a number, such as a postal code number. When the area is determined, streets in the area are listed making it easy to identify the destination.

BRIEF DESCRIPTION OF THE DRAWINGS

The invention will be described with reference to the drawings, in which:

FIG. 2 is a representation of the contents stored in a data storage medium;

FIG. 3 is a diagram illustrating some of the data stored in a RAM;

FIG. 34 illustrates the structure of road data in the data storage medium;

FIG. 35 illustrates the contents of the shape data;

FIG. 36 illustrates the structure of guide data;

FIG. 37 illustrates the structure of the destination data;

FIG. 38 illustrates the contents of the road attribute data;

FIG. 39 illustrates the contents of the caution point data;

FIG. 40 illustrates the contents of running guide data;

FIG. 55 illustrates the data selected by a postal code number read out from the data storage medium;

FIG. 56 illustrates the contents of street list data;

FIG. 57 illustrates the contents of facility genre list data;

FIG. 58 illustrates the contents of street shape data;

FIG. 59 illustrates the contents of facility list data;

FIG. 60 illustrates the contents of area shape data;

DETAILED DESCRIPTION OF PREFERRED EMBODIMENTS

1. Summary of the Embodiments

Figure 7:
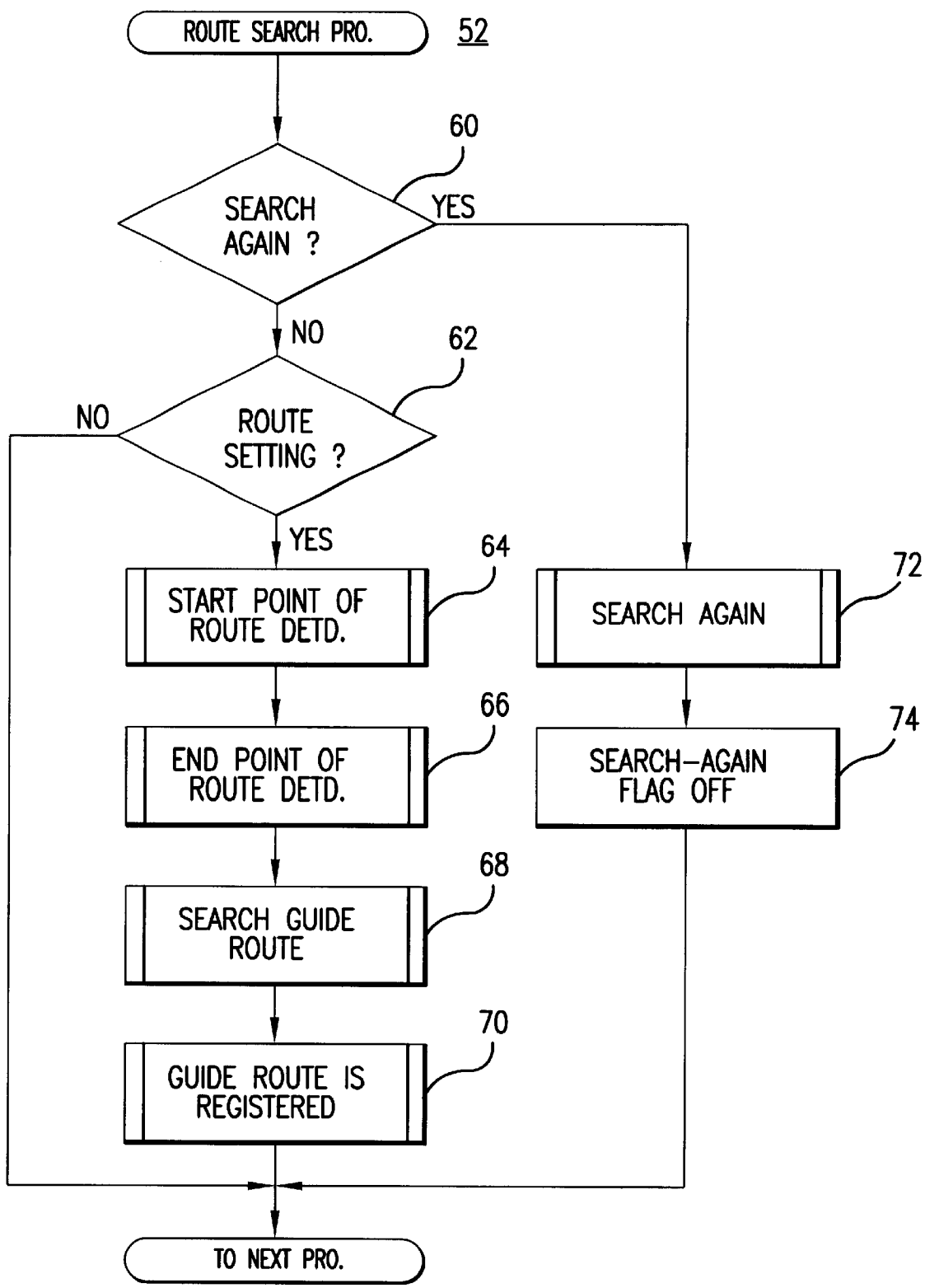
FIG. 7 is a flowchart of the route search processing.
Figure 8:
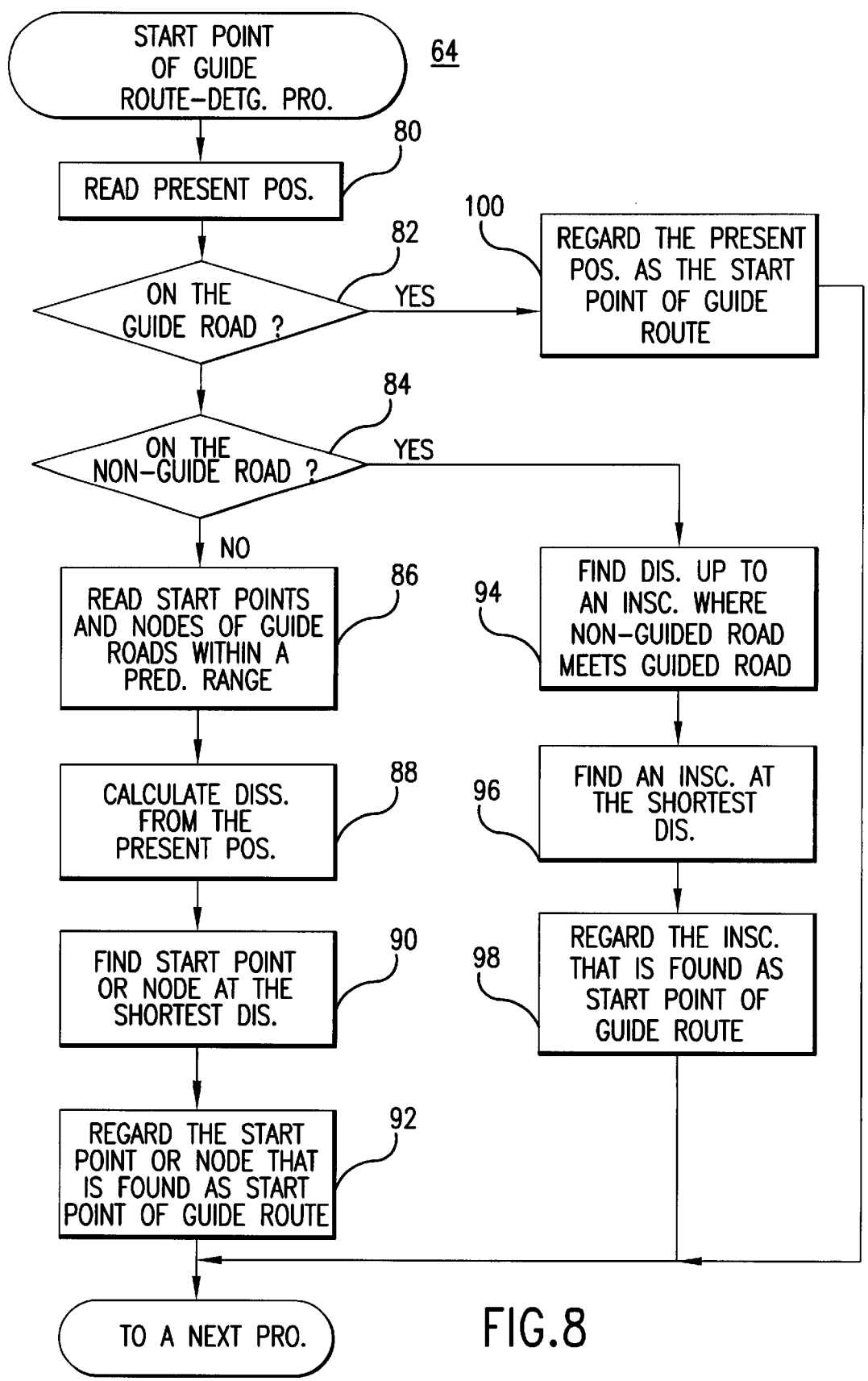
FIG. 8 is a flowchart of the processing for determining a start point of a guide route.
Figure 13:
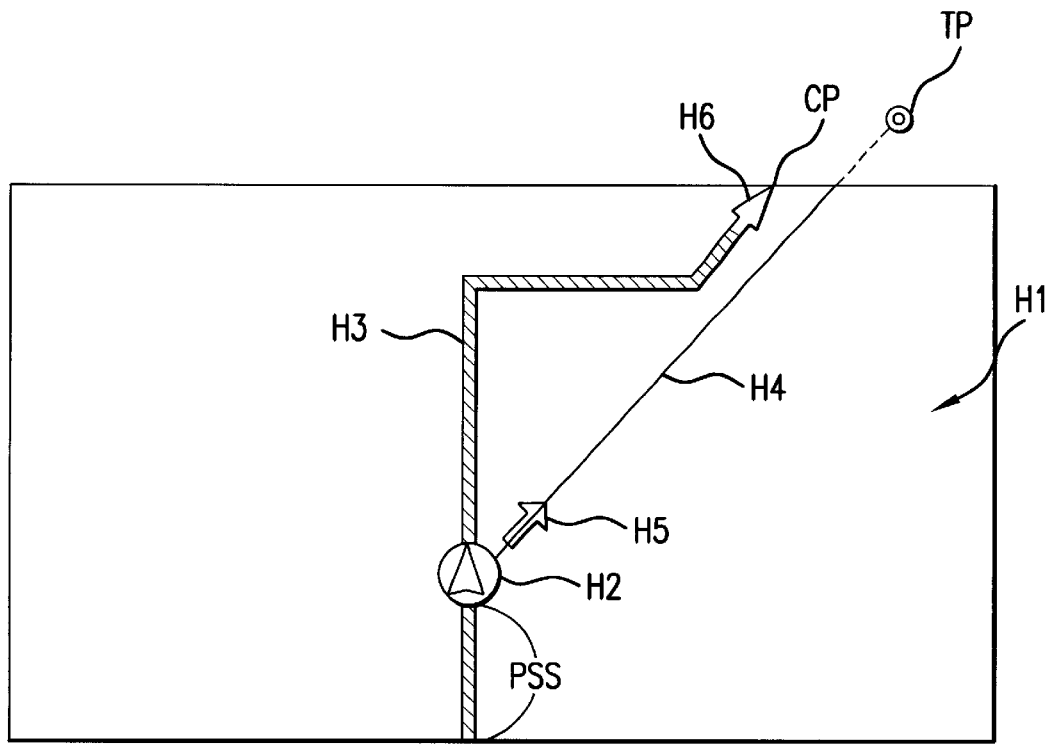
FIG. 13 illustrates the display of a map picture, present position, guide route, and direction marks.
Figure 14:
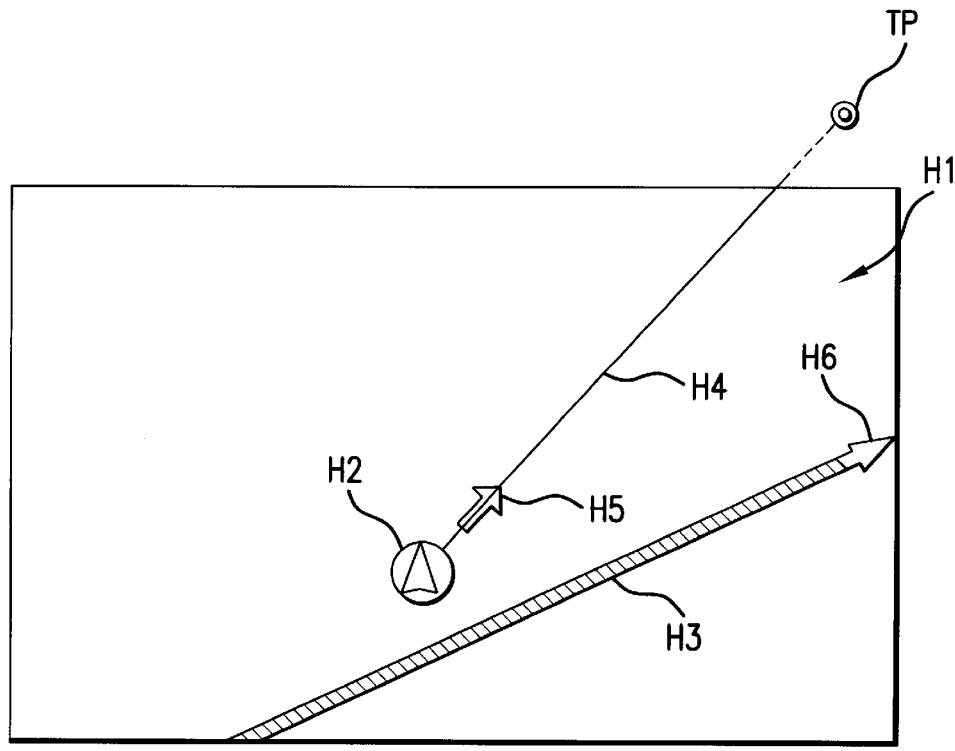
FIG. 14 illustrates the display when the present position has deviated from a guide route.
Figure 15:
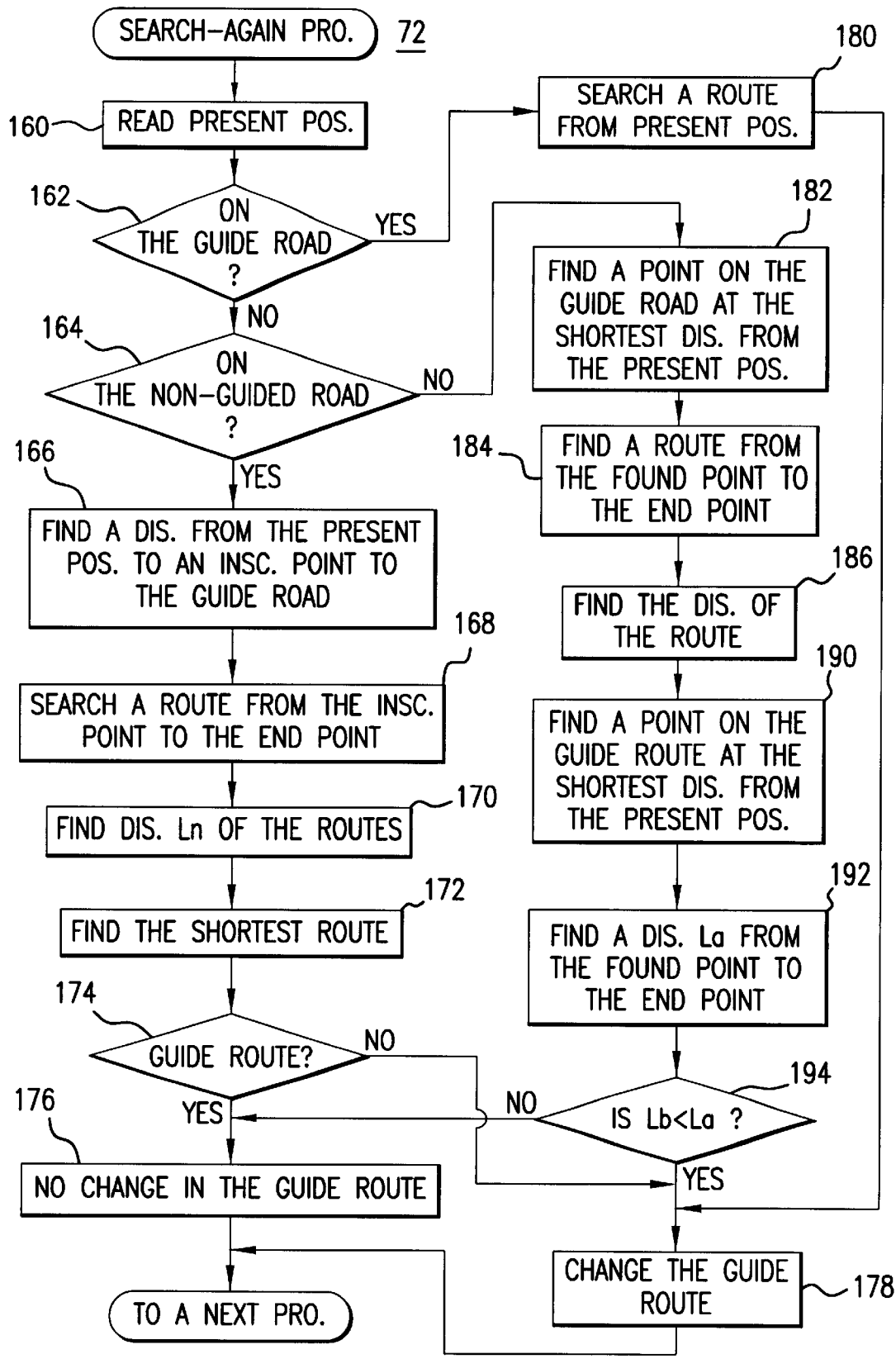
FIG. 15 is a flowchart of the processing for searching a route again.
Figure 21:
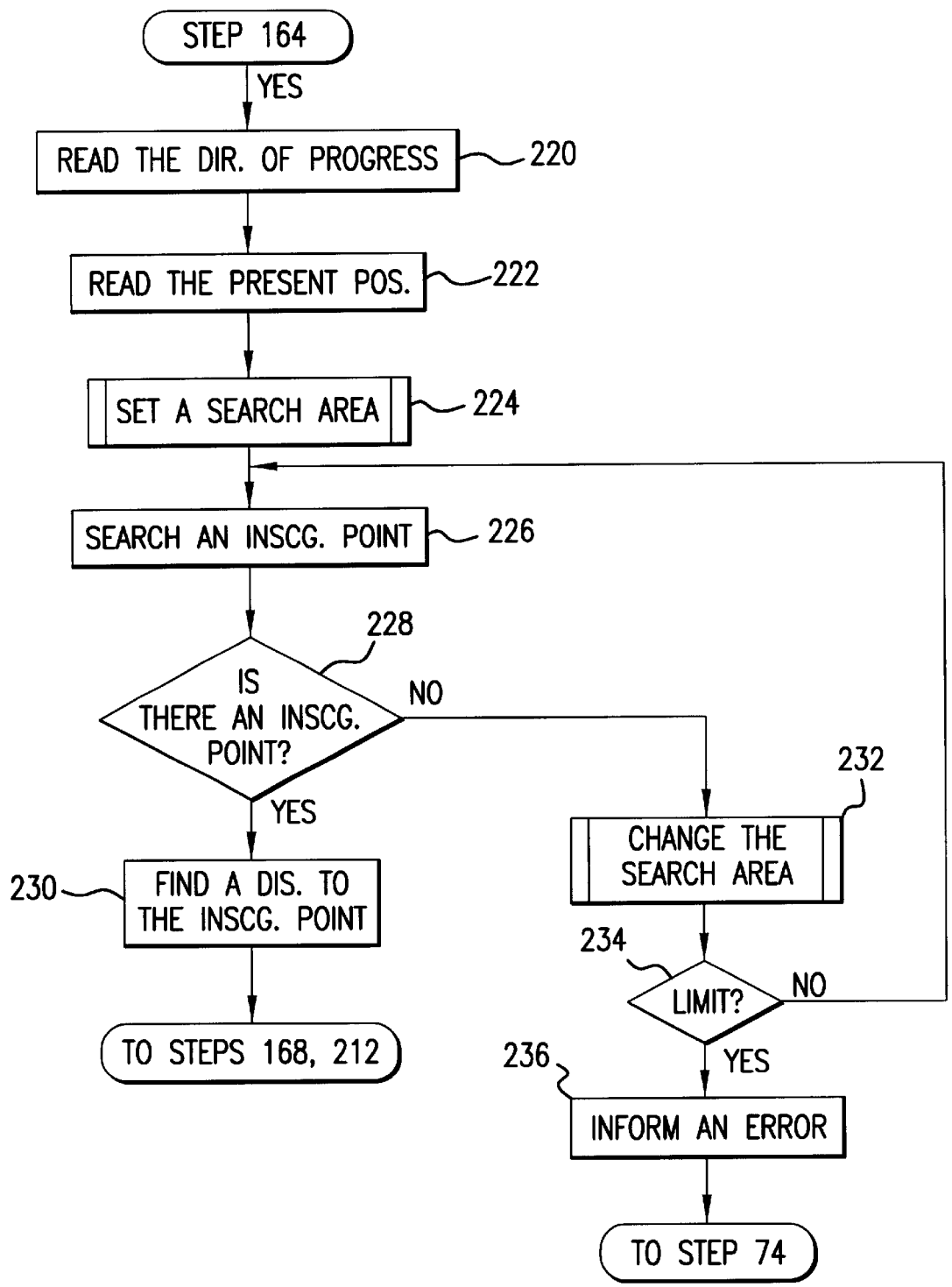
FIG. 21 is a flowchart of the processing for searching a route again by taking into consideration the direction of progress when the present position is on a non-guided road.
Figure 22:
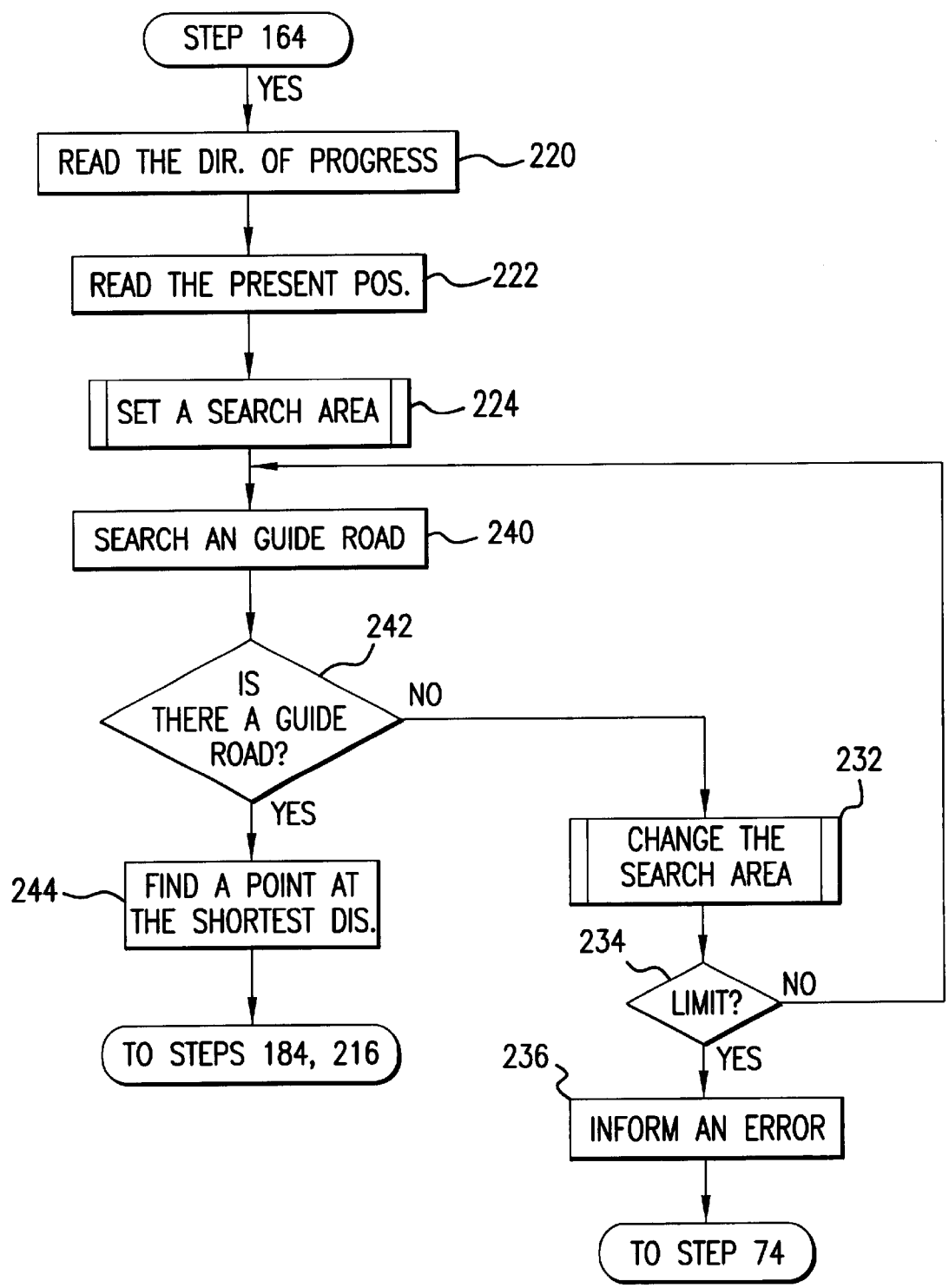
FIG. 22 is a flowchart of the processing for searching a route again by taking into consideration the direction of progress of when the present position is on a non-guided road.

In searching the route again, it is determined whether the present position exists on a guided road (steps 82 and 84 in FIG. 8, steps 162 and 164 in FIG. 15). When it is determined that the present position exists on the guided road, a route is set from the present position to an end point, or destination, of the guide route (step 68 in FIG. 7, step 100 in FIG. 8, step 180 in FIG. 15). When it is determined that the present position does not exist on the guide road, a route is searched again from a point on the guide road near the present position to the end point of guide route, and an advantageous road is set as a new guide route (step 68 in FIG. 7, steps 86 to 98 in FIG. 8, steps 166 to 172 and steps 182 to 186 in FIG. 15). On the map, pictures H1 on a display 33 are shown only a present position mark H2, a guide route H3, and the registered destination TP or the direction marks H4 to H6 indicating the direction of the registered destination (step 140 in FIG. 12, FIGS. 13 and 14). Moreover, a search area is set by taking the direction of progress of the car into consideration, and a point is identified on the guide road in the search area (FIGS. 21 and 22).

Figure 46:
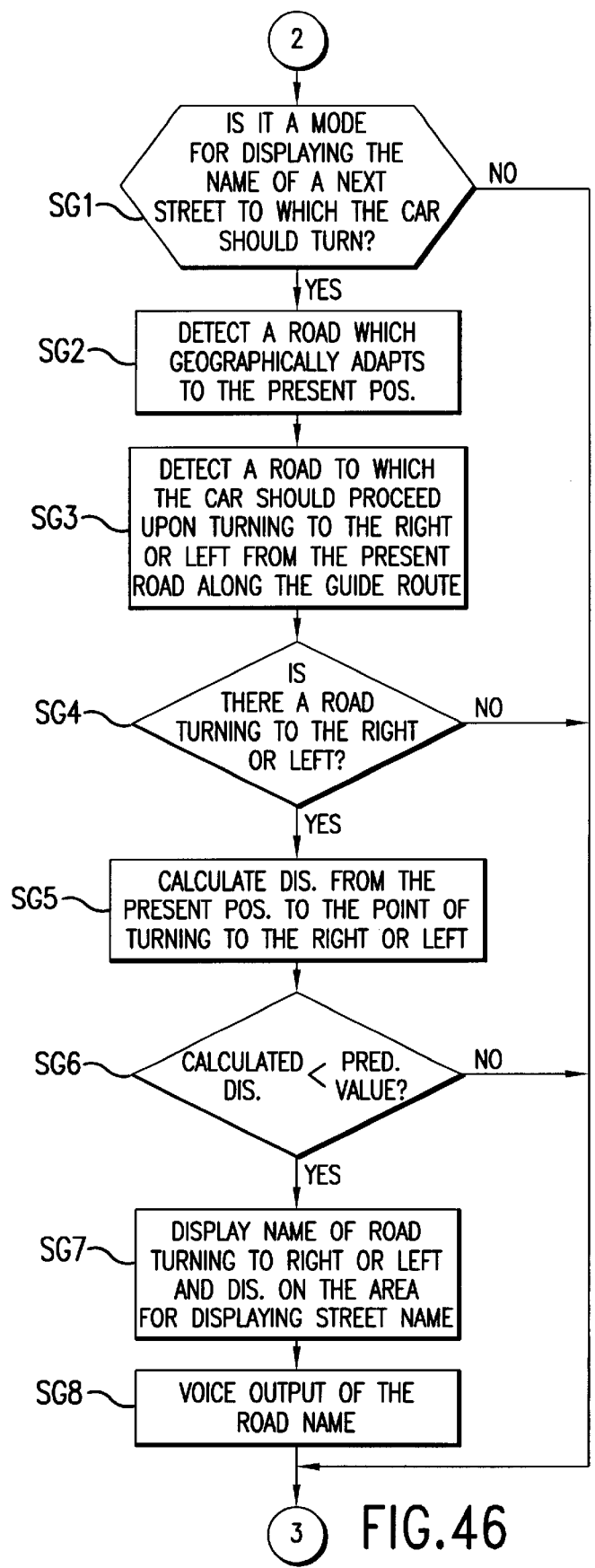
FIGS. 46 and 47 are flowcharts of other modes for displaying the name of a road onto which the car will turn next.

A road on which the present position of the car exists is detected (step SG2 of FIG. 46). A road to which the car should turn next is detected in the guide route (step SG3). It is determined whether there is a road to which the car should turn (step SG4). When there is such a road, a distance to the road is calculated (step SG5). It is determined whether the distance from the present position of the car to the road to which the car should turn is smaller than a predetermined value (step SG6). When the distance is smaller than the predetermined value, the street name of the road to which the car should turn is displayed on the screen (step SG7). Moreover, the name of the street is also announced by voice (step SG8).

Figure 64:
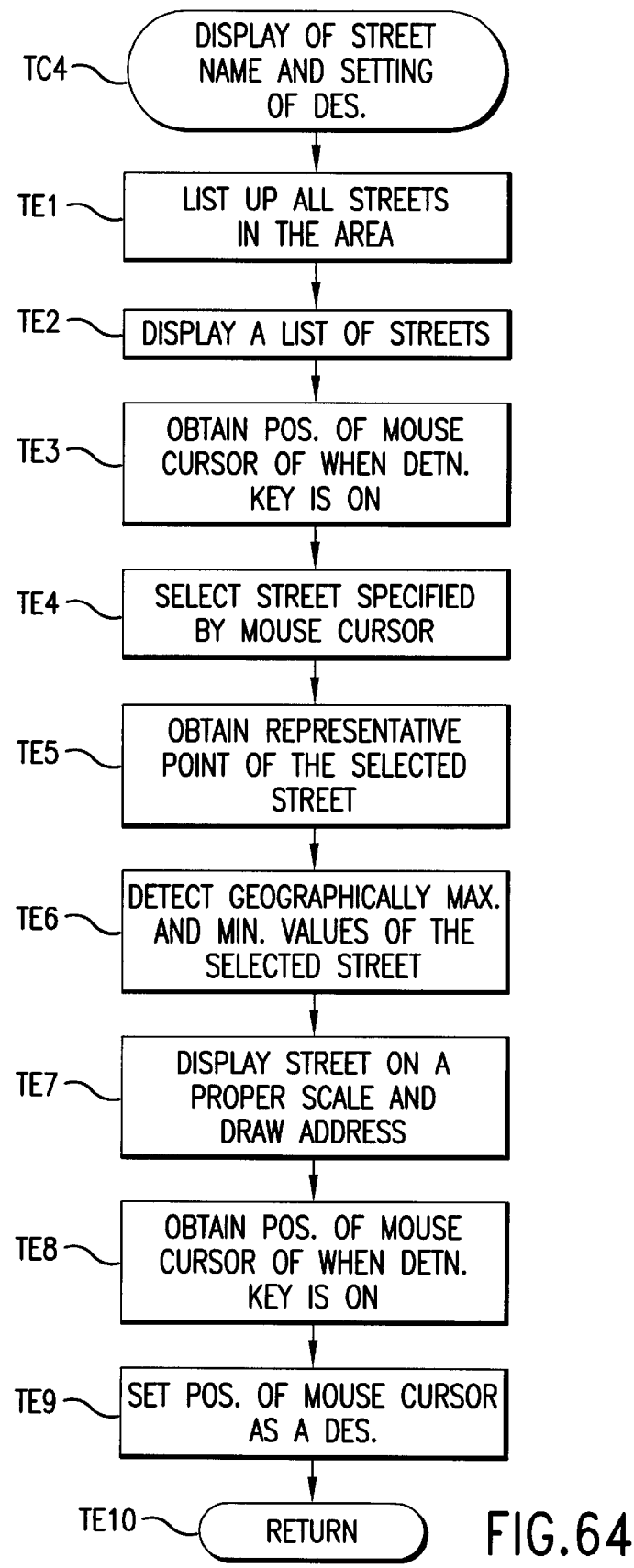
FIG. 64 is a flowchart of the processing for displaying street names and for setting a destination.

The names of streets in an area corresponding to a postal code number PCN that is input (step TB1 of FIG. 61) are read out from the data storage medium 37 and are output (steps TE1, TE2 of FIG. 64). The shape of a street selected from the street names is displayed (steps TE4 to TE7). A point specified by a mouse cursor becomes a destination (steps TE8, TE9). The names of facilities in the area corresponding to the postal code number PCN that is input (step TB1) and to a facility genre that is input (step TF4 of FIG. 65) are read from the data storage medium 37 and are output (steps TF5, TF6). The position of a facility selected from the facility names is displayed (steps TF7, TF9). A point specified by the mouse cursor becomes destination (step TF8).

2. Overall Circuitry

Figure 1:
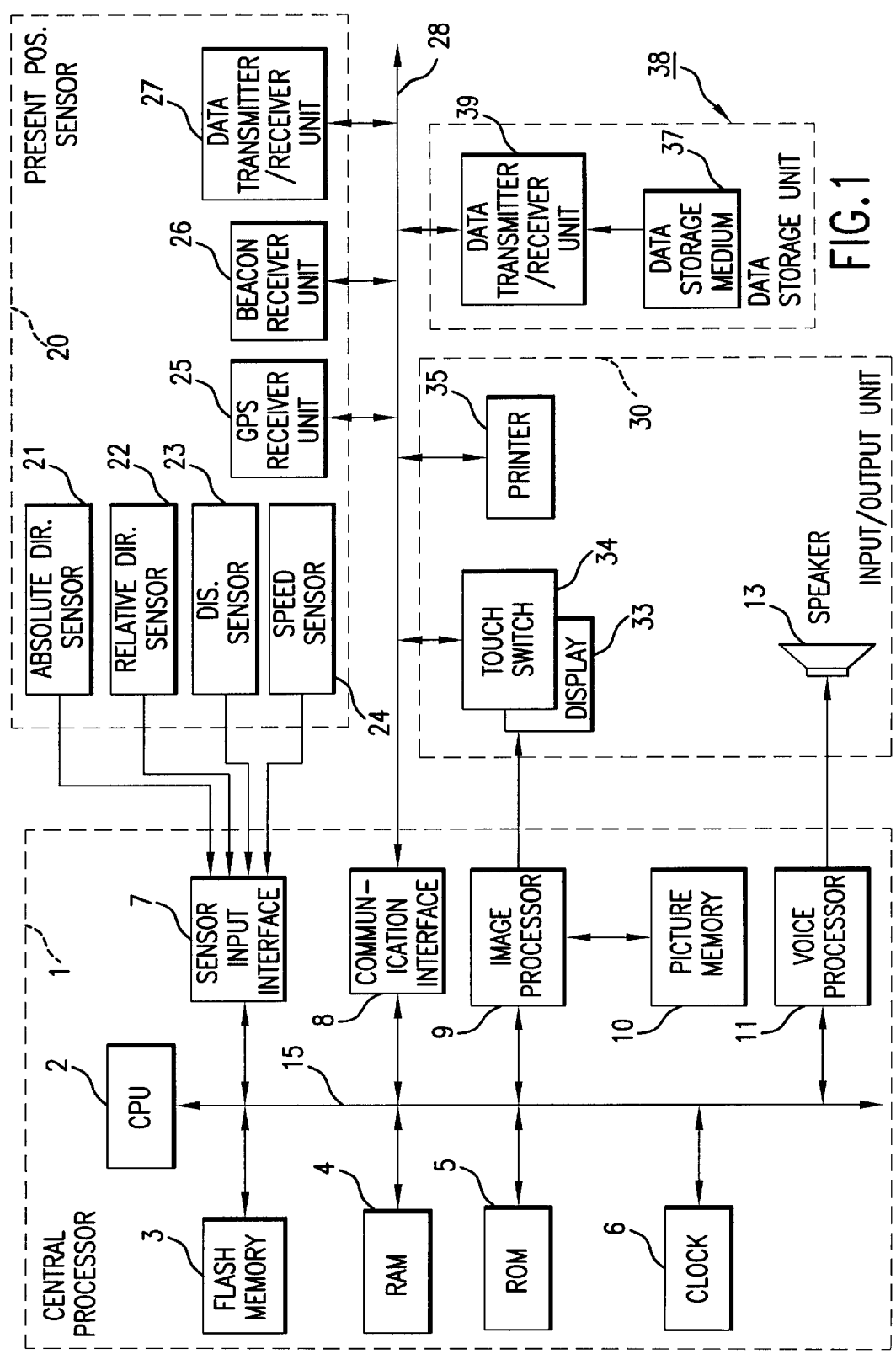
FIG. 1 is a block diagram illustrating the navigation device.

FIG. 1 is a block diagram of the navigation device. A central processor 1 controls the operation of the entire navigation device. The central processor 1 is provided with a CPU 2, a flash memory 3, a RAM 4, a ROM 5, a sensor input interface 7, a communication interface 8, an image processor 9, a picture memory 10, a voice processor 11 and a clock 6. The CPU 2 and the other elements just identified are connected together through a CPU local bus 15 and data is exchanged among the elements.

The flash memory 3 stores a variety of processing programs executed by the CPU 2, and a variety of parameters required for the programs. The programs stored in the flash memory 3 include control of the display of data and voice guidance. The ROM 5 stores figure data to be displayed and other general-purpose data. The general-purpose data includes voice waveforms, recording synthetic or human voice for voice guidance, that are used for the navigation operation.

The RAM 4 stores data input from external units, a variety of parameters used for the arithmetic operations, the operated results and programs for navigation. The clock 6 comprises a counter, a battery backed-up RAM or EEPROM, etc., and outputs time data.

The sensor input interface 7 comprises an A/C converter circuit or a buffer circuit. The sensor input interface 7 receives analog or digital sensor data from the sensors 21 to 24 of a present position detector 20. The present position detector 20 includes an absolute direction sensor 21, a relative direction sensor 22, a distance sensor 23 and a vehicle speed sensor 24.

The absolute direction sensor 21 is, for example, a terrestrial magnetism sensor and detects terrestrial magnetism. The absolute direction sensor 21 outputs data indicating a south-and-north direction which serves as the absolute direction. The relative direction sensor 22 is, for example, a steering angle sensor and detects the steering angle of the wheel based upon a gyroscope, such as an optical fiber gyroscope or a piezo-electric vibration gyroscope. The relative direction sensor 22 outputs a relative angle of a direction of progress of the car with respect to the absolute direction detected by the absolute direction sensor 21. The distance sensor 23 comprises a counter, or the like, connected to, for example, an odometer. The distance sensor 23 outputs data indicating the distance traveled by the car. The vehicle speed sensor 24 comprises a counter, or the like, connected to the speedometer. The vehicle speed sensor 24 outputs data that vary in proportion to the running speed of the car.

An I/O data bus 28 is connected to the communication interface 8 of the central processor 1. Connected to the I/O data bus 28 are a Global Positioning System (GPS) receiver unit 25, a beacon receiver unit 26 and a data transmitter/receiver unit 27 of the present position detector 20. To the I/O data bus 28 are further connected a transparent touch panel 34 and a printer 35 of the input/output unit 30, and a data storage unit 38. That is, a variety of data are exchanged between the external accessory equipment and the CPU local bus 15 through the communication interface 8.

The present position detector 20 outputs data for detecting the present position of the car. In other words, the absolute direction sensor 21 detects the absolute direction and the relative direction sensor 22 detects the relative direction with respect to the absolute direction. Further, the distance sensor 23 detects the distance traveled and the vehicle speed sensor 24 detects the running speed of the car. The GPS receiver unit 25 receives GPS signals to detect position data, such as longitude and latitude, of the car. The GPS signals are transmitted from a plurality of satellites orbiting the earth.

All position data in this specification consists of coordinate data for latitude and longitude. Although the examples will use east latitude and north longitude, it is to be understood that the latitude and longitude data will be appropriate to where in the world the car is being used.

Similarly, the beacon receiver unit 26 receives data from a data offering system, such as VICS (Vehicle Information and Communication System) or the like, and the received data and the corrected data of GPS are output to the I/O data bus 28. The data transmitter/receiver unit 27 exchanges a variety of data related to the present position or the road conditions near the car relative to the bidirectional present position data offering system or the ATIS (traffic data service), etc., by use of a cellular phone, FM multiplex signals or a telephone circuit. The beacon receiver unit 26 and the data transmitter/receiver unit 27 may not be provided.

The input/output device 30 comprises a display 33, the transparent touch panel 34, the printer 35 and a speaker 13. The display 33 displays guide data during the navigation operation. The touch panel 34 comprises a plurality of transparent touch switches that are arranged in the form of a matrix on a plane, and is adhered onto the screen of the display 33. By using the touch panel 34, data necessary for setting the destination, such as start point, destination, passing points, drop-in places, etc., are input to the navigation device. A printer 35 is used for printing a variety of data, such as a map and guides to facilities, output through the communication interface 8. Information of various kinds is transmitted by voice to the user from the speaker 13. The printer 35 may be omitted.

The display 33 may be a CRT, a liquid crystal display or a plasma display, and displays a picture. Desirably, however, a liquid crystal display is preferred as the display 33 because it consumes small amounts of electric power, it can be seen very clearly, and is light in weight. A picture memory 10, such as a DRAM (dynamic RAM) or dual port DRAM, is connected to the image processor 9 that is connected to the display 33. The picture data are written into the picture memory 10 by the image processor 9. Controlled by the image processor 9, the data are read out from the picture memory 10 and are displayed on the display 33.

In accordance with a drawing command from the CPU 2, the image processor 9 converts map data and character data into picture data for display and writes them into the picture memory 10. At this moment, the peripheral picture to that on the screen, i.e., surrounding areas, is also formed and written into the picture memory 10. Therefore, the peripheral picture can be readily displayed, too, upon scrolling.

The voice processor 11 is connected to the speaker 13. The voice processor 11 is connected to the CPU 2 and to the ROM 5 through the CPU local bus 15. The voice waveform data for voice guidance is read from the ROM 5 by the CPU 2 and is input to the voice processor 11. The voice waveform data are converted into analog signals by the voice processor 11, and are output from the speaker 13. The voice processor 11 and the image processor 9 comprise general-purpose DSPs (digital signal processors) or the like.

The data storage unit 38 connected to the I/O data bus 28 contains the data storage medium 37 in which are stored, in a nonvolatile manner, data such as road map data necessary for the navigation operation. The data storage unit 38 is provided with a data transmitter/receiver 39 for reading data written into the data storage medium 37 and outputting data into the I/O data bus 28. The data storage medium 37 may be an optical memory (CD-ROM, etc.), a semiconductor memory (IC memory, card, etc.), or a magnetic memory (opto-magnetic disk, hard disk, floppy disk, etc.). The data transmitter/receiver 39 is equipped with a data pickup adapted to the recording medium. When, for example, the recording medium is a hard disk, a core head is provided.

FIG. 2 illustrates the contents stored in the data storage medium 37. The data storage medium 37 stores disk management data. The data include those data related to programs, such as version data of the programs.

In the data storage medium 37 are stored navigation processing programs and programs related to other processings executed by the CPU 2, shown in the flowcharts that will be described later. These programs are read from the data storage medium 37 (external storage means/unit), and are written into the flash memory 3 (internal storage means/medium) and are stored therein (installed, transferred/copied).

The installation (transfer/copy) is automatically executed when the data storage medium 37 is set onto the navigation device, or is automatically executed when the power source circuit of the navigation device is closed, or is executed according to an instruction from the operator. The data storage medium 37 can be replaced by another data storage medium 37. Thus, the program is replaced by the new program or by the latest program. Due to the replacement capability, the latest navigation system is offered.

The data storage medium 37 stores map data, intersection data, node data, road data, photographic data, destination data, guide point data, detailed destination data, destination read data, and house shape data, as well as other data and programs that are necessary for the navigation operation. In accordance with the programs, the navigation operation is executed by using the road map data stored in the data storage medium 37. The program for navigation is read by the data transmitter/receiver 39 from the data storage medium 37, and is written into the flash memory 3 or the RAM 4. Other data include indication guide data, voice guidance data, and picture data showing a simple guide route. Additional data, as necessary, can also be included.

The data storage medium 37 stores map data in a plurality of reduced scales. The data storage medium 37, however, may store map data of the largest scale. When a map of a smaller scale is to be shown on the display 33, the map data stored in the data storage medium 37 is shown on a reduced scale. In this case, not only the lengths of the roads, etc. are shortened, but also signs and data representing buildings and facilities are reduced.

3. Contents of Data in the RAM 4

FIG. 3 shows a portion of the data groups stored in the RAM 4. In a program region PL is copied a program stored in the data storage medium 37. The external data GD comprises the whole or part of the data copied from the data storage medium 37. The present position data MP represents the present position of the car and is detected by the present position detector 20. The absolute direction data ZD represents the south-and-north direction and is found based upon the data from the absolute direction sensor 21. The relative direction data Dθ represents the angle of direction of progress of the car with respect to the absolute direction data ZD, and is found based upon the data from the relative direction sensor 22.

The traveled distance data ML represents a distance traveled by the car and is found based upon the data from the distance sensor 23. The present position data PI represents the present position and is input from the beacon receiver unit 26 or the data transmitter/receiver unit 27. The VICS data VD and the ATIS data AD are those input from the beacon receiver unit 26 or the data transmitter/receiver unit 27. Error in the position of the car detected by the GPS receiver unit 25 is corrected by using the VICS data VD. Moreover, traffic regulations and traffic jams in the area are identified based upon the ATIS data AD.

The registered destination data TP are related to destinations such as coordinate positions and names of destinations and are registered by the user. The registered destination data TP include the data ED of end point of the guide route and the data related to drop-in places in which the user may drop on the way to his destination, as will be described later. The start point SP of guide route data are the map coordinate data of a point from where the navigation operation will start. Similarly, the end point ED of guide route data are the map coordinate data of a point at where the navigation operation ends.

The node coordinates on a guide road closest to the present position of the car are used as the start point SP of guide route data. The start point SP of guide route data are effective when the present position of the car is, for example, within a site, such as a golf course or a parking lot which is off the guide road. Similarly, the node coordinates on a guide road closest to the registered destination data TP are used as the end point ED of guide route data. The end point ED of guide route data are also effective when the coordinates of the registered destination data TP are off the guide road.

The guide route data MW stored in the RAM 4 represent the most suitable route or a recommended route to the destination, and are found by a route search processing at a step 52 of FIGS. 6 and 7 that will be described later. Specific road numbers are attached to the roads of the road map stored in the data storage medium 37. The guide route data MW are a sequence of road number groups from the start point SP of guide route data to the end point ED of guide route data.

The mode-setting data MD are used for the guide/display processing that will be described later. The mode-setting data MD are cyclically increased every time where one of the touch switches 34 is depressed in a manner of, for example, 0, 1, 2, 3, 4, 0, 1, . . . . The content of the data shown on the display 33 is selected depending upon the mode-setting data MD.

The destination direction data MH represent the direction of the destination. The intersection point data CP represent coordinates of a point where the guide route intersects the end line of the map picture. The search-again flag SF and the route-setting flag KF are used in a route search processing (step 52, FIG. 6) and in a guide/display processing (step 53, FIG. 6) that will be described later.

4. Road Data

Figure 5:
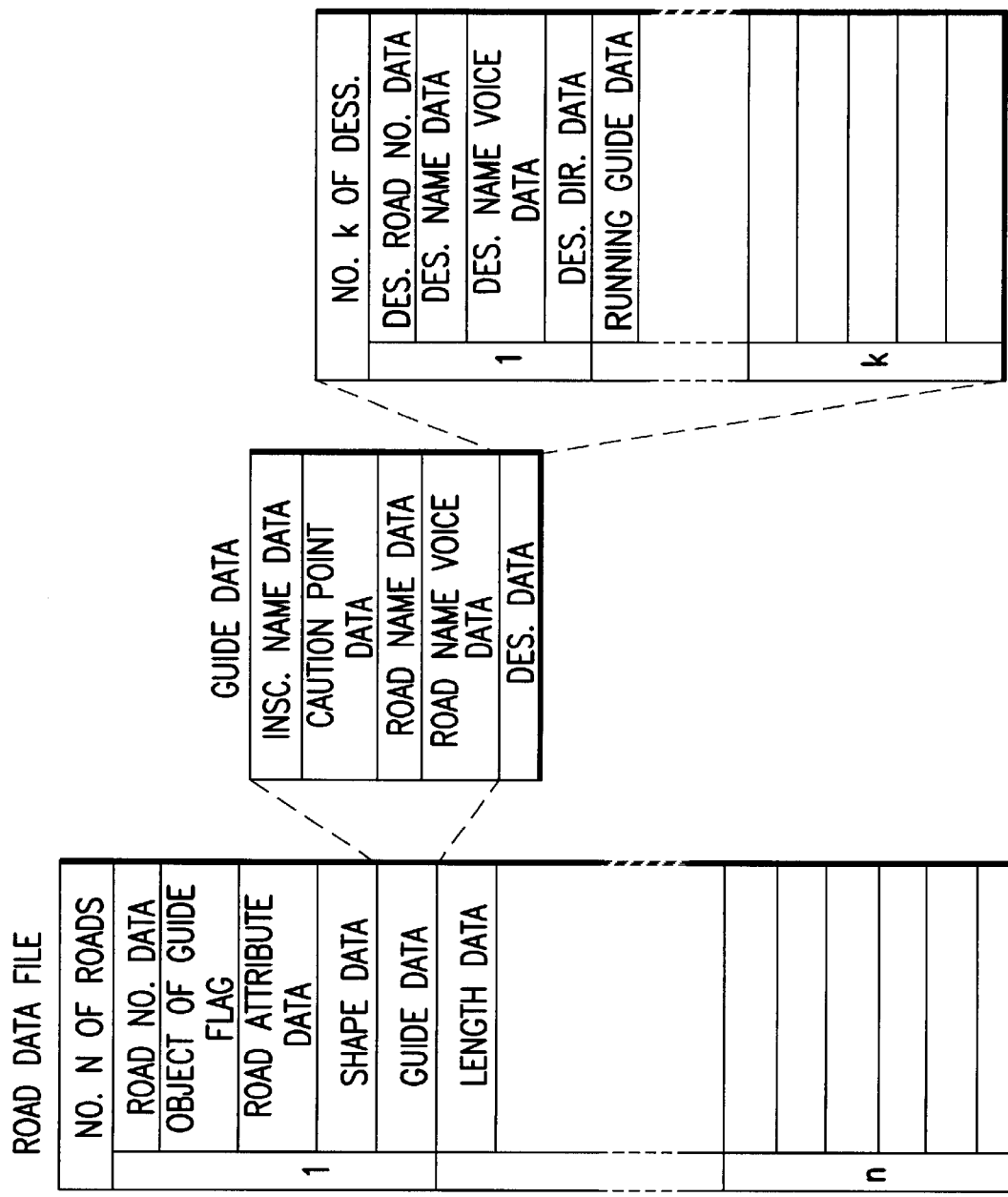
FIG. 5 is a diagram illustrating the contents of road data file stored in the data storage medium.

FIG. 5 illustrates a portion of the road data in the road data file stored in the data storage medium 37. The road data file includes data related to all roads wider than a predetermined width in an area stored in the map data file. When the number of roads in the road data file is n, the road data related to n roads are stored. The road data comprise road number data, object of the guide flag, road attribute data, shape data, guide data and length data.

Figure 4:
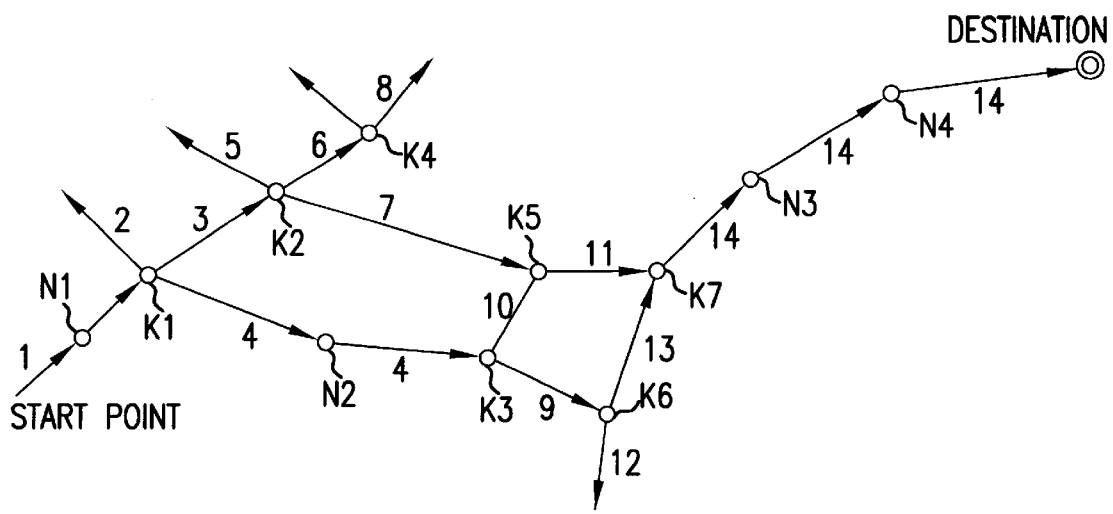
FIG. 4 is a diagram illustrating a guide route.

The road number data are identification numbers attached to all of the sections of the roads that are sectionalized and included in the map data. The object of guide flag is "1" when the road is a guide road and is "0" when the road is a non-guided road. A guide road is a one wider than a predetermined width, such as a main trunk road or a general road, and a non-guided road is the one narrower than a predetermined width, such as footpath or lane. The road attribute data represent attributes, such as elevated road, underpass, expressway, toll road, etc. The shape data represent shapes of roads and comprise coordinate data of a start point of the road, an end point of the road, and nodes from the start point to the end point. Referring, for example, to FIG. 4, the roads of road numbers 1, 4 and 14 are provided with nodes, and the node numbers N1 to N4 are attached to the nodes. The coordinate data of these node numbers N1 to N4 are stored as shape data together with the coordinate data of start point and end point.

The guide data comprise intersection name data, caution point data, road name data, road name voice data and destination data. When the end point of a road is an intersection, the intersection name data represent the name of the intersection. The caution point data represent caution points on the road, such as a railroad crossing, an entrance to a tunnel, an exit from the tunnel, a reduction of the road width, etc. The road name voice data are voice data of road names used for the guidance by voice.

The destination data represent a road continuing to the end point of the road (which is a destination), and comprise the number k of destinations and the data for each of the destinations. The data related to the destination comprise destination road number data, destination name data, destination name voice data, destination direction data and running guide data. The destination road number data represent the road number of the destination, the destination name data represent the road name of the destination, the destination name voice data are voice data of the road name of the destination, the destination direction data represent the direction of the road to the destination, and the running guide data are for guiding the driver to get into the right lane or the left lane to go to the road that leads to the destination or to run in the center lane. The length data represent the length from the start point to the end point of the road, the length from the start point to each of the nodes, and the lengths among the nodes.

5. Overall Processing

Figure 6:
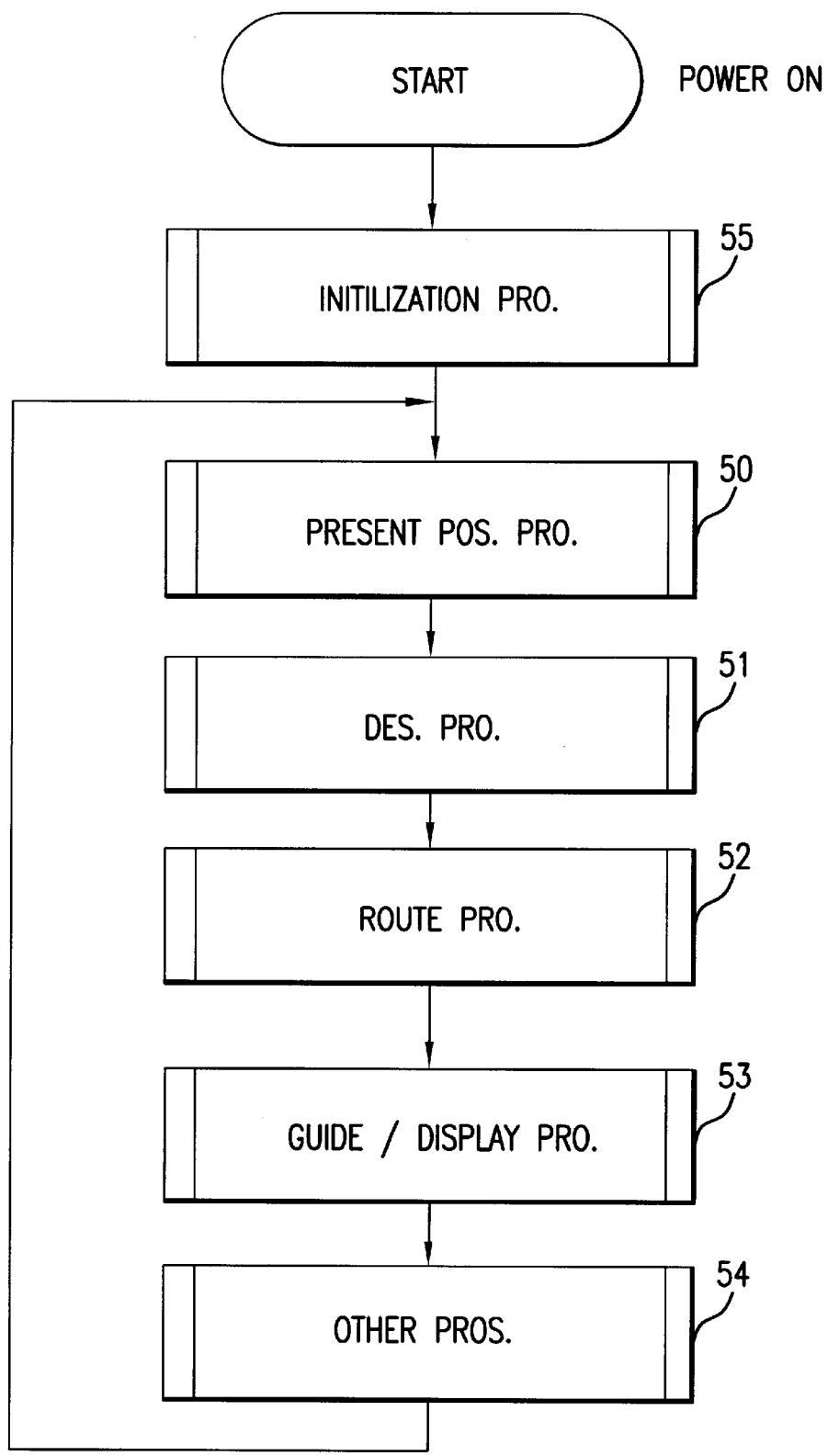
FIG. 6 is a flowchart of the overall processing.

FIG. 6 is a flowchart showing the overall processing of the navigation device that is executed by the CPU 2. The processing starts upon completing the power source circuit and ends when the power source circuit is shut off. The power source circuit is completed or shut off when the power source of the navigation device is turned on or off, or when the engine start key (ignition switch) of the vehicle is turned on or off.

In an initialization processing (step 55) of FIG. 6, the program for navigation is read from the data storage medium 37, copied onto the program region PL in the flash memory 3 or in the RAM 4, and is executed. Further, the data in the RAMs, such as RAM 4, picture memory 10, etc. are cleared by the CPU 2.

Then, a present position processing (step 50), a destination-setting processing (step 51), a route search processing (step 52), a guide/display processing (step 53) and other processings (step 54) are executed cyclically.

In the present position processing (step 50), the geographical coordinates (latitude, longitude and altitude) of a car mounting the navigation device are detected. That is, the GPS receiver unit 25 receives signals from the plurality of satellites orbiting the earth. Relying upon the signals from the satellites, it is possible to detect coordinate positions of the satellites, the time at which the signals were emitted from the satellites, and time at which the signals were detected by the GPS receiver unit 25. From these data, the distances to the satellites are found by calculation. Based upon the distances from the satellites, the coordinate position of the car on the earth is calculated, and the present position of the car is obtained. The thus obtained coordinate position of the car is stored as present position data MP in the RAM 4. The present position data MP is often corrected relying upon the data input from the beacon receiver unit 26 or the data receiver/transmitter unit 27.

In the present position processing (step 50) the absolute direction data ZD, relative direction angle data Dθ, and travelled distance data ML are found by using the absolute direction sensor 21, relative direction sensor 22 and distance sensor 23. The arithmetic processing for determining the position of the car is executed based upon the absolute direction data ZD, relative direction angle data Dθ and travelled distance data ML. The position of the car found through this operation is collated with the map data stored in the data storage medium 37, and is so corrected that the present position is correctly shown on the map picture. This correction makes it possible to correctly find the present position of the car even when the GPS signals cannot be received because the user is running through a tunnel or any other reason the GPS signals are interrupted.

In the destination-setting processing (step 51) of FIG. 6, geographical coordinates of a destination desired by the user are set as registered destination data TP. The destination may often include drop-in places. The user specifies the coordinate position on the road map or on the house map shown on the display 33. Or, the user selects the destination from a list of destinations shown on the display 33. As the destination is specified by the user, the central processing unit 1 stores, in the RAM 4, the data such as geographical coordinates of the destination as registered destination data TP. The data, such as coordinates of the destination, include drop-in places at which the user may drop in on the way to his/her destination. The destination-setting processing is passed over when a new destination or a new drop-in place is not set or is not changed.

The route search processing (step 52) searches the most suitable route from the start point SP of guide route data to the end point ED of guide route data passing through the drop-in places that are set. The most suitable route may be the one which enables the user to arrive at the destination, for example, within the shortest period of time or after running over the shortest distance. When an expressway is used, the most suitable route is the one which enables the user to arrive at the destination within the shortest period of time or after running over the shortest distance by using the expressway. The data the same as the present position data MP are set or the node data of a guide road closest to the present position data MP are set as the start point SP of guide route data. When the present running position of the car deviates from the guide route, the most suitable route is automatically searched again from the present deviated position to the end point ED of guide route passing through the above-mentioned drop-in places.

In the guide/display processing (step 53), the guide route found by the route search processing (step 52) is shown on the display 33 with the present position of the car at the center. The guide route is shown on the display 33 together with the map picture. Furthermore, guide information may be presented by voice from the speaker 13 or the guide information may be shown at any time on the display 33, so that the car can be favorably driven along the guide route. As the picture data for showing the guide route, use is made of road map data in the vicinity of the present position as stored in the data storage medium 37 or the house map data in the vicinity of the present position.

The road map data and the house map data are changed depending upon the conditions, such as the distance from the present position to the guide point (destination, drop-in place or intersection), speed of the car, size of the area that can be displayed, or the switching operation effected by the operator. When near the guide point (destination, drop-in place or intersection), furthermore, a map of the guide point and vicinity is shown on the display 33 on an enlarged scale. A picture of a simplified guide route may be shown on the display 33 instead of the above-mentioned detailed road map. The picture of simplified guide route does not show various geographical data but shows only a minimum amount of required data. The data comprise the guide route, the direction of the destination or the drop-in place, and the present position only.

After the guide/display processing at the step 53, other processings are executed (step 54). For instance, it is determined whether the car is running along the calculated guide route. When the car has arrived at the destination, the guide/display processing of the route is finished, and the program returns to step 50. Or, it is determined whether the destination is changed to another destination by an input operation by the operator. Even when the destination is changed, the program returns to step 50, and the processing is executed again from the present position to the newly input destination. Thus, the processings of the steps 50 to 54 are repeated sequentially.

6. Route Search Processing

FIG. 7 is a flowchart of the route search processing (step 52) of FIG. 6). First, it is determined whether the route be searched again based upon the search-again flag SF stored in the RAM 4 (step 60). The search-again flag SF is set to on (step 144) when the present position has deviated from the guide route in the guide/display processing (step 53 of FIG. 6) shown in FIG. 12. When the search-again processing (step 72) is finished, the search-again flag SF is reset to off (step 74).

When it has not been requested to search the route again, it is determined whether it has been requested to set the route based upon the route-setting flag KF (step 62). The route-setting flag KF is set to be on when a destination is registered by the user in the destination-setting processing (step 51 of FIG. 6), and is reset to off when the guide route data are stored in the RAM 4 (step 70).

When the destination is set, the processings (steps 64 to 70) are executed to search a new guide route. A start point SP of the guide route is determined at step 64, the start point SP of guide route being the one from where the guide route starts to go toward the destination. An end point ED of guide route is determined at step 66, the end point ED of guide route being the point where the guide route ends. A route from the start point SP of guide route to the end point ED of guide route is searched (step 68). The route that is identified is stored in the RAM 4 as the guide route data MW (step 70).

In searching the guide route (step 68) as described above, roads connecting to the road having a start point SP of guide route are selected successively, and the road number data are arranged according to the order of roads up to the end point ED of guide route. For example, a road number of a road having a start point SP of guide route is stored in the head address of the guide route data MW. Next, the road data connecting to or continuing from this road are read out based upon the destination data in the road data. The most suitable road is selected from the road data that are read out. The road can be selected under various conditions, such as in the order of priority based upon the road attribute data. The road number of the selected road is stored in the next address. The roads continuing thereto are successively selected until the end point ED of guide route is reached.

When the entire guide route is identified, the length data of the selected roads are added up together to find the overall length of the guide route. Moreover, the length data of start points, end points and nodes of the roads are subtracted from the overall length of the guide route starting from the road closest to the end point ED of guide route, and the distances are found up to the end point ED of guide route from these start points, end points and nodes, and are stored to correspond to the coordinate data of the start points, end points and nodes. The roads selected to form a guide route are limited to the guide roads. Whether the roads are the guide roads is determined relying upon the object of the guide flag.

In searching the guide route, the data related to traffic regulations may be added to the conditions for selection. Or, simply, the shortest route to the destination may be searched. Moreover, a plurality of routes may be recommended with one to be selected by the user.

7. Processing for Determining Start Point of Guide Route

FIG. 8 is a flowchart illustrating the processing for determining a start point SP of guide route (step 64 of FIG. 7) executed in the route search processing (step 52 of FIG. 6). As described above, the guide route comprises at least one guide road. When the present position is on a non-guided road or deviates from the guide road, a point on the guide road at the shortest distance from the present position is regarded to be a start point of guide route.

First, the present position data MP are read by the CPU 2 (step 80), and it is determined whether the present position exists on the guide road (step 82). For example, it is determined that the present position is on the guide road when the road data exist for the coordinates of the present position data MP, and the object of the guide flag is "1" in the road data. When the present position exists on the guide road, the present position data MP are stored as the start point SP of guide route data in the RAM 4 (step 100). When the present position MP1 exists on the guide road AD1 as shown in, for example, FIG. 9, the present position MP1 is regarded as the start point SP of guide route.

When the present position does not lie on the guide road, it is then determined whether the present position is on a non-guided road (step 84). For example, if it is determined that the present position is on a non-guided road when road data exists at the coordinates of the present position data MP, and the object of the guide flag is "0" in the road data. Further, when the present position does not correspond to any road data, it is then determined that the present position exists neither on a guide road nor on a non-guided road, but is at a site or parking lot of a facility, a vacant lot or other non-road location.

In this case, the start point data and node data of the guide roads within a predetermined distance from the present position are read out (step 86). Then, the distances are calculated from the present position to the start point data and to the node data that are read out (step 88). The distances found at step 88 are compared to find a start point or a node which is the shortest distance from the present position (step 90). When there are a plurality of equally short points, the point closest to the registered destination TP is selected. In this case, a point is selected which has the least total number or the smallest overall length of road data of the guide route from the guide route from each of the shortest points. The coordinates of the shortest point is stored as start point SP of guide route data in the RAM 4 (step 92).

Figure 9:
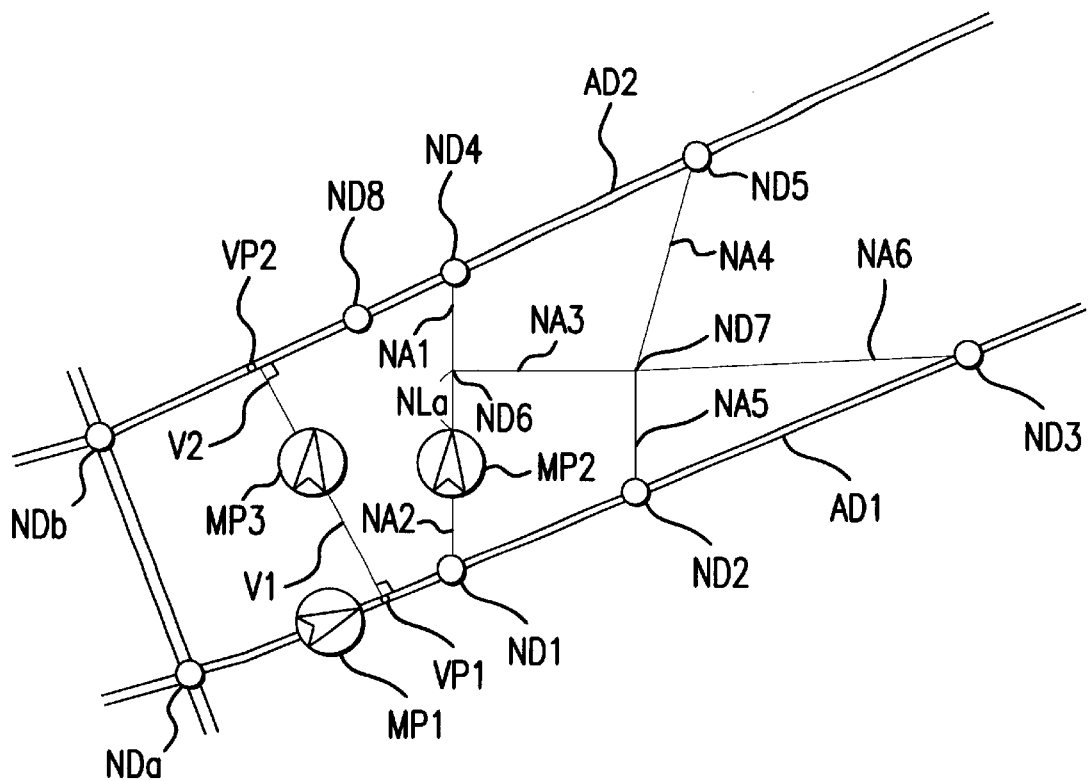
FIG. 9 is a diagram illustrating the present position, guide roads and non-guided roads.

When the present position MP3 is on a non-guided road as shown in, for example, FIG. 9, the coordinates of nodes ND1, ND4, ND8, NDa and NDb on the guide roads AD1, AD2 within a predetermined distance from the present position MP3 are found (step 86). Then, straight distances from the present position MP3 to the nodes ND1, ND4, ND8, NDa and NDb are found based upon the differences between the coordinates of the present position MP3 and of the coordinates of the nodes ND1, ND4, ND8, NDa and NDb (step 88). In this example, the node ND8 is found at the shortest distance (step 90) and is regarded to be the start point of the guide route (step 92). Since the present position MP3 is on the non-guided road, the node ND 8 at the shortest distance may be regarded as the start point of the guide route irrespective of the direction of progress of the car. Or, the nodes ND1 and NDa which are opposite to the direction of progress of the car may be excluded from the candidates of start points of guide routes. Moreover, the node NDb in a direction opposite to the direction of destination may be excluded from the candidates of start points of guide routes.

On the other hand, when the present position is on the non-guided road (step 84), the road data of the non-guided road are read out, and the length of the route from the present position to the guide road is found (step 94). When there are a plurality of routes from the present position to the guide road, their lengths are found. In this case, the lengths from the present position to the end points or from the start points to the end points of the non-guided roads are totaled from the present position to the guide road. Furthermore, the lengths of the routes are compared to select the shortest one (step 96). The coordinates of an intersection point where the shortest route meets the guide road are stored as the start point SP of guide route data in the RAM 4 (step 98).

When the present position MP2 exists on a non-guided road NA2 as shown in, for example, FIG. 9, the lengths of routes are found from the present position MP2 to intersection points ND1 to ND5 where the non-guided roads NA1 to NA6 meet the guided roads AD1 and AD2 (step 94). In FIG. 9, the intersection points where the non-guided roads NA1 to NA6 meet the guided roads AD1 and AD2 are in agreement with the nodes ND1 to ND5. Often, however, the intersection points where the non-guided roads meet the guided roads may not be in agreement with the nodes of the guide roads.

In the case of FIG. 9, first, the length NLa is found from the present position MP2 to the node ND6 based upon a difference between the coordinates of the present position MP2 and the coordinates of the node ND6. The length NA1 of the non-guided road and the distance NLa are added together. Similarly, the distance NLa and the lengths of the non-guided roads NA3 to NA6 are added together, and the lengths of the routes are found from the present position MP2 to the intersection points ND2, ND3 and ND5. Here, the intersection point ND1 is in a direction opposite to the direction of progress of the car and is excluded from the candidates of start points of guide routes. The intersection point ND4 at the shortest distance from the present position MP2 is regarded to be a start point SP of guide route (step 98).

Alternatively, when the present position is on a non-guided road, the start point SP of guide route may be determined as described below. As shown in FIG. 9, for example, the coordinates of nodes ND1, ND4, ND8, NDa and NDb on the guide roads AD1, AD2 are read out as being within a predetermined distance from the present position MP3 on the non-guided road (step 86), lengths of perpendiculars V1 and V2 drawn to the guide roads AD1 and AD2 from the present position MP3 are found from the above coordinates and from the coordinates of the present position, and coordinates of intersection points VP1 and VP2 where the perpendiculars V1, V2 meet the guide roads AD1, AD2 are found. One of the perpendiculars V1 or V2, whichever is shorter, is selected, and an intersection point VP1 where the perpendicular V2 meets the guide road AD2 is regarded to be a start point SP of guide route. In this case, a point close to the present position can be regarded to be the start point SP of guide route rather than regarding the above-mentioned point at the shortest distance as the start point of guide route. In determining the start point SP of guide route as described above, weighing may be effected depending upon the widths of routes up to the start points of guide routes, amount of traffic, direction in which the car runs, and similar factors.

8. Processing for Determining the End Point of Guide Route

Figure 10:
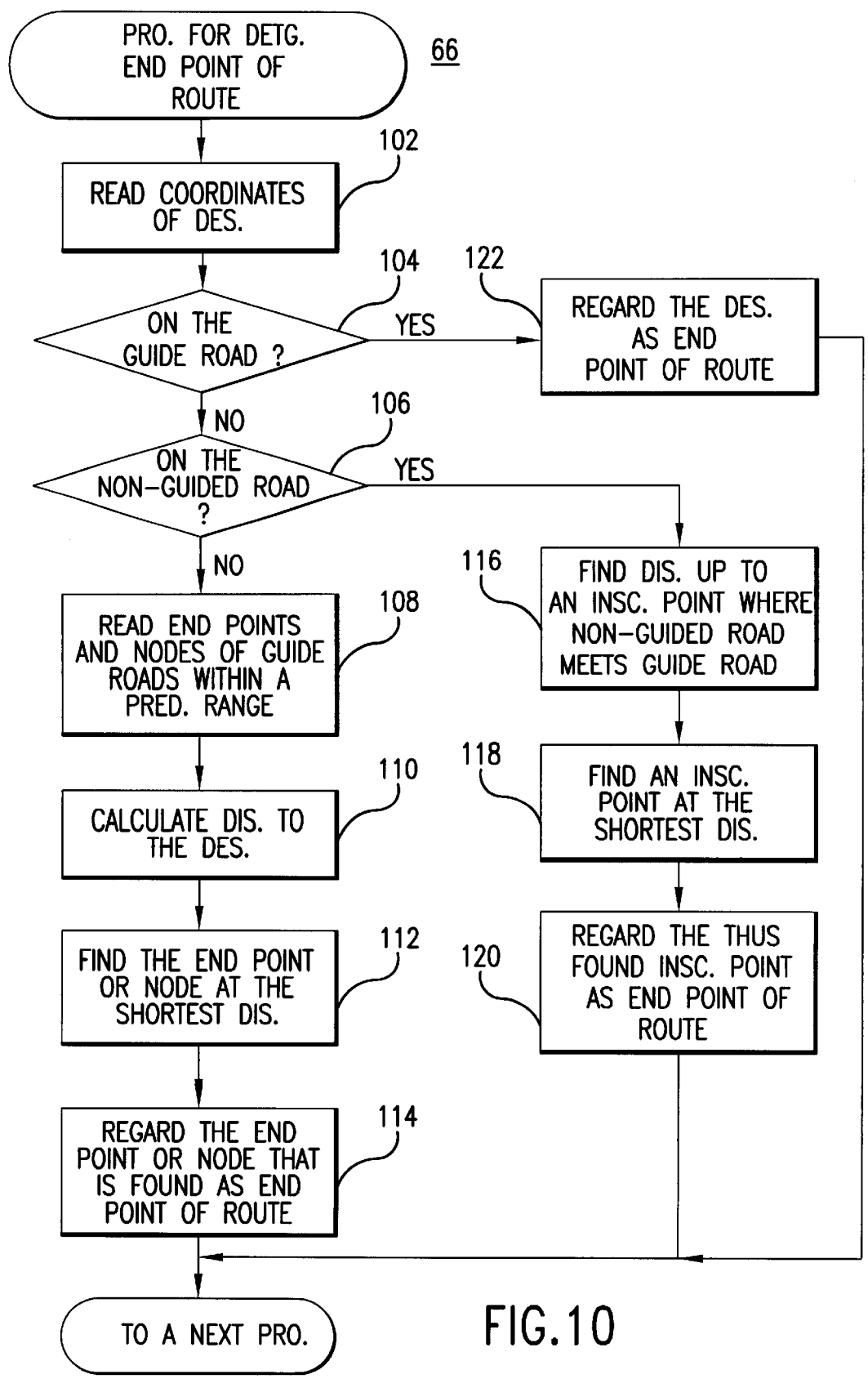
FIG. 10 is a flowchart illustrating the processing for determining an end point of a guide route.

FIG. 10 is a flowchart illustrating the processing for determining the end point ED of guide route (step 66 of FIG. 7) in the route search processing (step 52 of FIG. 6). As described above, the guide route is made up of guide roads. When the destination does not exist on either a non-guided road or a guide road, a point on a guide road at the shortest distance from the destination is regarded to be the end point ED of guide route.

First, the CPU 2 reads the coordinate data TP of the registered destination (step 102). When the registered destination is on a guide road (step 104), the registered destination data TP are stored as the end point ED of guide route data in the RAM 4 (step 122). Here, it is determined that the registered destination is on the guide road when the road data exists at the coordinates of the registered destination data TP and when the object of guide flag is "1" in the road data.

When the registered destination does not exist on a guide road (step 104) and on a non-guided road (step 106), the end point data and node data of guide roads within a predetermined range from the registered destination are read out (step 108). Here, the registered destination is determined to be existing on the non-guided road when the road data at the coordinates of the registered destination data TP exists and when the object of the guide flag is "0" in the road data. When the registered destination is neither on a guide road nor on a non-guided road, the registered destination does not exist on a road.

The distances are calculated from the registered destination to the end point data and the node data that are read out (step 110). The calculated distances are compared to find the end point or the node at the shortest distance from the registered destination (step 112). When a plurality of equally shortest points are found in a plural number, the end point closest to the registered destination TP is selected, or the one having the smallest total number of road data of guide routes up to the end point at the shortest distance is selected. The coordinates of the end point at the shortest distance are stored as the end point ED of guide route data in the RAM 4 (step 114).

When the registered destination is on a non-guided road (step 106), the road data of the non-guided road are read out and the lengths are found from the registered destination to the junctions of the guide road (step 116). The junction is a point where the non-guided road having the registered destination meets the guide road. When there are a plurality of routes between the registered destination and the junction, the lengths of the routes are found. The length from the registered destination to the junction is the sum of lengths from the registered destination to the non-guided road or is the sum of lengths from the start point of the non-guided road to the end point thereof. The lengths of the identified routes are compared to find the shortest route (step 118). The coordinates of the junction (intersection point) where the shortest route meets the guide road are stored as the end point ED of guide route data in the RAM 4 (step 120).

Figure 11:
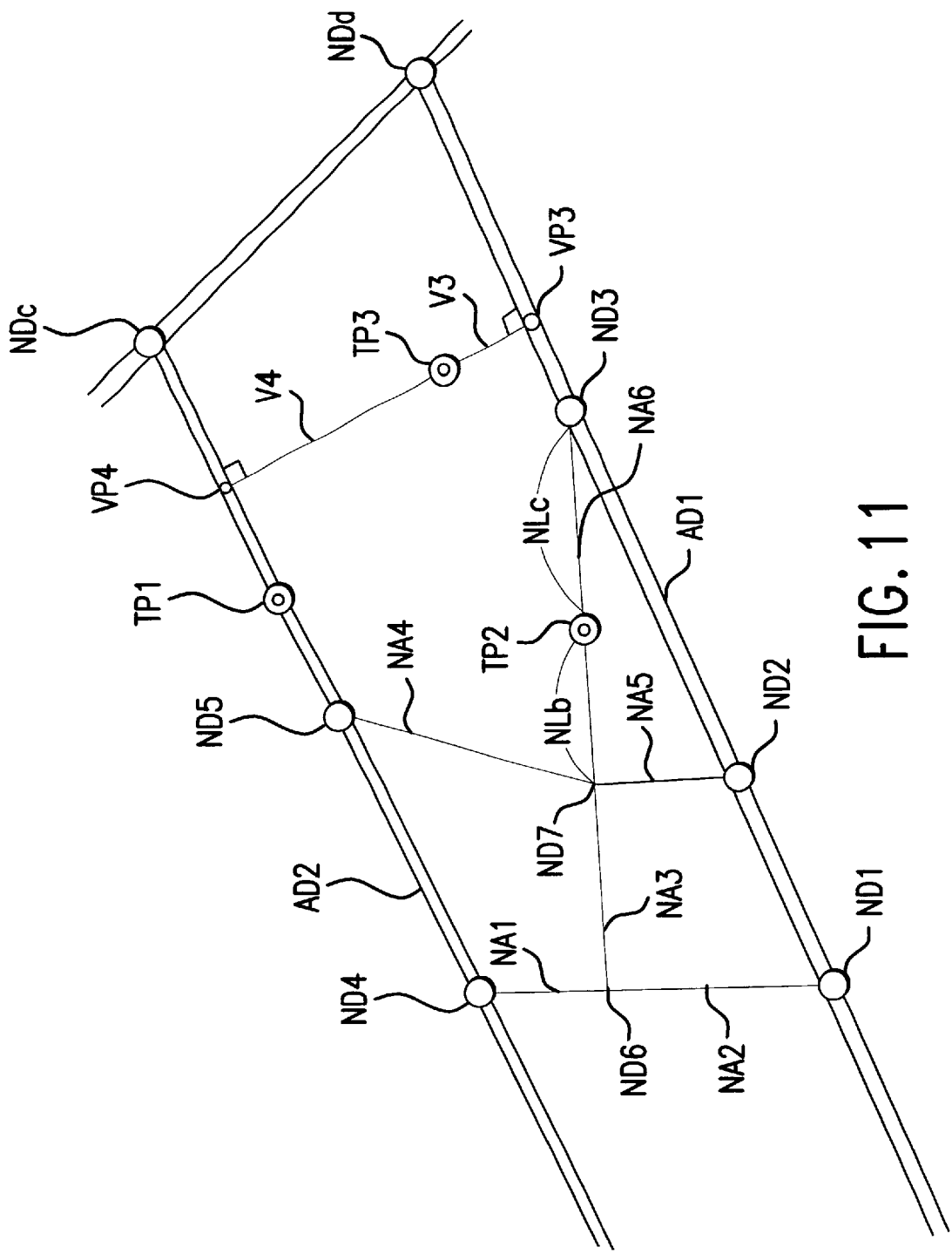
FIG. 11 is a diagram illustrating a registered destination, guide roads and non-guided roads.

When, for example, the registered destination TP1 exists on a guide road AD2, as shown in FIG. 11, the registered destination TP1 is regarded to be the end point ED of guide route (step 122). When a registered destination TP2 exists on a non-guided road NA6, on the other hand, the lengths of the routes from the registered destination TP2 to the junctions ND1 to ND5 are found (step 116). The junctions ND1 to ND5 are intersection points where the non-guided roads NA1 to NA6 meet the guide roads AD1, AD2. In FIG. 11, the junctions (intersection points) ND1 to ND5 are in agreement with the nodes ND1 to ND5 of the guide roads AD1, AD2, but such is not often the case.

In FIG. 11, first, a length NLb from the registered destination TP2 to a node ND7 is found based upon a difference between the coordinates of the registered destination TP2 and the coordinates of the node ND7. This length NLb and the length of the non-guided road NA5 are added together to find the length of the route from the registered destination TP2 to the junction (intersection point) ND2. Similarly, the length NLb and the lengths of the non-guided roads NA1 to NA4 are added together, in various combinations, to find the distances from the registered destination TP2 to the intersection points ND1, ND4, ND5. Furthermore, the length NLb is subtracted from the length of the non-guided road NA6 to find the length NLc of the route from the registered destination TP2 to the node ND3. The intersection point ND3 at the shortest distance from the registered destination TP2 is regarded to be the end point ED of guide route (step 120).

When the a registered destination TP3 does not exist on a road, either guide or non-guided, the coordinates of nodes ND3, ND5, NDc, NDd on the guide roads AD1, AD2 are found that are within a predetermined distance from the registered destination TP3 (step 108). Straight line distances from the registered destination TP3 to the nodes ND3, ND5, NDc, NDd are determined based upon the differences between the coordinates of the registered destination TP3 and the coordinates of the nodes ND3, ND5, NDc, NDd (step 110), and the node at the shortest distance, in this example, node ND3, is regarded to be the end point of guide route (step 114).

Alternatively, when the registered destination is not on a road, the lengths of perpendiculars V3, V4 drawn to the guide roads AD1, AD2 from the registered destination TP3 and coordinates of the junctions (intersection points) VP3, VP4 may be found, and the intersection point VP3 of the perpendicular V3 at the shortest distance may be regarded to be the end point ED of guide route is in the case of the start point SP of guide route previously described. The above-mentioned end point ED of guide route may be weighed, compared and determined depending upon the widths of routes up to the end point ED of guide route, direction of progress of the car, and similar factors.

9. Guide/Display Processing

Figure 12A:
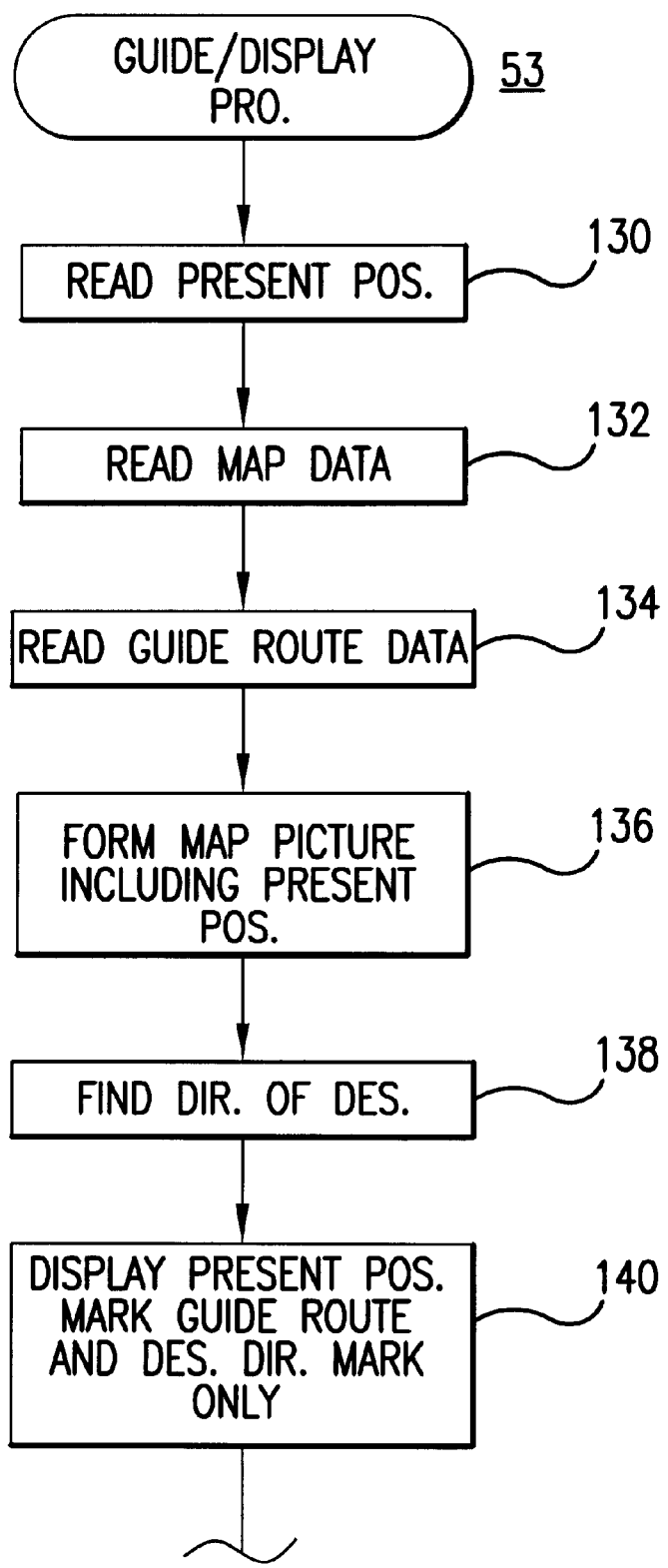
FIG. 12 is a flowchart illustrating the processing for guidance and display.
Figure 12B:
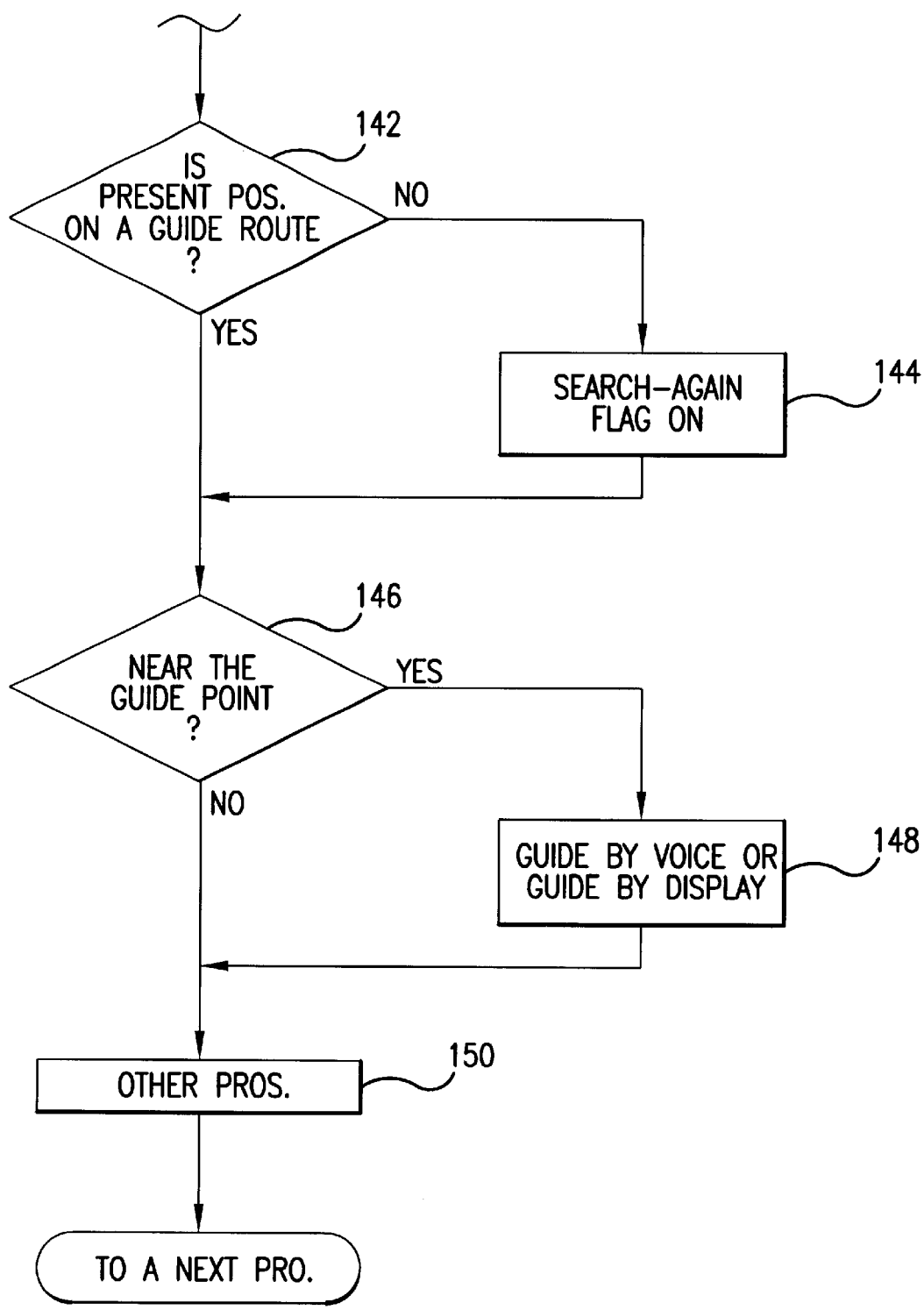

FIG. 12 is a flowchart of the guide/display processing (step 53 of FIG. 6). In this processing, first, the present position data MP are read from the RAM 4 by the CPU 2 (step 130). Further, the map data and the guide route data MW are read from the RAM 4 (steps 132, 134). Map picture data inclusive of the present position are formed (step 136). In the map picture data, the present position is located at the center of the picture on the display 33, and the map data are selected depending thereupon and are sent to the image processor 9. In addition, the direction of progress of the car is detected at all times, the display direction data are generated, the map picture data are turned by the image processor 9 depending upon the display direction data, and the direction of progress of the car is directed toward a top of the map picture. When a front-wide mode is selected to display much of the forward direction of the car, the present position is set at a position a little lower than the center of the map picture, so that a wider area is displayed ahead of the present position.

Then, the direction of the registered destination TP is found relative to the present position MP (step 138). For example, the inclination θm of a line connecting the coordinates of the registered destination TP to the coordinates of the present position MP is calculated to find the direction of the registered destination TP. The criterion for finding the inclination θm may be relative to the south-and-north direction, relative to the east-and-west direction, or may be the coordinate axis in the coordinate system of a picture shown on the display 33. The inclination θm that is found is stored as destination direction data MH in the RAM 4.

Next, the data shown on the display 33 are sent to the image processor 9, and the display 33 displays the guide route, present position and destination direction mark only (step 140). As shown, for example, in FIG. 13, the present position mark H2 is shown at a position a little lower than the center of the map picture H1 shown on the display 33. The map picture H1 is so displayed so that the car is headed upwards or toward the top of the display. A guide route H3 is shown on the map picture H1. The destination direction mark indicates the direction of the registered destination TP in an easy-to-understand manner and is, for example, a straight line H4 connecting the registered destination TP to the present position mark H2 and/or an arrow H5 indicating the registered destination TP. The straight line H4 and/or the arrow H5 may be of a conspicuous color, such as red, or may be a solid line, a fine line, a chain line, or may be flashed. The arrow H5 may be shown near the present position mark H2 or may be shown at a predetermined position separated from the present position mark H2. The arrow H5 may be shown on the straight line H4, near the straight line H4, or on the end line of the map picture.

A mark H6 is indicated at the end of the guide route H3 shown on the map picture H1. The mark H6 indicates the direction of the destination or the direction in which the guide route H3 further continues. The direction mark H6 is indicated on an intersection point CP where the guide route H3 meets the end line of the map picture H1. For example, the road data within a range shown on the display 33 are read from the roads constituting the guide route data MW. The road closest to the registered destination TP is selected from the road data. As described above, the guide route data MW sequentially include the road number data that connect the start point SP of guide route to the end point ED of guide route. Therefore, the greatest road number in this sequence (address number) represents the road closest to the registered destination. Furthermore, those within the range of the display 33 are read out from the road shape data. The shape data having the greatest number in the sequence (address number) is selected from the shape data. Next, coordinate data are found at a point where a straight line, connecting the shape data to the shape data of the next address number, meets the end line of the picture on the display 33. The coordinate data that are found are stored as intersection point data CP in the RAM 4.

The ROM 5 stores character pattern data for the arrow used as the direction mark H6 which is turned in the direction of the destination or in the direction in which the guide route continues. The character pattern data are sent to the image processor 9 and are incorporated into the image data. The direction mark H6 is indicated at the end of the guide route H3. In this case, the front end of the arrow is brought into agreement within the coordinates of the intersection point data CP.

On the map picture H1 are displayed the present position mark H2, guide route H3, and destination direction marks H4 to H6 only; i.e., no more geographical data are displayed. Thus, the display 33 displays a minimum amount of the necessary data, and the driver is able to confirm his course instantly without becoming confused by other geographical data. The rear part PSS of the guide route H3 following the present position mark H2 is the route previously travelled by the car, and may be erased or may be indicated in a different color or by using a fine line or a broken line. When the registered destination TP has entered into the map picture H1, a destination mark is indicated at the coordinates of the registered destination TP. In this case, the direction marks H4 to H6 may be erased or may continue to be shown.

Next, it is determined whether the present position exists on the guide route (step 142). When, for example, the coordinates of the present position data MP are in agreement with the coordinates of the road data constituting the guide route data MW, the present position exists on the guide route. When the coordinates of the present position data MP are not in agreement with the coordinates of the road data constituting the guide route data MW, the present position is deviated from the guide route. Here, when the present position is deviated from the guide route, the search-again flag SF is turned on (step 144). When the route search processing (step 52 of FIG. 6) is executed next, therefore, the search-again processing (step 72 of FIG. 7) is executed. The present position mark H2 is indicated at a position deviated from the guide route H3 as shown in, for example, FIG. 14. The map picture H1 displays the present position mark H2, guide route H3, and direction marks H4 to H6 or the destination mark only. When the present position mark H2 is deviated from the guide route H3, therefore, the route from the present position to the guide route H3 cannot be known. When a new guide route is searched again and is displayed on the map picture H1, therefore, the driver can observe the route to the destination without confusion.

Next, when the present position approaches a predetermined guide point, such as a node (step 146), the map near the guide point is displayed on an enlarged scale, and the guidance is provided by the display and by voice (step 148). The guide is executed relying upon the coordinate data, guide display picture data or guide voice data of a guide point read by the CPU 2 from the guide point data file.

In other processings (step 150), when the search-again processing (step 72 of FIG. 7) is executed, the distance between the present position and the start point SP of guide route that is identified again is provided to the operator by voice or by being displayed on the display 33. The distance is calculated by the search-again processing (step 72 of FIG. 7) (steps 166, 182 in FIGS. 15, 20, and step 244 in FIG. 22). There is further executed a processing for changing the scale of the map picture H1, processing for automatically scrolling the map picture accompanying the movement of the present position, processing for displaying the guide data as requested by the user, and other desired processing.

10. Search-Again Processing

FIG. 15 is a flowchart illustrating the search-again processing (step 72 of FIG. 7) in the route search processing (step 52 of FIG. 6). The processing is started when the present position deviates from the guide route that has been previously determined. The end point ED of guide route, however, is not changed. In the search-again processing, therefore, the start point SP of guide route is reset, and a new route is searched from the new start point SP of guide route up to the end point ED of guide route.

First, the present position data MP are read from the RAM 4 by the CPU 2 (step 160). When the present position is on a guide road (step 162), the present position serves as a new start point SP of guide route. A route is then searched from the present position to the end point ED of guide route (step 180). Here, when the road data exists for the coordinates of the present position data MP and the object of the guide flag is "1" in the road data, it is determined that the present position exists on the guide road. When the guide road AD1 is a guide route MW and the present position MP4 exists on a guide road AD2 as shown in, for example, FIG. 16, the present position MP4 is regarded to be the start point SP of guide route, and a route is identified from the present position MP4 to the end point ED of guide route. The route search processing is the same as the guide route search processing shown in step 68, FIG. 7.

The guide route data MW stored in the RAM 4 are erased, and the new guide route data MW obtained at step 180 are stored in the RAM 4 (step 178). The guide route data MW that have been stored in the RAM 4 prior to the search-again processing are those of the guide route that is identified when the registered destination TP is set in the destination-setting processing (step 51) or are those of the guide route identified again in the search-again processing (step 72). This also holds true in the following description.

When the new guide route data MW are stored in the RAM 4, the search-again processing (step 72 of FIG. 7) ends and the search-again flag SF is reset to be off (step 74 of FIG. 7). Next, the guide/display processing (step 53 of FIG. 6) is executed, and a new guide route is displayed on the map picture H1. As shown, for example, in FIG. 16, a new guide road AD2 is displayed as a guide route H3, and the guide road AD1 that had been the guide route so far is erased. Here, however, the present position MP4 serves as a new start point SP of guide route, and the portion PSS at the back of the present position MP4 is not displayed.

On the other hand, when the present position does not exist on a guide road (step 162) but exists on a non-guided road (step 164), the road data of the non-guided road are read out, and the length of the route is found from the present position to a guide road connecting with the non-guided road (step 166). Here, when the road data exist for the coordinates of the present position data MP and the object of the guide flag is "0" in the road data, it is determined that the present position exists on a non-guided road. When there are a plurality of routes from the present position on the non-guided road to the guide road, the lengths of the routes are found. The length of the route from the present position to the guide road (junction) is the sum of lengths from the present position to the end point of the non-guided road or the sum of lengths from the start point of the non-guided road to the end point thereof. Furthermore, routes are searched from the junctions to the end point ED to of guide route (step 168). The route search processing is the same as the guide route search processing (step 68) illustrated in FIG. 7, and the junctions serve as start points of guide routes.

Furthermore, the total distance Ln (n=1 to n) of the identified routes is calculated. The distance Ln is the sum of the distance found at step 166 and the length of the route from the junction to the end point ED of guide route. Then, the distances Ln are compared to select the route having the shortest distance (step 172).

When the shortest route is in agreement with the guide route (step 174), there is no need to change the guide route and, hence, the guide route data MW are preserved without being changed (step 176). When the shortest route is not in agreement with the guide route (step 174), the newly found route is shorter than the guide route. Therefore, the guide route data MW stored in the RAM 4 are erased, and the road data constituting the newly found route are stored as new guide route data MW in the RAM 4 (step 178). When the search-again processing (step 72 of FIG. 7) is finished, the search-again flag SF is reset to be off (step 74 of FIG. 7).

Then, the guide/display processing (step 53 of FIG. 6) is executed, and the guide route that is identified is displayed on the map picture H1.

Figure 16:
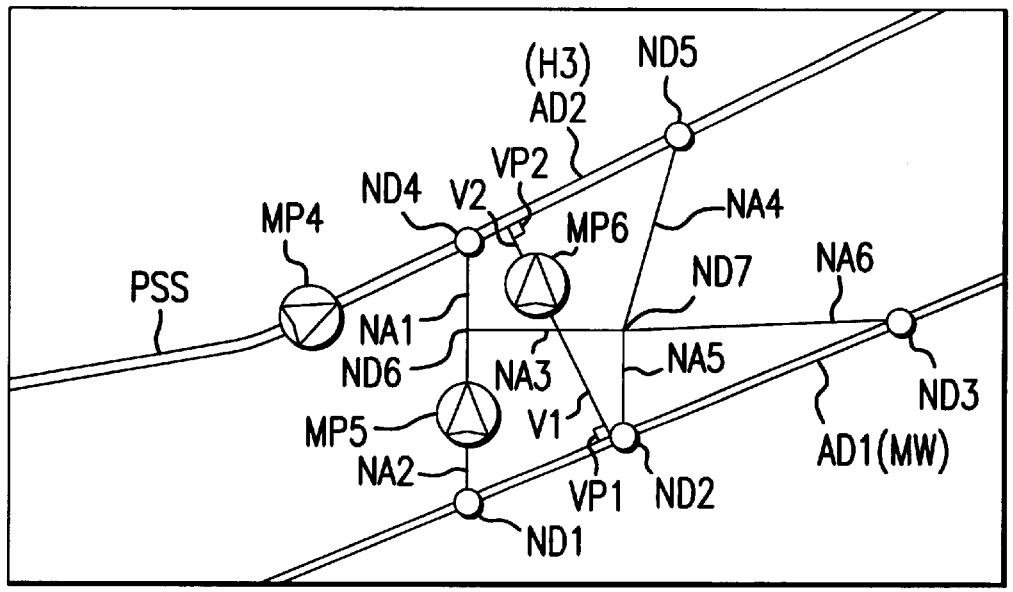
FIG. 16 illustrates the present position, guide roads and non-guided roads.

When, for example, the present position is on the non-guided road NA2 as represented by a present position MP5 in FIG. 16, the distances of routes from the present position MP5 to the junctions (intersection points) ND1 to ND5 are found (step 166). The junctions (intersection points) ND1 to ND5 are those points where the non-guided roads NA1 to NA6 meet the guide roads AD1, AD2. This processing is the same as that of the step 88 (FIG. 8) in the processing for determining the start point SP of guide route (step 64 of FIG. 7). In FIG. 16, the junctions (intersection points) ND5 to ND5 are in agreement with the nodes ND1 to ND5 of the guide roads AD1, AD2, but such is not often the case.

Figure 17:
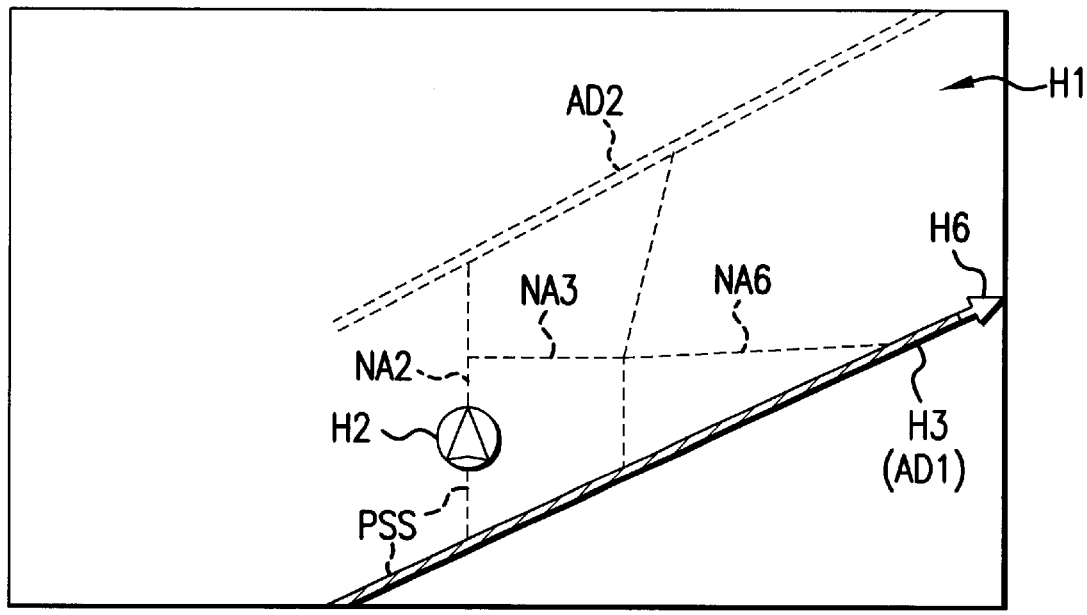
FIGS. 17 and 18 illustrate the display when the guide route is not changed in the processing for searching a route again.

The routes from the intersection points ND1 to ND5 to the end point ED of guide route are searched, the total distance Ln of these routes is calculated (step 170), and the shortest route is selected (step 172). In FIG. 16, the node closest to the present position MP5 is the node ND4. However, since the distances of the entire routes to the end point ED of guide route are compared, a point other than the node ND4 may become the start point SP of guide route. Here, if the shortest route has the node ND3 as the start point SP of guide route, the guide route H3 that was displayed prior to the search-again processing is displayed on the map picture H1 upon effecting the guide/display processing (step 53 of FIG. 6) as shown in FIG. 17. Although the non-guided roads NA1 to NA6 are not displayed, the guide route H3 moves as the car runs on the non-guided road, i.e., as the present position moves and, hence, the driver arrives at the guide route H3. In FIG. 17, and in the other drawings, the solid lines only are shown on the display 3. The broken lines are not shown.

Figure 18:
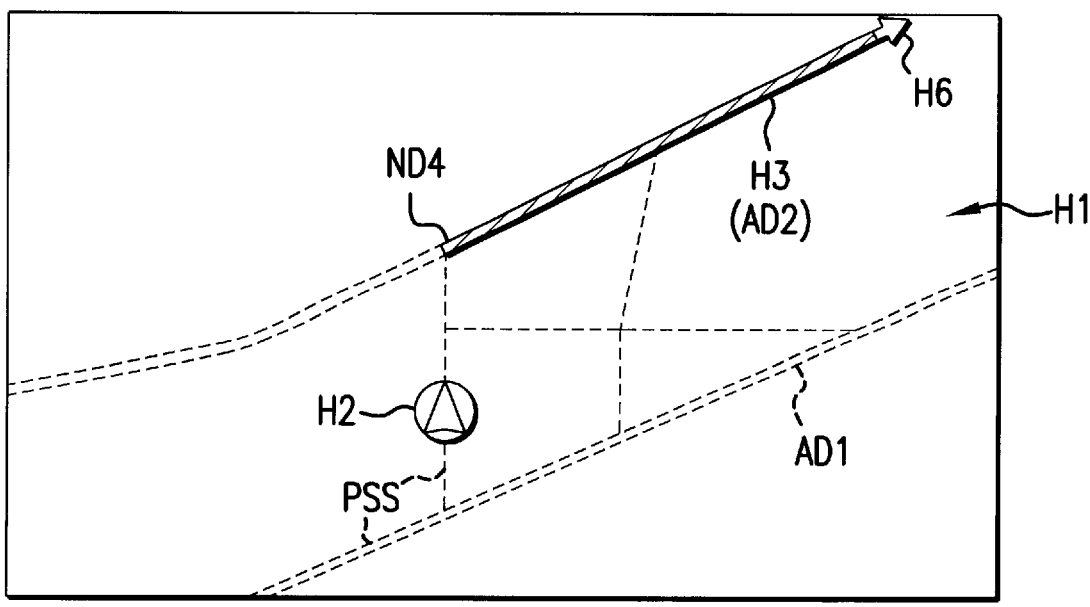

When the shortest route has the node ND4 as the start point of route, furthermore, the map picture H1 displayed upon effecting the guide/display processing (step 53 of FIG. 6) displays the guide road AD2 having the node ND4 as a guide route H3 as shown in FIG. 18. The guide route (guide road AD1) that had been displayed prior to the search-again processing is erased.

When the present position does not exist on a non-guided road (step 164), on the other hand, the coordinates of the start point or node on a guide road at the shortest distance from the present position are found (step 182). In this case, the present position is not contained in the road data but exists, for example, at the site of a facility, a parking lot or a vacant lot. The coordinates of the start point or node on the guide road at the shortest distance from the present position are found (step 182). Step 182 executes the same processings as those of the steps 86 to 92 of FIG. 8.

When, for example, the present position does not exist on a non-guided road, as represented by a present position MP6 in FIG. 16, the coordinates of nodes ND1, ND2, ND4, ND5 on the guide roads AD1, AD2 within a predetermined distance from the present position MP6 are found. Then, straight distances from the present position MP6 to the nodes ND1, ND2, ND4 and ND5 are found based upon the differences between the coordinates of the present position MP6 and the coordinates of the nodes ND1, ND2, ND4, ND5, and the node ND4 at the shortest distance is selected. As the present position MP6 does not exist on a non-guided road, the node ND4 at the shortest distance may be regarded as the start point SP of guide route irrespective of the direction of progress of the car, or nodes opposite to the direction of progress of the car may be excluded from the candidates for the start points of guide routes.

Next, the distance Lb of the entire route from the present position to the end point ED of guide route, passing through the node ND4 and the guide road AD2, is found. The route search processing is the same as the guide route search processing (step 68 of FIG. 7), and the node ND4 is used as the start point SP of guide route. The distance Lb of the entire route is the sum of the distance from the present position to the node ND4 found at the step 182 and the distance from the node ND4 to the end point ED of guide route.

Next, the coordinates of the start point or node on the guide route MW at the shortest distance from the present position MP6 are found (step 190). In FIG. 16, the coordinates of the node ND2 on the guide road AD1 which is part of the guide route MW are found. Then, a distance La from the node ND2 to the end point ED of guide route is determined (step 192). The distance La has been calculated already at step 68 (of FIG. 7) and has been stored in the RAM 4 together with the coordinate date of the node ND2.

The distance La is compared with the distance Lb and, when Lb<La (step 194), the guide route is changed into a route that uses the guide road AD2 (step 178). This is because the route including the guide road AD2 having the present position MP6 is shorter than the initially selected guide route MW to arrive at the end point. Thus, the road data of the route identified at step 184 are stored as new guide route data MW in the RAM 4. In this case, the picture on the display 33 is the same as that of FIG. 18. On the other hand, when Lb≧La at step 194, the guide route MW is not changed (step 176). This is because the initially selected guide route MW is shorter than the route that includes the guide road AD2 to arrive at the end point. In this case, the picture on the display 33 is the same as that of FIG. 17.

When the present position exists on the non-guided road, a point at the shortest distance from the present position MP6 to the guide roads AD1, AD2 may be found. This processing is based upon the lengths of perpendiculars V1, V2 drawn to the guide roads AD1, AD2 from the present position MP6, and the coordinates of intersection points VP1, VP2 where the perpendiculars V1, V2 meet the guide roads AD1, AD2. This processing is the same as the processing for determining the start point of guide route at the present position MP3 shown in FIG. 9. The start point of guide route closer to the present position than the above-mentioned start point or node.

11. Another Route Search Processing

Figure 19:
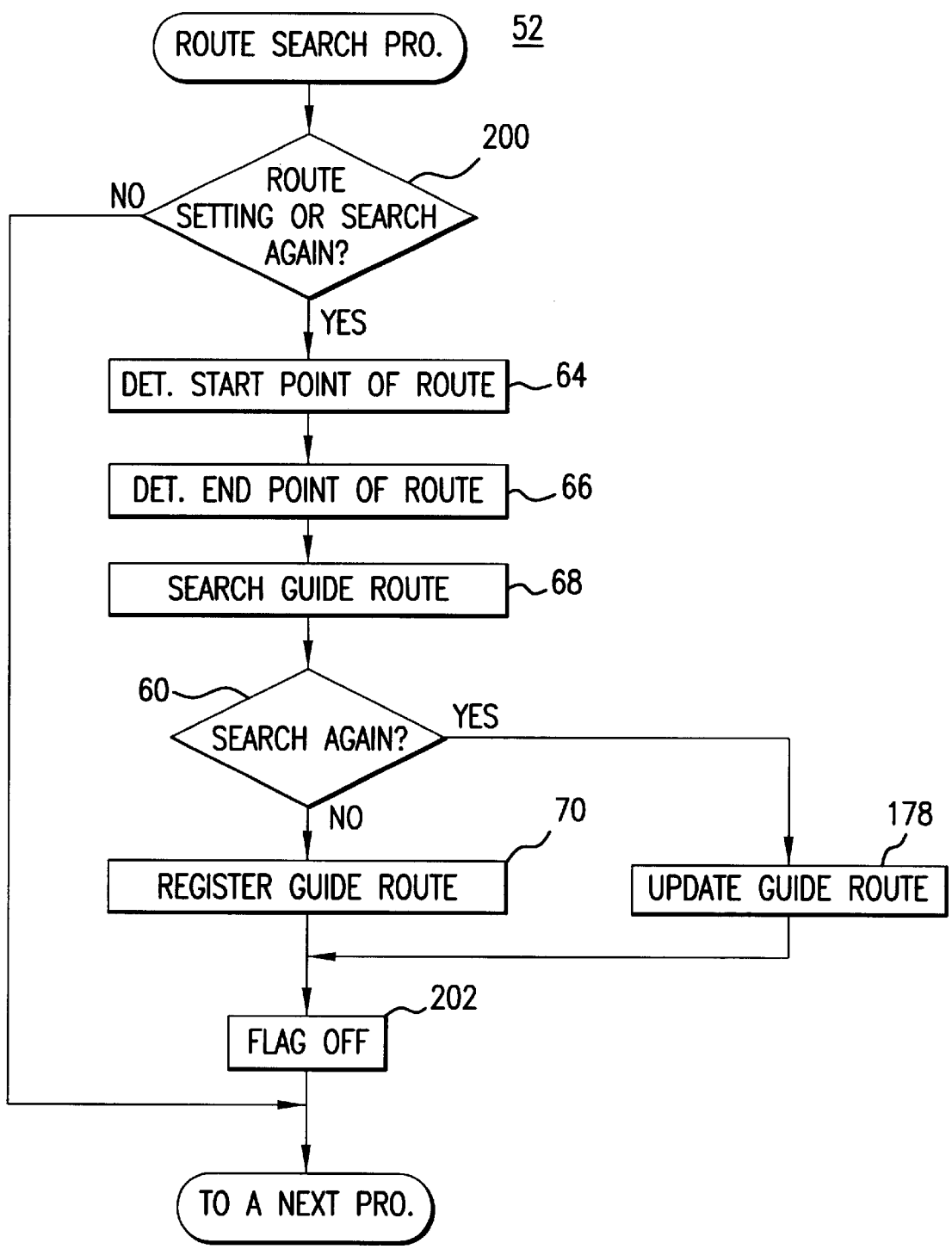
FIG. 19 is another flowchart of the processing for searching a route.

FIG. 19 is a flowchart illustrating another route search processing (step 52 of FIG. 6). In FIG. 19, the steps having the same reference numerals as those of FIGS. 7 and 15 execute the same processings. This processing is started when the route set flag KF or the search-again flag SF is on (step 200). The new guide route is set through the same processing as the route search processing (step 52 of FIG. 6) shown in steps 64, 66, 68, 70 of FIG. 7. Thereafter, the route set flag KF is reset to be off (step 202). Even when the search-again processing is requested, the guide route is searched again by the processing for determining the start point SP of guide route (step 64), processing for determining the end point ED of guide route (step 66) or guide route search processing (step 68). Therefore, the search-again processing (step 72) of FIG. 15 is not executed.

In the case of search again (YES at step 60), the guide route data MW stored in the RAM 4 are changed over to the newly identified route data (step 178). Here, the guide route that is identified again is started from the start point SP of guide route that is newly determined. Therefore, even when the route that is identified again is the same as the route before the search-again processing, the start point SP of guide route H3 displayed on the map picture H1 is changed to a new start point SP of guide route. Then, the search-again flag SF is reset to be off (step 202).

As described above, since the processing for setting a new guide route and the search-again processing comprise a common processing, the program for processing can be simplified. For example, when the present position does not exist on a guide road, there is no need to find the total length from the present position to the end point of guide route passing through the points on the guide road and there is no need to compare the lengths unlike those executed in the processing of FIG. 16.

12. Another Search-Again Processing

Figure 20:
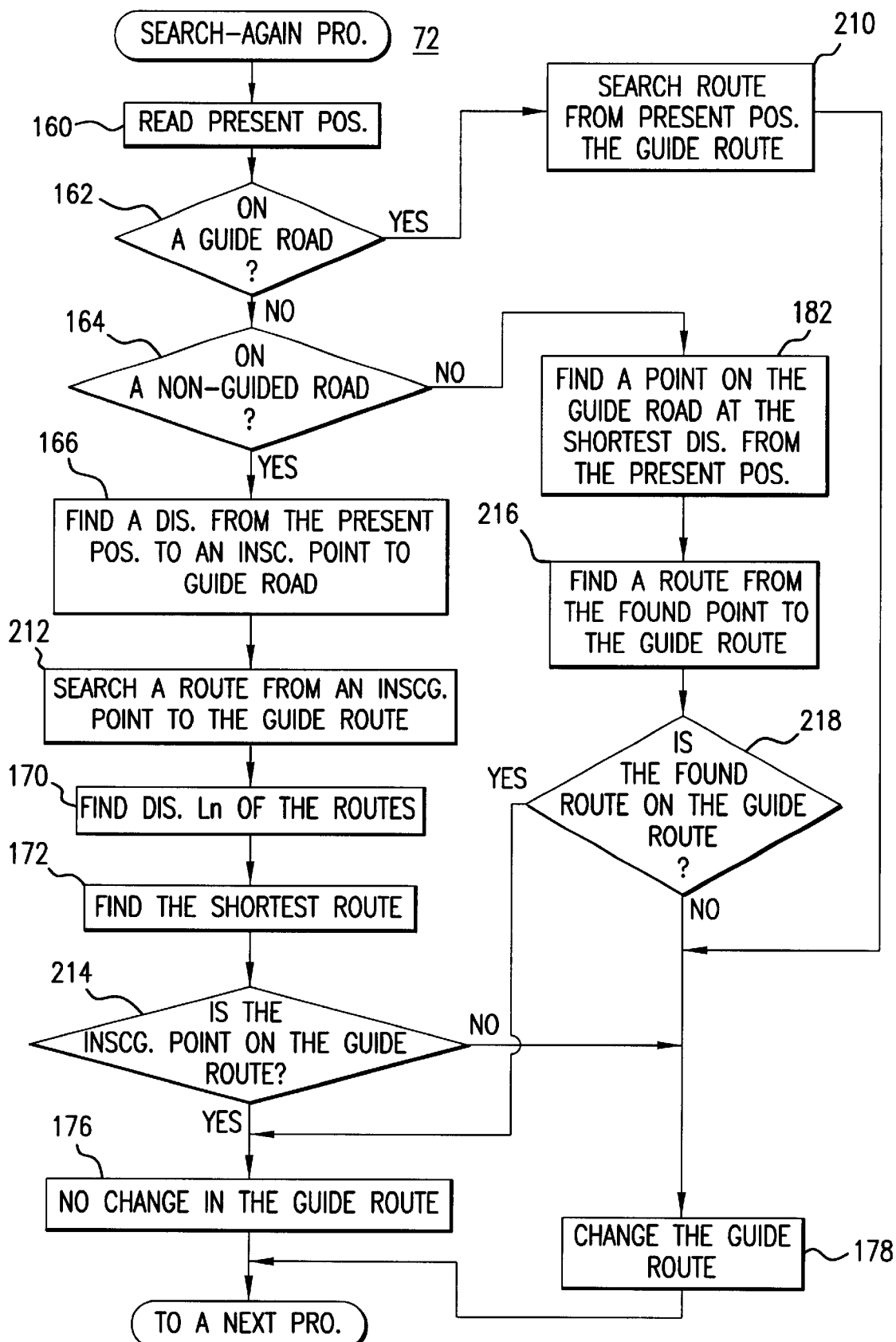
FIG. 20 is a flowchart of the processing for searching a route again.

FIG. 20 is a flowchart illustrating another search-again processing (step 72 of FIG. 7). In FIG. 20, the steps having the same reference numerals as those of FIG. 15 execute the same processings. In the search-again processing shown in FIG. 15, when the present position deviates from the guide route, the entire route is searched from the present position or from a point on a guide road near the present position up to the end point ED of guide route (steps 168, 180, 184 of FIG. 15). In the search-again processing shown in FIG. 20, on the other hand, a route is identified returning back to the initial guide route from the present position or from a point on the guide road near the present position.

When the present position is on a guide road (YES at a step 162), a route is identified from the present position to the guide route (step 210). Here, the guide route is the one stored in the RAM 4 and represented by the guide route data MW. At the step 210, the road data from the present position up to the end point ED of guide route are successively identified and connected until the road data in the guide route data MW are hit. Then, the guide route data MW stored in the RAM 4 are erased, and the guide route data MW that are newly identified are stored in the RAM 4 (step 178).

When the present position is on a non-guided road (YES at a step 164), the lengths of routes from the present position to the junctions with a guide road are found (step 166), and routes are identified from the junctions to the guide route (step 212). As described earlier, the junction is an intersection point where the non-guided road having the present position meets a guide road. At step 212, the road data from the junctions to the end point ED of guide route are successively identified and connected until the road data in the guide route data MW are hit. The distances Ln of the routes that are found are calculated (step 170), and the shortest distance Ln is selected (step 172).

When the junction of the thus selected shortest distance exists on the guide route (step 214), the guide route need not be changed, and the guide route data MW stored in the RAM 4 are preserved without being changed (step 176). When the junction does not exist on the guide route (step 214), on the other hand, the initial guide route data MW are changed into the newly identified route data (step 178) because the newly identified route is more advantageous than the initial guide route.

When the present position does not exist on a non-guided road (NO at the step 164), a point on a guide road at the shortest distance from the present position is found (step 182), and a route from the point that is found to the guide route is identified (step 216). At step 216, the road data are successively identified from the point at the shortest distance found at step 182 to the end point ED of guide route and are connected until the road data in the guide route data MW are hit.

When the point at the shortest distance found at the step 182 does not exist on the guide route (step 218), the guide route data stored in the RAM 4 are replaced by the route data found at the step 216 (step 178). On the other hand, when the point at the shortest distance found at the step 182 exists on the guide route (step 218), there is no need to change the guide route, and the guide route data MW stored in the RAM 4 are preserved without being changed (step 176). At step 182, as in the case of FIG. 15, perpendiculars may be drawn from the present position to the guide roads, and the point at the shortest distance from the present position may be selected as the start point of guide route from the intersection points where the perpendiculars meet the guide roads.

In searching the route again up to the destination as described above, a route is identified that arrives at the initial guide route from the present position or from a point on the guide road near the present position. Therefore, this processing is easier and quicker than the processing for searching again the entire route up to the end point ED.

13. Search-Again Processing Depending on the Direction of Progress of the Car

In the above-mentioned embodiment, a point on the guide road near the present position is identified and a route is identified from this point to the end point ED of guide route or to the guide route when the present position deviates from the guide route and does not exist on the guide road. Here, when the point on the guide road is in the opposite direction to the direction of progress of the car, the operator must make a U-turn with his/her car. It is therefore desired to select a point in the same direction as the direction of progress. Therefore, the processing shown in FIG. 21 is executed instead of step 166 of FIGS. 15 or 20 and the processing shown in FIG. 22 is executed instead of step 182. In FIG. 22, the steps having the same reference numerals as the steps of FIG. 21 execute the same processings.

In FIGS. 15 and 20, when the present position exists on a non-guided road that deviates from the guide route, a junction on a guide road is identified from the present position (step 166 in FIGS. 15, 20). The junction is an intersecting point where the non-guided road having the present position arrives at the guide road. When the present position does not exist on a non-guided road, a point on the guide road at the shortest distance form the present position is identified (step 182 in FIGS. 15, 20). In this embodiment, a search area is set by taking the direction of progress of the car into consideration when the junction or the point is to be identified.

Referring to FIG. 21, when the present position exists on a non-guided road, at step 164 of FIGS. 15 and 20, the relative direction angle data θ, representing the direction of progress of the car, is read from the RAM 4 by the CPU 2 (step 220), and the present position data MP of the car is read from the RAM 4 by the CPU 2 (step 222). Then, a search area is set based upon the direction of progress of the car. The search area is within a circle of a predetermined radius with a point at a predetermined reference distance ahead of the car as a center, within a fan shape of a predetermined reference angle ahead of the car, or within a range of a combination thereof.

When a junction to the guide road and a route from the present position to the junction exist in the thus set search area (step 228), the length of the route is found from the present position to the junction (step 230). The processing of step 230 is the same as the processing for finding a distance to the junction (intersection point) executed at step 166 in FIG. 15. The route proceeds to step 168 of FIG. 15 or to step 212 of FIG. 20.

When the junction does not exist in the search area, on the other hand, the search area is changed (step 232). In changing the search area, the reference distance or the reference angle is increased, that is, the radius of the circle or the fan shape is increased, whereby the search area is increased. It is then determined whether a change in the search area reaches a predetermined limit (step 234). It is not possible to expand the search area infinitely, i.e., the search area has a predetermined limit. When the search area has not reached the limit, the junction, if within the search area, is identified (step 226). Searching for the junction is continued while expanding the search area until the limit is reached or the junction found (steps 226, 228, 232, 234).

When the search area has reached the limit, on the other hand, the display 33 displays guidance indicating that a guide road has not been identified or suggesting the driver to return to the guide route. The guidance may also be provided by voice (step 235). In this case, the search-again processing 72 ends, and the routine proceeds to step 74 of FIG. 7. Accordingly, the driver is informed of the fact that he will not be able to arrive at the destination by driving his car along this route.

Referring to FIG. 22, furthermore, when the present position does not exist on the non-guided road at step 164 of FIGS. 15 and 20, the relative direction angle data θ representing the direction of progress of the car and the present position data MP of the car are read out from the RAM 4 by the CPU 2 (steps 220, 222), and a search area is set (step 224).

Next, a guide road is searched (step 240) within the search area set at step 224, and it is determined whether there is a guide road in the search area (step 242). When there is a guide road within the search area, a point on the guide road at the shortest distance from the present position is found (step 244). The processing at step 244 is the same as the processing at the step 182 of FIG. 15. The routine then proceeds to step 184 of FIG. 15 or to step 216 of FIG. 20.

When there is no guide road in the search area, on the other hand, the search area is changed (step 232), and it is determined whether changing the search area reaches the limit (step 234). When the search area has not reached the limit, an attempt to identify the guide road is again made (step 240), and process is repeated while enlarging the search area until the limit is reached or the guide road identified (steps 240, 242, 232, 234). When the search area has reached the limit, on the other hand, the display 33 displays that the guide route cannot be identified, or informs the operator of this by voice (step 236). The search-again processing (step 72) ends, and the routine proceeds to step 74 of FIG. 7.

14. Search Area-Setting Processing and Search Area-Changing Processing

Figure 23:
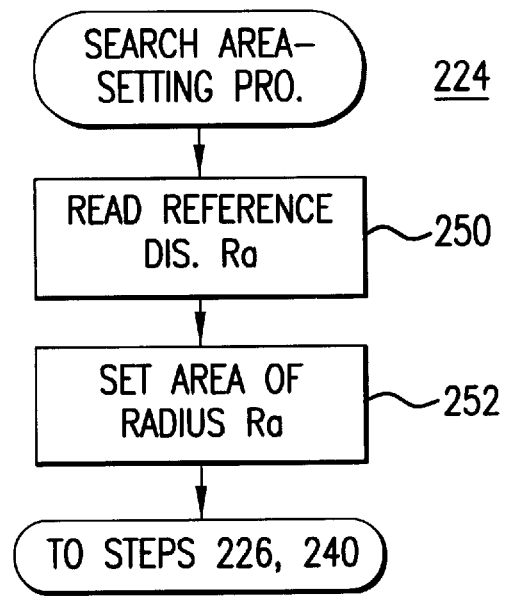
FIG. 23 is a flowchart of the processing for setting a search area.
Figure 62:
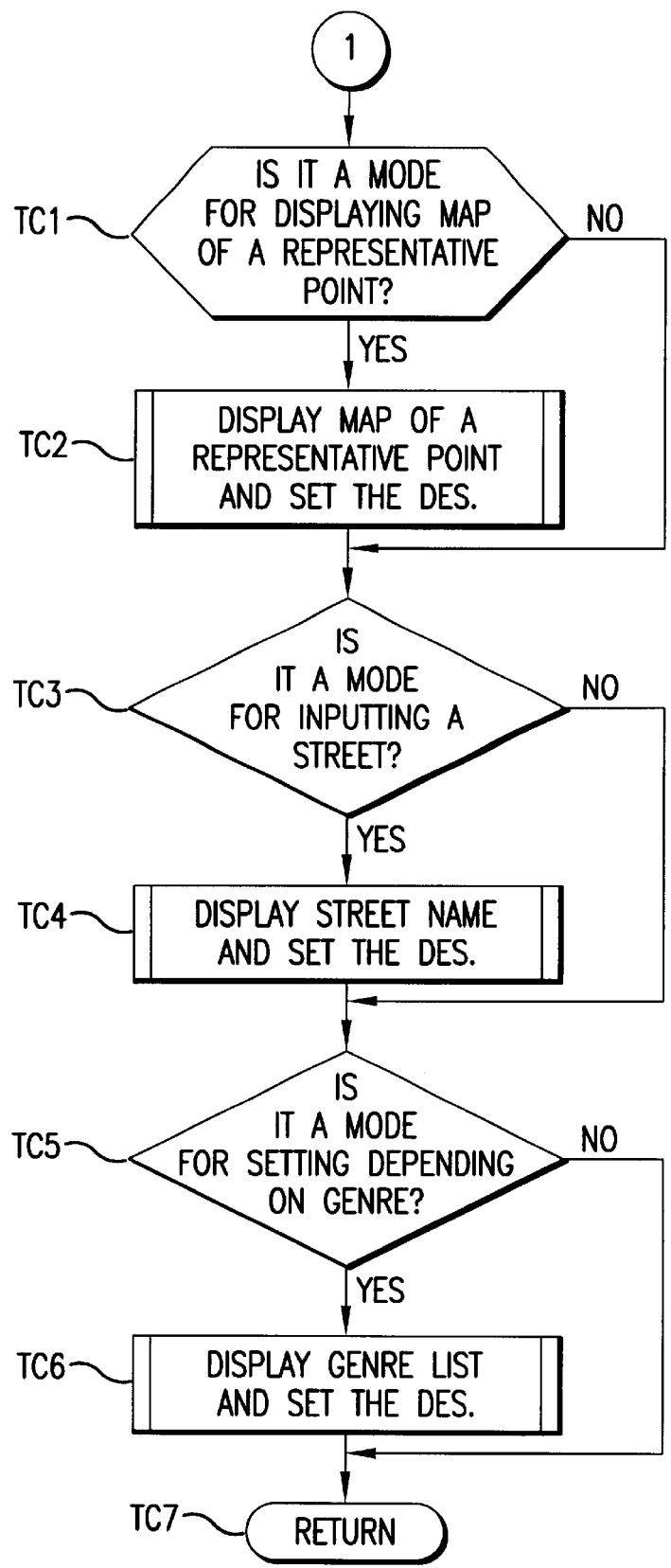

FIG. 23 illustrates the search area-setting processing (step 224 of FIG. 62). First, the reference distance data Ra are read from the RAM 4 by the CPU 2 (step 250). Then, coordinates of a position ahead of the car by the reference distance Ra are found, and a circular search area of the radius of Ra is set with the above position as a center (step 252). The routine proceeds to step 226 (FIG. 21) or step 240 (FIG. 22).

Figure 25:
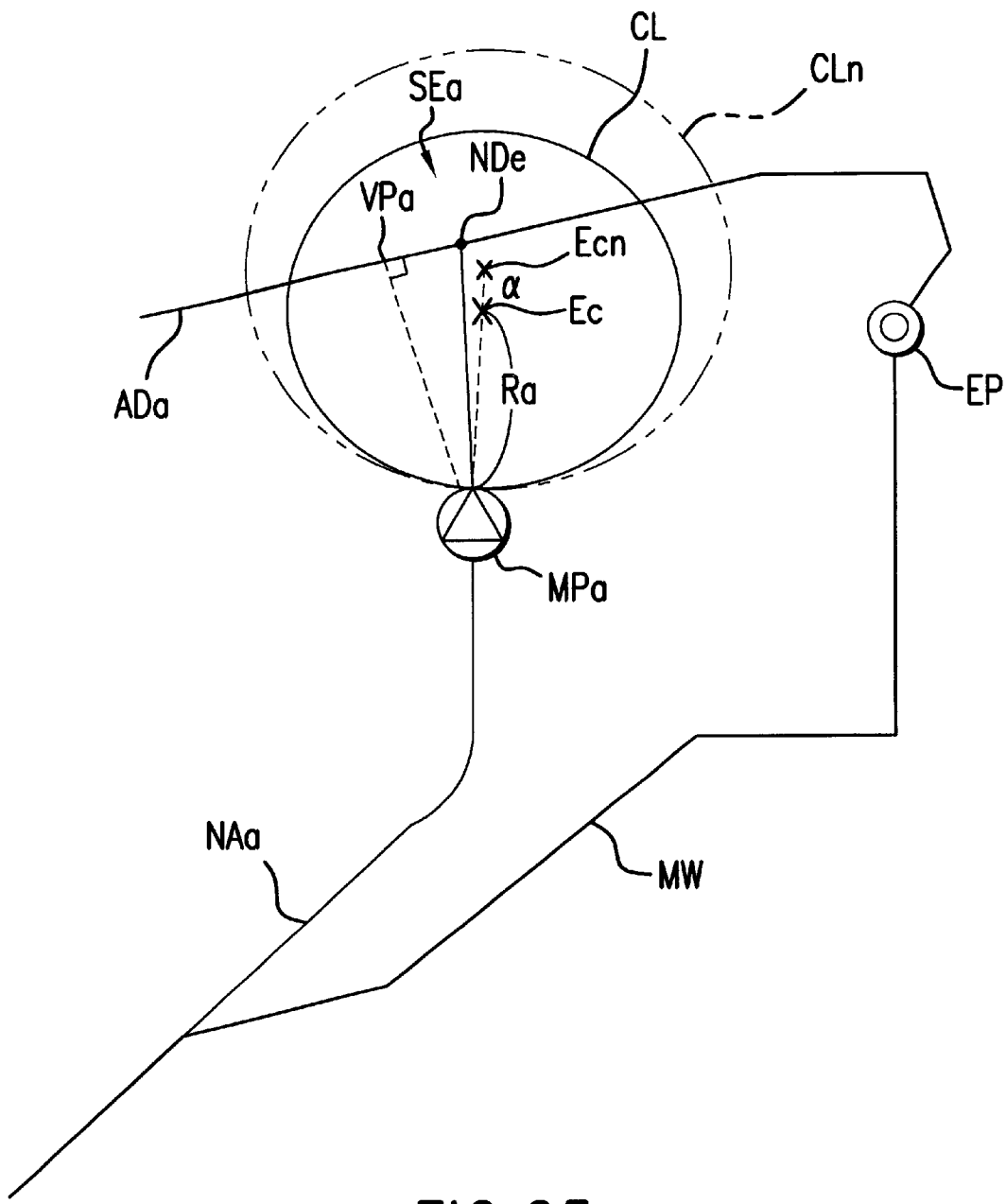
FIG. 25 illustrates an example of setting and changing a search area.

In an example shown in FIG. 25, the present position is on a non-guided road NAa and deviates from the guide route MW. The direction of progress of the car is headed upwards. In this example, a point Ec ahead of the present position MPa in the direction of progress by the reference distance Ra is identified (step 250). A circle CL, of the radius Ra, is set with the point Ec as a center, and the inside of the circle CL is set to be the search area SEa (step 252). An intersection point (junction) NDe, where the non-guided road NAa meets the guide road Ada, exists in the search area SEa and, hence, a distance is found from the present position to the intersection point NDe (step 230 in FIG. 21). The route is identified from the intersection point NDe to the end point ED of guide route (step 168 in FIG. 15), or the route is identified from the intersection point NDe to the guide route MW (step 212 in FIG. 20).

Alternatively, when the present position exists on a non-guided road, as in the example of FIG. 25, a point VPa on the guide road ADa at the shortest distance from the present position MPa is found (step 244 in FIG. 22) as the guide road ADa passes through the search area SEa. Then, a route is identified from the point VPa at the shortest distance to the end point ED of guide route (step 184 in FIG. 15), or a route is identified from the point VPa to the guide route MW (step 216 in FIG. 20).

When the present position deviates from the route, the processing is executed to search again a new route. First, it is determined whether the present position of the car is on a guide road, and a node closest to the present position is identified. In this case, a perpendicular is drawn from the present position to the guide road, a node (NDe) closest to an intersection point (VPa) where the perpendicular meets the road is then regarded as a start point SP of guide route, and a route to the destination is identified. Furthermore, the start point SP of guide route is determined depending upon the direction of progress. In this case, the nodes opposite to the direction of progress are excluded, the nodes along the direction of progress are identified, and a better route is guided enabling the driver to avoid a cumbersome U-turn.

Figure 24:
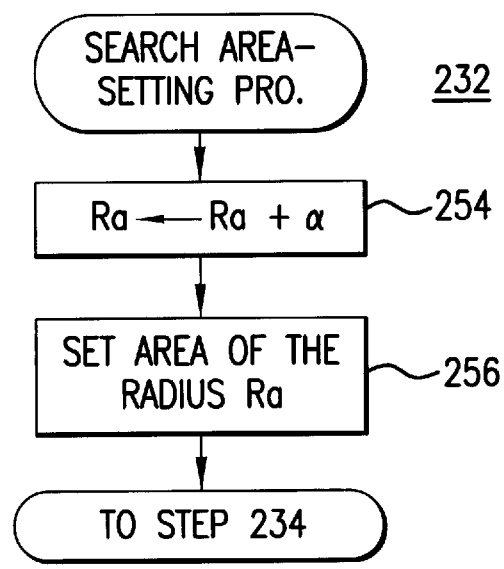
FIG. 24 is a flowchart of the processing for changing the search area.

FIG. 24 is a diagram illustrating the search area-changing processing (step 232 of FIG. 22). First, the reference distance Ra is increased by a predetermined increment $\alpha$ each iteration (step 254), and the search area of the radius of reference distance Ra (=Ra+$\alpha$) increased by $\alpha$ is set (step 256). In the example of FIG. 25, a circle CLn having the radius Ra (=Ra+$\alpha$) is formed with a point Ecn ahead of the present position MPa by a distance Ra (=Ra+$\alpha$) as a center, and the inside of the circle CLn is set to be a new search area SEa.

When neither a junction (intersection point) where the non-guided road meets a guide road nor a guide road exists in the search area SEa, the radius of the search area SEa is increased by $\alpha$ each iteration (step 254). The increment $\alpha$ may assume any value. When the increment $\alpha$ is a small value, the search area SEa is increased little by little. In this case, a point on the guide road that first appears on the expanding search area SEa is regarded to be the start point SP of a new route.

Figure 26:
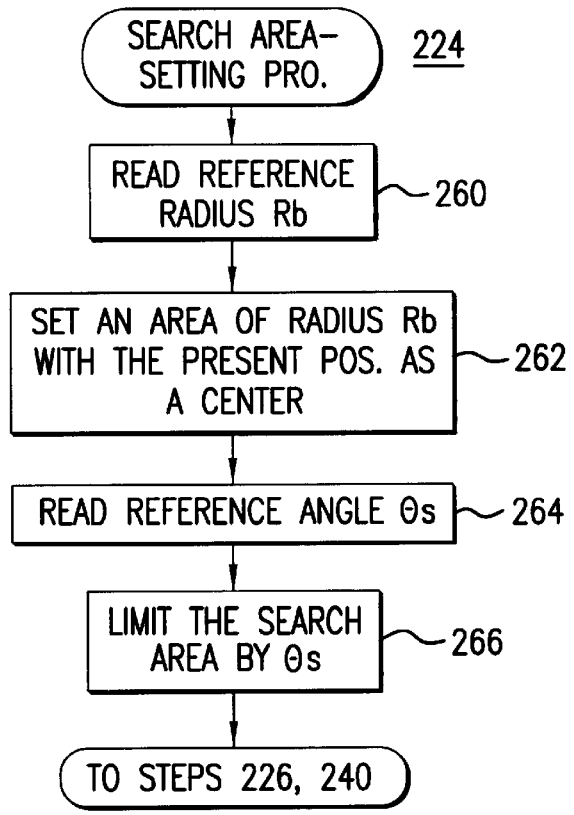
FIG. 26 is a flowchart of another processing for setting a search area.

FIG. 26 illustrates a further search area-setting processing (step 224 of FIG. 22). First, the reference radius data Rb are read from the RAM 4 by the CPU 2 (step 260), and a circle of radius Rb is set with the present position as a center (step 262). Next, a reference angle $\theta$s is read (step 264), a fan shape with the reference angle $\theta$s as a center angle is set from the circle of the radius Rb, that is, the reference $\theta$s/2 is set to either side of the direction of progress of the car, and the inside of the fan shape is set to be the search area (step 266).

Figure 28:
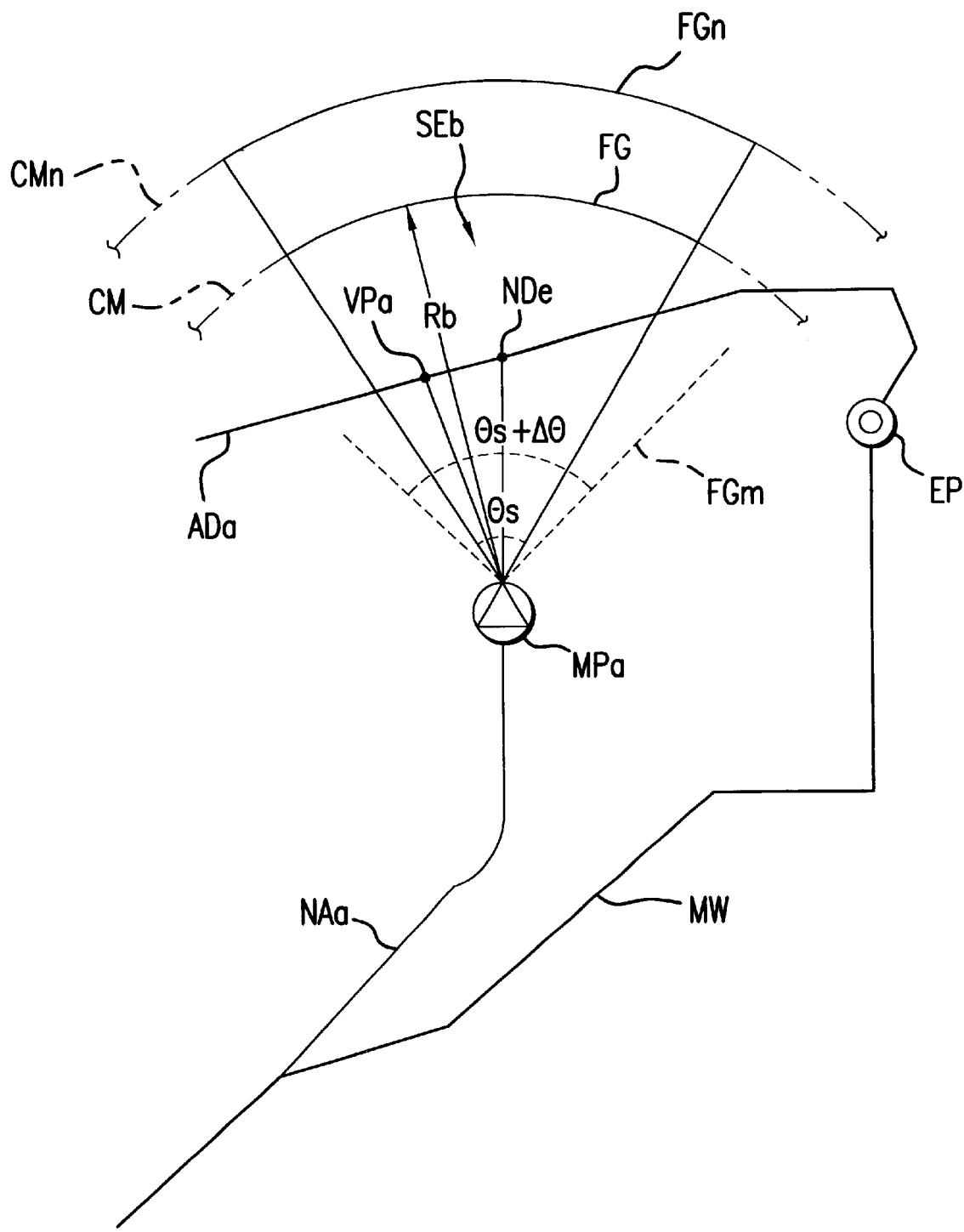
FIG. 28 is an example for setting and changing the search area.

In the example shown in FIG. 28, the present position MPa exists on a non-guided road NAa and deviates from the guide route MW. The direction of progress of the car is headed upwards. In this case, a circle CM of the radius Rb is set with the present position MPa as a center (step 262), a fan shape FG having a center angle $\theta$s is set, and the inside of the fan shape FG is set to be the search area SEb (step 266). In FIG. 28, the intersection point NDe where the non-guided road NAa meets the guide road ADa exists in the search area SEb and, hence, a distance is found from the present position to the intersection point NDe (step 230 in FIG. 21). Then, a route is searched from the intersection point NDe to the end point ED of guide route (step 168 in FIG. 15) or a route is searched from the intersection point NDe to the guide route MW (step 212 in FIG. 20).

Alternatively, when the present position exists on a non-guided road, the point VPa on the guide road ADa at the shortest distance from the present position MPa is found (step 244 in FIG. 22) since the guide road ADa, in the example of FIG. 25, is passing through the search area SEb. Then, a route is searched from the point VPa to the end point ED of guide route (step 184) in FIG. 15 (or a route is searched from the point VPa to the guide route Mw (step 216 of FIG. 20).

Figure 27:
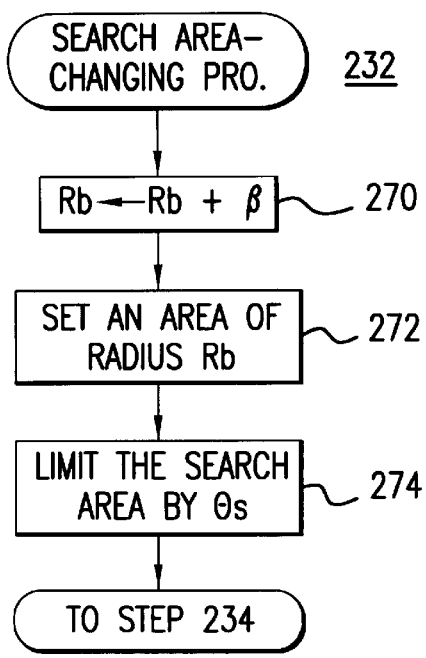
FIG. 27 is a flowchart of another processing for changing the search area.

FIG. 27 illustrates a further search area-changing processing (step 232). The processing is executed in combination with the search area-setting processing of FIG. 26. First, the reference radius Rb is increased by a predetermined increment $\beta$ each iteration (step 270). A circle of the reference radius Rb (=Rb+$\beta$) which is increased by $\beta$ is set with the present position as a center (step 272).

In the example of FIG. 28, a circle CMn of the radius Rb (=Rb+$\beta$) is found with the present position MPa as a center (step 272), a fan shape FGn having the center angle $\theta$s is determined from the circle CMn, and the inside of the fan shape FGn is set to be a new search area SEb (step 274). When neither a intersection point where the non-guided road meets a guide road nor a guide road exists in the search area SEb, the radius of the search area SEb is increased by $\beta$ each iteration (step 270). The increment $\beta$ may assume any value. When the increment $\beta$ has a small value, the search area SEb is increased little by little. In this case, the point on a guide road appearing first on the expanding search area SEb serves as the start point SP of a new route.

Figure 29:
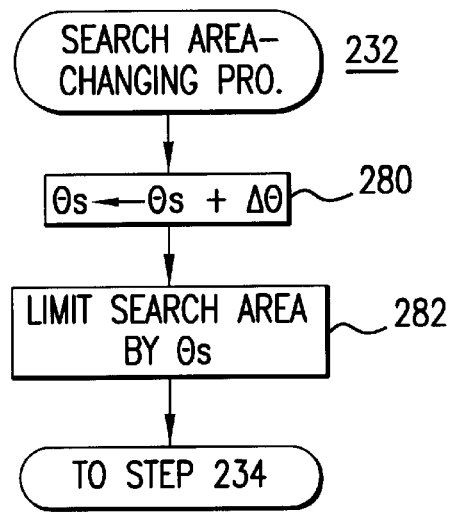
FIGS. 29 to 31 are flowcharts illustrating other processings for changing the search area.

FIG. 29 is a diagram illustrating still another search area-changing processing (step 232 of FIG. 22). This processing is executed together with the search area-setting processing of FIG. 26. First, the reference angle $\theta$s is increased by a predetermined increment $\Delta\theta$ each time (step 280), a fan shape having a center angle $\theta$s+$\Delta\theta$ is found from a circle of radius Rb set at step 262 of FIG. 26, and the inside of the fan shape is set to be a new search area SEb (step 282).

In the example of FIG. 28, a circle CM of the radius Rb with the present position MPa as a center is found (step 262 in FIG. 26), a fan shape FGm having the center angle $\theta$s(=$\theta$s+$\Delta\theta$) is found from the circle CM, and the inside of the fan shape FGm is set to be a new search area SEb (step 282). When neither an intersection point where the non-guided road meets a guide road nor a guide road exists in the search area SEb, the center angle $\theta$s of the search area SEb is increased by $\Delta\theta$ each iteration (step 280). The increment $\Delta\theta$ may assume any value. When the increment $\Delta\theta$ has a small value, the search area SEb is expanded little by little. In this case, a point on a guide road appearing first on the expanding search area SEb serves as the start point SP of a new route.

Figure 30:
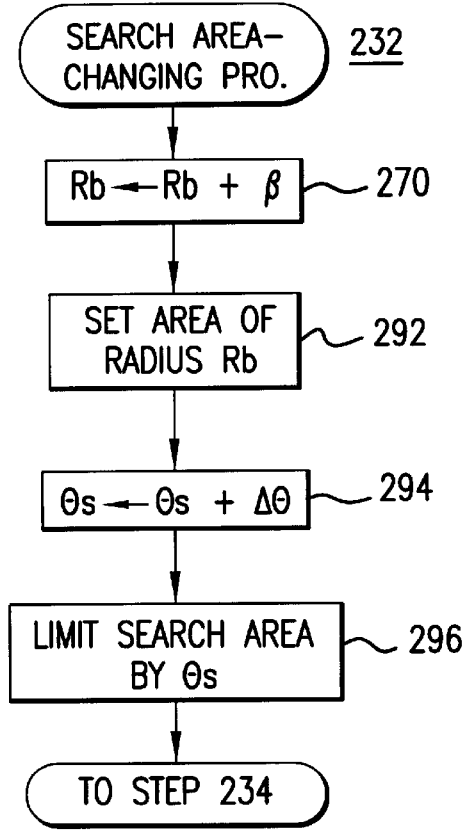

FIG. 30 is a diagram illustrating a yet further search area-changing processing (step 232 of FIG. 22). This processing, too, is executed together with the search area-setting processing of FIG. 26. This processing is a combination of the processing of FIG. 27 and the processing of FIG. 29, i.e., the operation for increasing the reference radius Rb by the increment $\beta$ each iteration (step 290) and the operation for increasing the reference angle $\theta$s by an increment $\Delta\theta$ each iteration (step 294). A circle having a reference radius Rb (=Rb+$\beta$) increased by $\beta$ is set with the present position as a center (step 292), a fan shape having a center angle θs+Δθ is found from the circle of the radius Rb (=Rb+β), and the inside of the fan shape is set to be the new search area SEb (step 296).

When neither an intersection point where the non-guided road meets a guide road nor a guide road exists in the search area SEb, the radius of the search area SEb is increased by β each iteration (step 290), and the center angle θs is increased by Δθ each iteration (step 294). Every iteration when the search area-changing processing (step 232) is executed, either the processing for increasing the reference radius Rb (step 290 or 292) or the processing for increasing the center angle θs (step 294 or 296) may be executed once or a plurality of times alternatingly.

Figure 31:
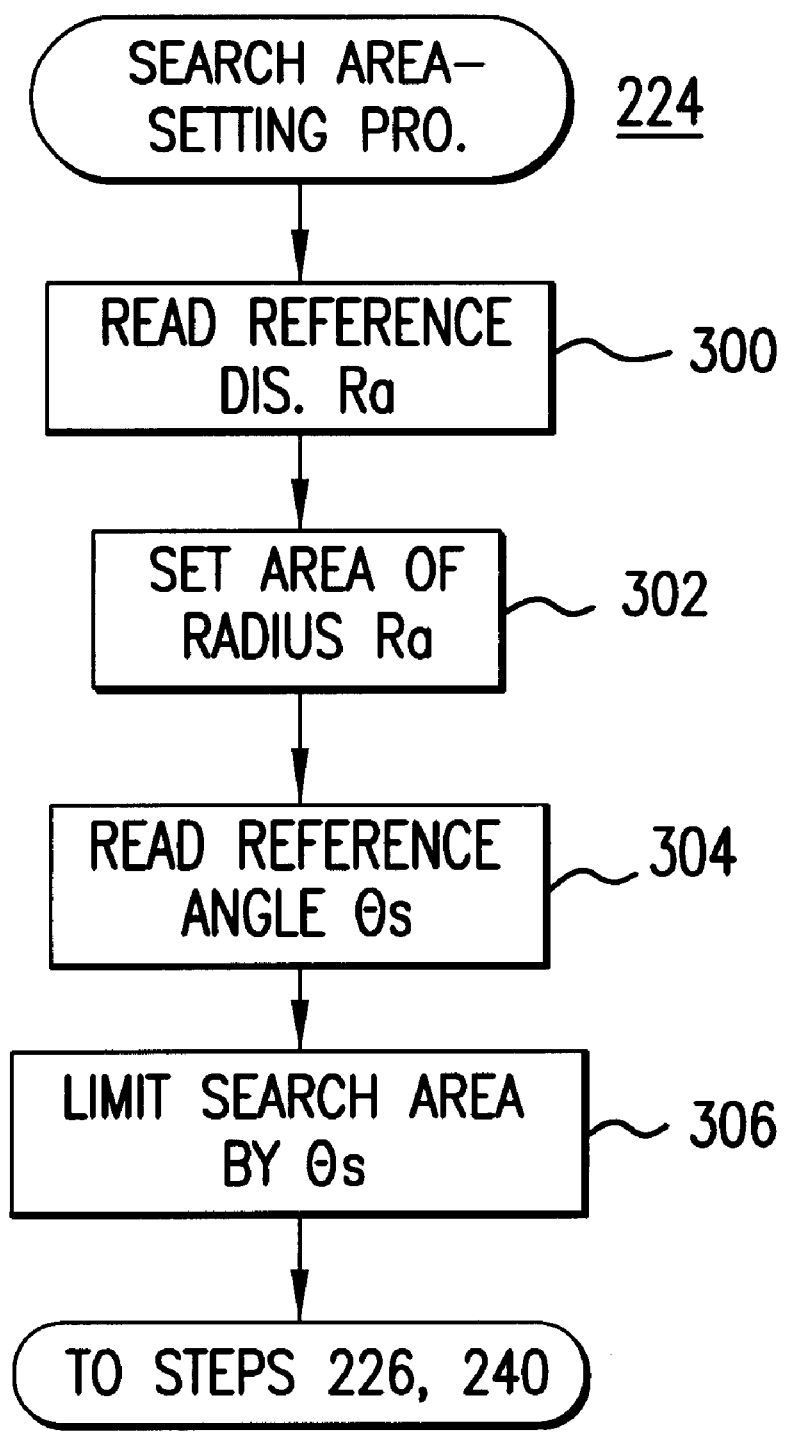

FIG. 31 illustrates a yet further search area-setting processing (step 224). The processing is a combination of the processing of FIG. 23 and the processing of FIG. 26. First, the reference distance data Ra are read from the RAM 4 by the CPU 2 (step 300), coordinates of a position ahead of the car by the reference distance Ra are found, and a circle having the radius Ra is set with the coordinates as a center (step 102). A reference angle θs is read (step 304), the circle is cut to create a fan shaped sector which has the reference angle θs as the center angle, and the range so defined becomes the search area (step 306).

Figure 32:
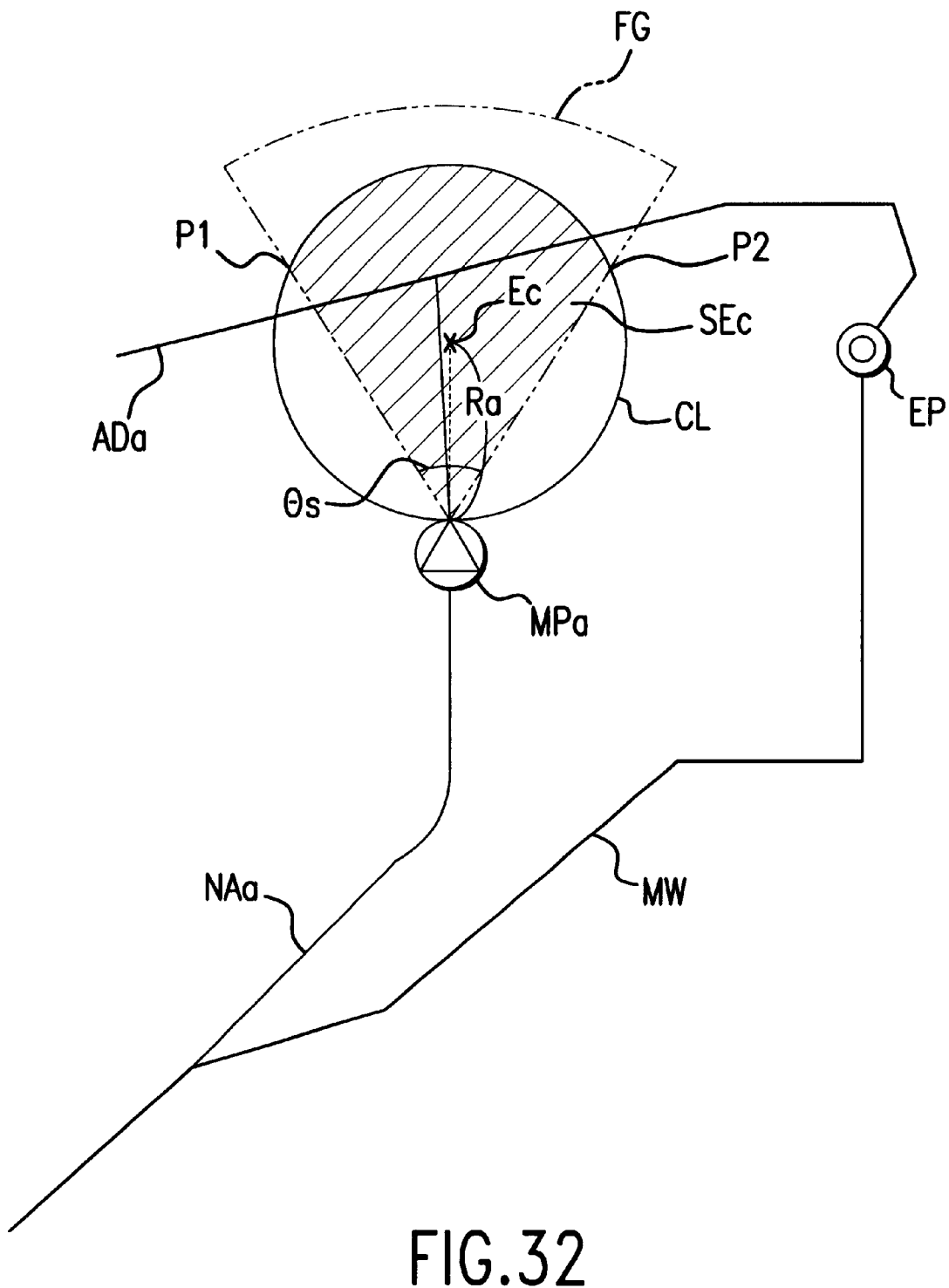
FIG. 32 is a further example for setting a search area.

In an example of FIG. 32, the present position MPa existing in the non-guided road NAa deviates from the guide route MW. The direction of progress of the car is headed upwards. In this example, a point Ec ahead of the present position MPa in the direction of progress by the reference distance Ra is found, and a circle CL of the radius Ra is set with the point Ec as a center (step 302). A fan shape Fg having a center angle θs is set, with an angle θs/2 on either side of the direction of progress, and the overlapping area of the fan shape FG and the circle CL becomes the search area SEc (step 306).

In step 306, as shown in FIG. 26, the fan shape FG of the reference radius Rb is found as shown in FIG. 31, a range overlapped by the circle CL is calculated, or points P1 and P2, where two radii defining the center angle θs intersect the circle CL are found, and a range is found that is surrounded by these two straight lines and the arc connecting the point P1 to the point P2. Thus, the search area-changing processing (step 232 of FIG. 22) in this case is a combination of any one of the processings of FIGS. 24, 27, 29 and 30 or the processing of FIG. 24 with any one of the processings or FIGS. 27, 29 and 30.

Figure 33:
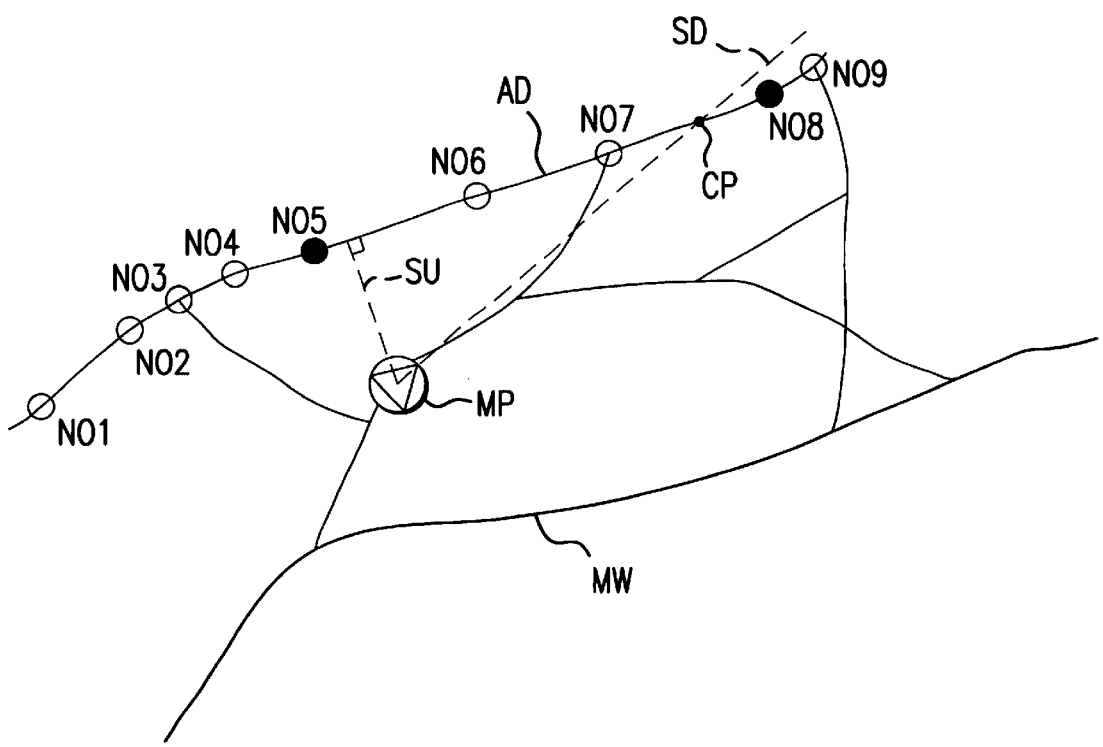
FIG. 33 is illustrates further processing for searching a route again.

In searching the route again, when the present position that is detected is not on a guide road, a perpendicular SU is drawn, as shown in FIG. 33, from the present position MP to the guide road AD, a node NO5 closest to the intersection point where the perpendicular meets the road AD is found, the node NO5 is designated the start point SP of guide route, and a route is identified to the destination TP. The newly identified route is compared with the initial route MW, and the one that is the better is displayed. In FIG. 33, NO1 to NO9 denote nodes on the guide road AD.

Even when the node on the guide road ahead of the car in the direction of progress is regarded to be the start point SP of guide route, the present position MP may deviate from the guide route MW as shown in FIG. 33. In this case, a point Cp where the direction of progress SD intersects the guide road is found, and a node NO8 closest to the point Cp is designated the start point SP of guide route. Moreover, the intersection point where the non-guided road meets the guide road is added to the search conditions, and an intersection point NO7 closest to the point Cp may be designated the start point SP of guide route.

Furthermore, a distance from the present position to the start point SP of guide route may be determined and presented to the operator. In this case, a straight distance between the present position and the start point SP of guide route may be presented, or a practical distance of travel along the road from the present position to the start point SP of guide route may be presented.

14. Modified Examples

The invention is in no way limited to the above-mentioned embodiments but can be modified in a variety of ways without departing from the spirit and scope of the invention. For example, when the road data stored in the road data file are not divided into guide roads and non-guided roads, or when the road data do not contain the concept of guide roads, the processing of when the present position or the registered destination exists on a non-guided road is not executed in the aforementioned embodiments. That is, steps 84, 94 to 98 of FIG. 8, steps 106, 116 to 120 of FIG. 10, and steps 164 to 174 of FIG. 15 are omitted. In determining whether the present position is on the guide road (step 82 of FIG. 8, step 104 of FIG. 10, step 162 of FIG. 15), it is determined whether the present position or the registered destination exists on a road that is stored in the road data file. When the present position exists on a road stored in the road data file, the guide route is not changed. When the present position exists on a point other than the road, a new guide route is identified again as described in the foregoing.

Moreover, steps 182 to 186 of FIG. 15 may be replaced by the same processings as those of the steps 116 to 172. That is, when the present position exists on a non-guided road, coordinates of the start point of a guide road within a predetermined distance from the present position, coordinates of the end point and coordinates of the nodes are found, and the overall length Ln of the route is calculated from the present position to the end point ED of guide route passing through the points. Then, the shortest route is identified. When this route is different from, and shorter than, the initial, existing guide route, the newly identified route is used as a new guide route. In the steps 182 to 186 of FIG. 15, a route is identified passing through a point on the guide road at the shortest distance from the present position. This route, however, is not necessarily the shortest route leading to the end point. Therefore, the overall lengths of the routes are compared to determine which one is the shortest, and the shortest route is identified up to the end point ED of guide route.

Instead of the processings of the steps 168, 170, 184, 186 in the search-again processing (step 72 of FIG. 7), furthermore, a point is identified having the shortest straight distance or the shortest route length from the present position to the guide road. When this point is not the point on the existing guide route before the search-again processing, the route from this point to the end point ED of guide route may be used as a new guide route. This makes it possible to omit the processing (steps 168 to 172, and 184 to 194) for finding and comparing the route lengths from the present position to the end point ED of guide route passing through the points on the guide roads.

Moreover, when the distance returning back to the initial guide route is not larger than x times the distance to the point located at the shortest distance, the initial guide route may be used as the guide route. Here, "x" is a predetermined value. In the above-mentioned search-again processing (step 72 of FIG. 7), the length of the route is found from the present position to the end point ED of guide route or to the guide route MW (steps 170, 180). Here, the distance from the present position to the junction on the guide route or the distance from the present position to a point on the guide road at the shortest distance may be excluded and the length of the route may be found from the junction on the road or from the point at the shortest distance to the end point ED of guide route or to the guide route MW.

In addition to weighing the routes leading to the guide road in the direction of progress, the ease of passing through the routes to the guide road may be weighed. Even though, for example, the route from the present position to the guide road is the shortest, the road returning back to the initial guide route may be displayed as the guide route provided this road is headed in the direction of progress of the car and leads to the initial guide route passing through the straight road.

Moreover, the search-again processing (step 72 of FIG. 7) is the guide/display processing (step 53) which may be automatically executed when the present position deviates from the guide route MW, may be executed upon a predetermined switching operation or when the search-again processing is started by the user using voice input. The map picture H1 on the display 33 may display the present position H2, guide route H3 and direction marks H4 to H6 only as described above. Geographical data may also be displayed, such as other roads, buildings, facilities, names of areas, directions, scale, guide marks, etc. At least one of the processing for determining the start point SP of guide route (step 64 of FIG. 7), processing for determining the end point ED of guide route (step 66 of FIG. 7) or search-again processing (step 72 of FIG. 7) may be a processing for indicating that a guide route cannot be set or for indicating an error when the present position or the registered destination does not exist on the guide road.

In the processings of FIGS. 21 and 22, the search area may be expanded in the transverse direction of the car or in the rear oblique directions or may be expanded in all directions when the search area being expanded has reached its limit. In the processing of FIG. 24, the radius of the search area SEa may be fixed and the distance Ra to the center Ec may be increased. This processing may be combined with the processing of FIG. 24. In the processings FIGS. 27, 29 and 30, the center angle θ s may be fixed, and the fan shape FG may be tilted toward the right or the left instead of the direction of progress from the present position MPa, and the processing may be combined with the processings of FIGS. 27, 29 and 30.

The guide road may be the one which is capable of simply guiding the route. Moreover, the guide roads may not be distinguished from the non-guided roads as described above. Furthermore, the non-guided road may be any place other than a road that is guided. In the search-again processing (step 72 of FIG. 7), the guide route that is set first may be compared with the route that is subsequently identified to determine an advantageous guide route. When the search-again processing is executed after the search-again processing has been previously executed, the route identified in the previous iteration may be compared with the route identified in the current iteration.

16. Structure of Road Data in the Data Storage Medium

FIGS. 34 to 40 illustrate road data recorded in the road data file of the data storage medium 37, which are used for the route guidance. FIG. 34 illustrates the contents of road data 50. The data storage medium 37 stores a number of road data 50. The road data 50 comprises road data RD(n) for each of n roads Each set of road data in the guide road data 50 includes a road number RDN, a length RDL, road attribute data RDA, a shape data address FDA, a guide data address GDA, and the object of the guide flag that discriminates guide roads from non-guided roads.

The roads are discriminated by the road number RDN and the flag and a road is determined. The length RDL represents a geographical distance of the road.

As shown in FIG. 38, the road attribute data RDA shows the form of the road, i.e., elevated road, side of elevated road, underpass, side of underpass, etc. to include a flag data 71 that is set depending upon the form of the road. When the flag data 71 has not been set, the road is the one running on the ground surface.

A discrimination flag 72 is added to the road attribute data RDA, and the number of lanes of the road is determined depending upon the discrimination flag 72. In FIG. 38, for example, the road of a road number RDN has two lanes.

The shape data address FDA and size FDS of FIG. 34 represent a memory start address and a memory region of shape data 55 in the data storage medium 37. The shape data 55 represents the shape of the road of a road number RDN on the map, and the contents of the shape data 55 are shown in FIG. 35. The roads are approximated by false curves formed by connecting a plurality of nodes by straight lines. The shape data 55 represent geographical coordinates (positions) of the nodes. Therefore, the shapes and positions of the roads on the map are determined by the shape data 55.

FIG. 35 shows geographical coordinate data of the nodes. The number of nodes NC(m) represents the number of nodes constituting a road of road number RDN. The east longitude data EO and the north latitude data NO represent geographical coordinates (positions) of the nodes and are stored in a memory region of not larger than a size FDS. The positions where the roads are connected to each other are determined depending upon the geographical coordinates (positions) of the nodes.

The guide data address GDA and size GDS of FIG. 34 represent the memory start address of guide data 60 and the size of the memory region in the data storage medium 37. Referring to FIG. 36, the guide data 60 represents features of the road, such as the name of an intersection at the end of the road, caution point data and the name of the road.

The intersection name CN in the guide data 60 represents the name of the intersection at the end of the road of the road number RDN. Referring to FIG. 39, the caution point data AD in the guide data 60 represent the inlet of a tunnel, the outlet of the tunnel, or a railway crossing on the road of road number RDN, and let the operator receive caution information either by voice or display while he/she is driving.

The road name data RND of FIG. 36 include character data, such as the street name of the road, the name of a national road (national road number), the name of a local road (local road number) and the name of an expressway (expressway number), etc. The street name often stands for road name data RND. The road name voice data address ROA and size ROS of guide data 60 of FIG. 36 represent a memory start address of voice data of the road name and a memory region. The voice data are output through the voice processor 11 and the speaker 13, and the road name is provided to the operator.

The destination data address DOA and size DOS of FIG. 36 represent a memory start address of destination data 65 and a memory region. The destination data 65 represent a guide road connected to the road and further represent the connection of the road to other roads. That is, the destination data 65 represent a next road connected to the road of the road number RDN.

FIG. 37 illustrates the contents of the destination data 65. The number of destinations ES(k) represents the number of roads connected to the road of the road number RDN. The destination road number ERB is the same gist as the road number RDN, i.e., it is the route identification number, thus it represents a discrimination number attached to each of the roads. The destination road name ERN is a name specific to the road to which the destination road number ERB is attached. The destination road name voice data address EDA and size EDS represent a memory start address of voice data for the destination road name ERN and a memory region.

Due to the voice data, the destination road name ERN can be provided to the driver by voice. The destination direction data ESA represents the angle of connection (direction) of a road from the road of road number RDN to the road of destination road number ERB. That is, the destination direction data ESA represents the angle of progress (direction) from the end of the road of road number RDN to the road of destination road number ERB. For example, when the destination direction data ESA represents a turn to the left (turn to the right), the car may proceed turning to the left (to the right) from the road of road number RDN to the road of destination road number ERB. The destination direction data ESA may further be data directed to an invalid turn, be unnecessary (or not needed), go straight, turn to the right, rightwardly tilted direction of progress, rightwardly tilted direction of return, turn to the left, leftwardly tilted direction of progress, or leftwardly tilted of return. Positions where the roads are connected to each other are also determined depending upon the geographical coordinates (geographical positions) of the nodes.

The running guide data EID of FIG. 37 represent the contents for changing a lane prior to entering into the road of the destination road number ERB. The contents include instructions for changing of lanes, such as "get in the right lane", "get in the left lane" and other necessary data. FIG. 40 illustrates the contents of the running guide data EID.

17. Guide/Display Processing (Step 53 of FIG. 7)

Figure 41:
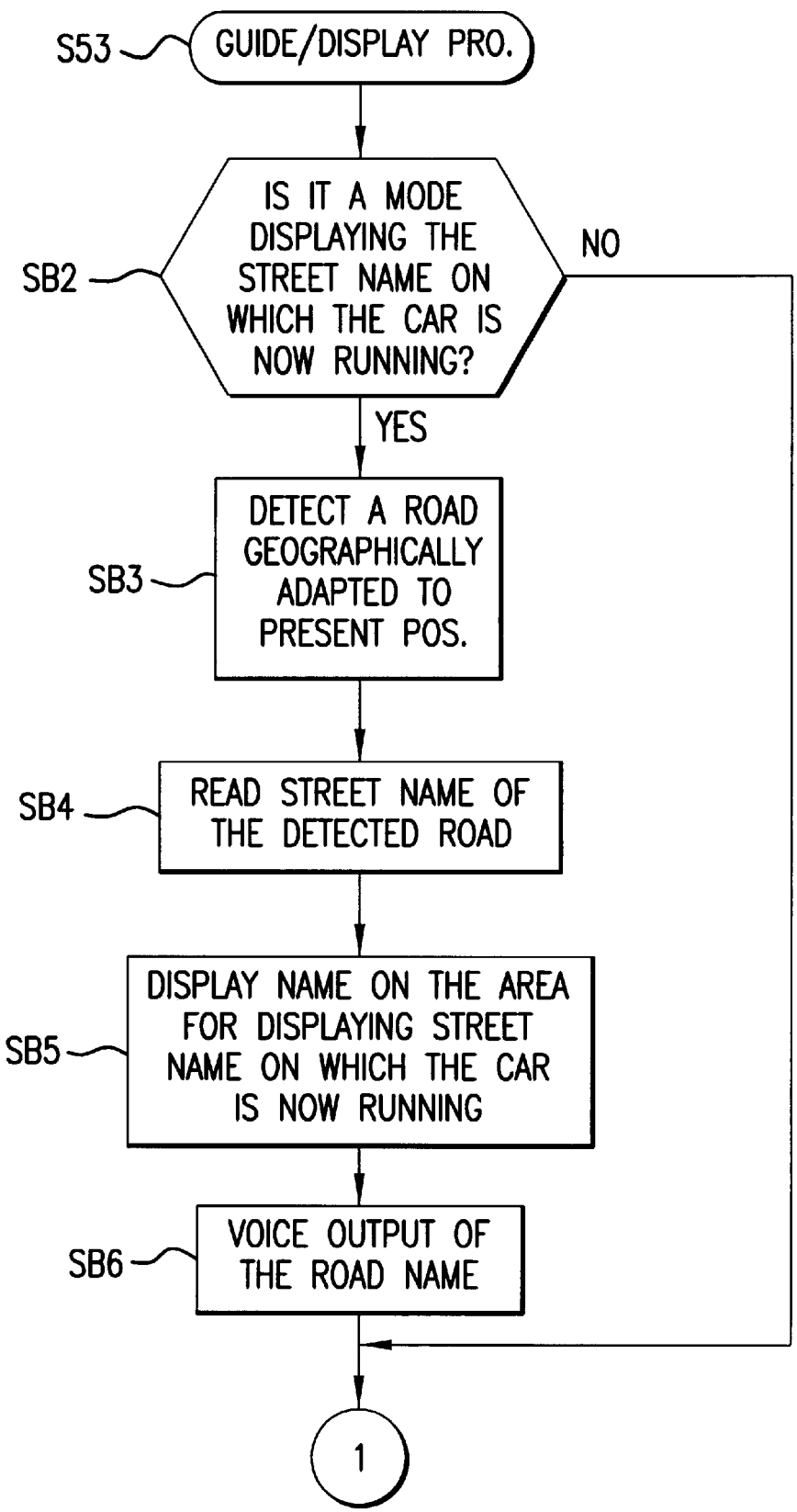
FIG. 41 is a flowchart of a mode for displaying the name of the road on which the car is now running.
Figure 42:
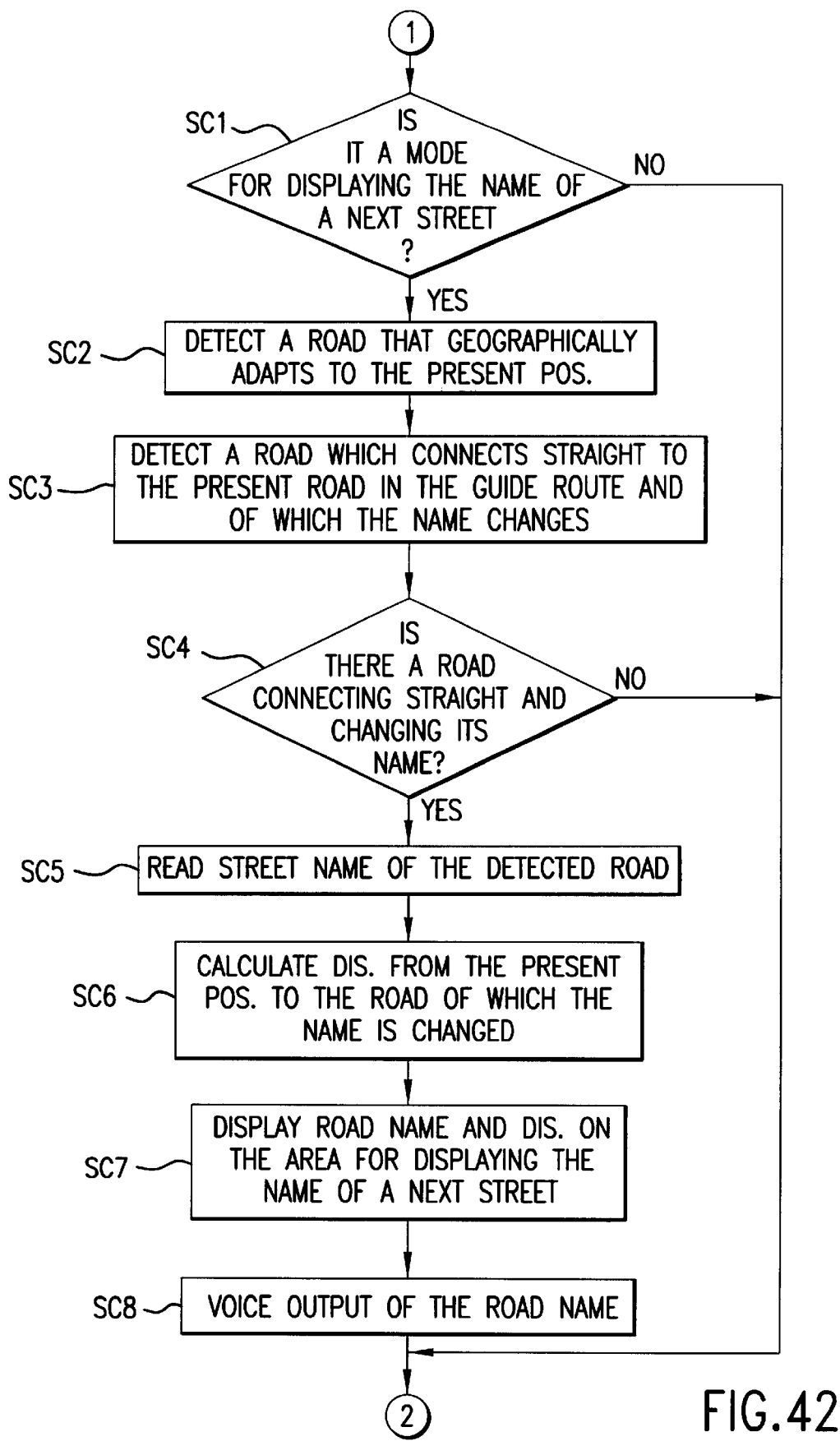
FIG. 42 is a flowchart of a mode for displaying the name of a road on which the car will run next.
Figure 43:
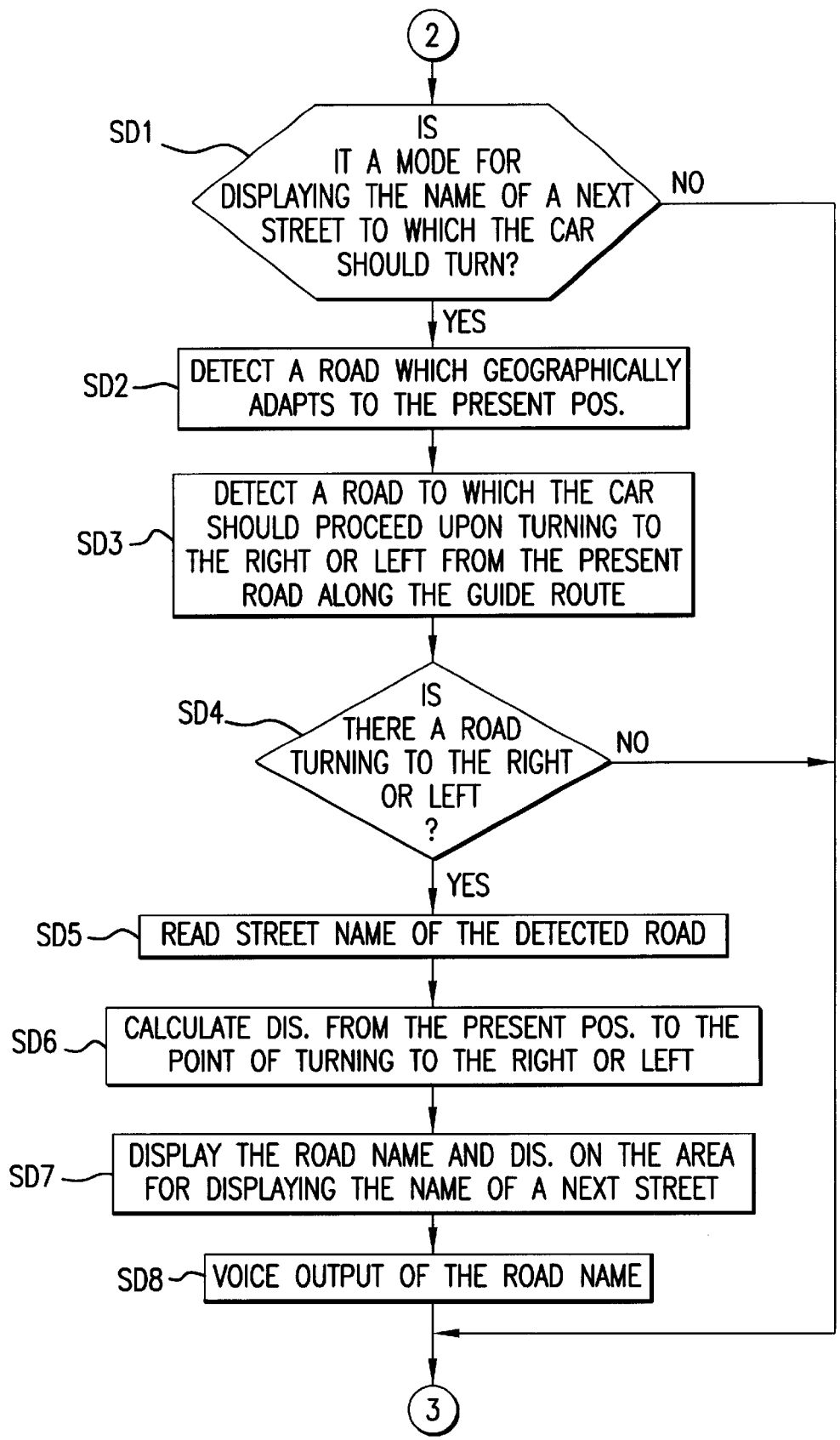
FIG. 43 is a flowchart of a mode for displaying the name of a street onto which the car will turn next.

FIGS. 41 to 45 are flowcharts of the guide/display processing executed by the navigation processing. FIG. 41 is a flowchart of a mode in which the street name of a road on which the car is now running is shown on the display 33. FIG. 42 is a flowchart for a mode of display of the street name of a next road that connects straight to the road on which the car is now running. FIG. 43 is a flowchart for a mode of display of the street name of a road into which the car will enter after having turned along the guide route.

Figure 44:
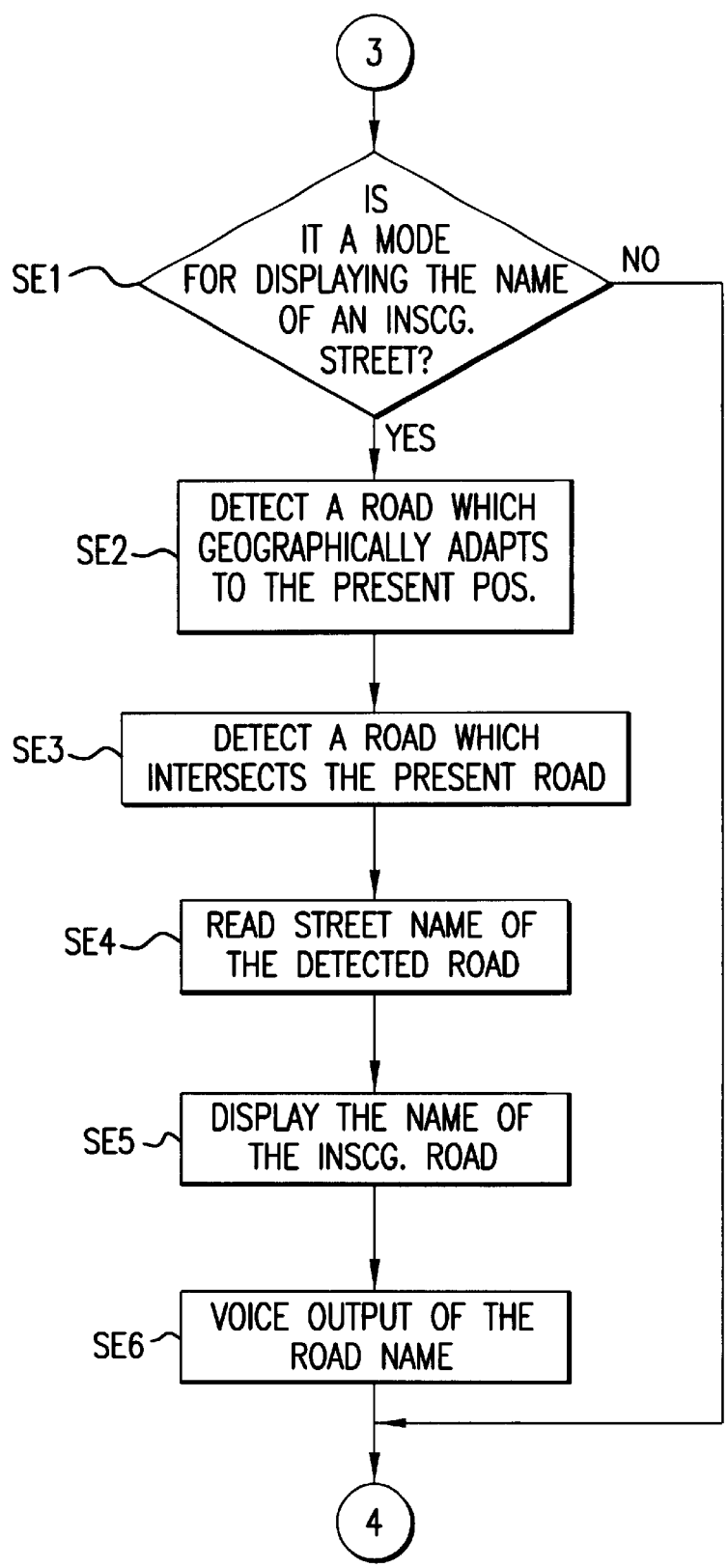
FIG. 44 is a flowchart of a mode for displaying the name of a road with which will intersect the road which will intersect with the road on which the car is now running.
Figure 45:
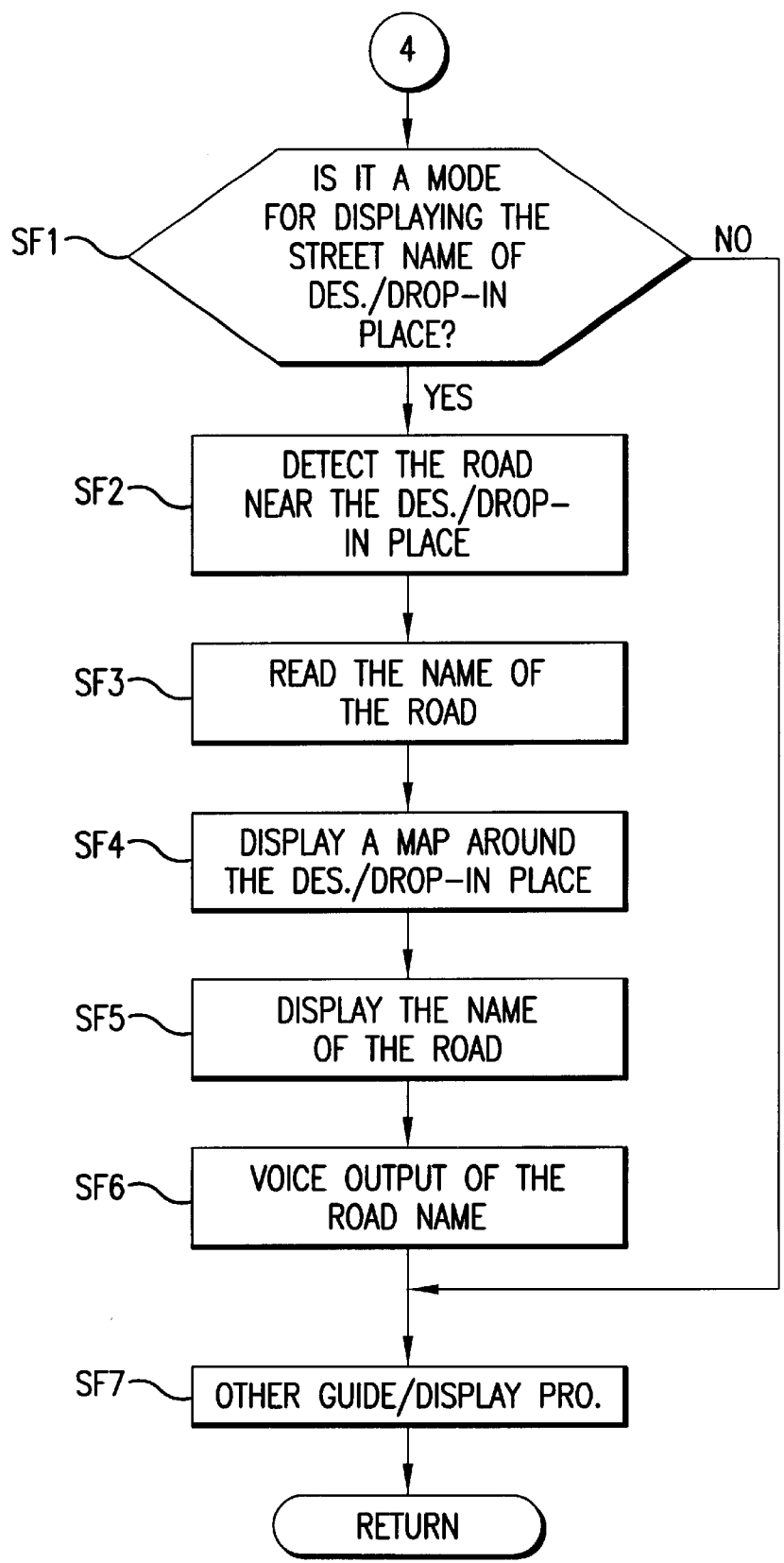
FIG. 45 is a flowchart of a mode for displaying the name of the road close to a destination or a drop-in point.

FIG. 44 is a flowchart for a mode of display of the street name of a road which will intersect the road on which the car is now running. FIG. 45 is a flowchart for a mode of display of the street name of a guide route around the destination or a drop-in place. In this embodiment, the street name display mode is exclusively selected, i.e., when a given street name display mode is selected, the street name of the road by other mode is not displayed although the modes could be mixed.

In the flowchart of FIG. 41, first, the display mode that has been set is determined. That is, a mode for displaying the street name on the display 33 is selected by the data that is set to the mode setting data MD in the RAM 4. When it is determined that "a mode displaying the street name on which the car is now running" is selected depending upon the value of the mode setting data MD (step SB2), the processings of steps SB3 to SB5 are executed. The data in the mode-setting data MD are set by operating a touch switch 34.

A guide road adapted to the present position of the car is selected using the present position data MP of RAM 4 and the road data stored in the data storage medium 37 (step SB3). By using the road number RDN of the thus selected road as an index, the road name data RND of the road number RDN are read out from the guide data 60 (FIG. 36) (step SB4). In this case, voice data of the road name are read out from a memory region of the data storage medium 37 determined by the road name voice data address ROA and the size ROS.

The road name data RND are written into the picture memory 10 as controlled by the image processor 9. Then, the road name data RND are displayed on the street name display area on the display 33 (step SB5). Furthermore, the voice data of the road name data RND are sounded from the speaker 13 as controlled by the voice processor 11 (step SB6). The voice data may be repetitively sounded after passage of a predetermined distance or periodically after a predetermined period of time. Alternatively, the voice data may be sounded only once when the car has entered into the road on which the car is now running from a road of another road name.

Figure 52:
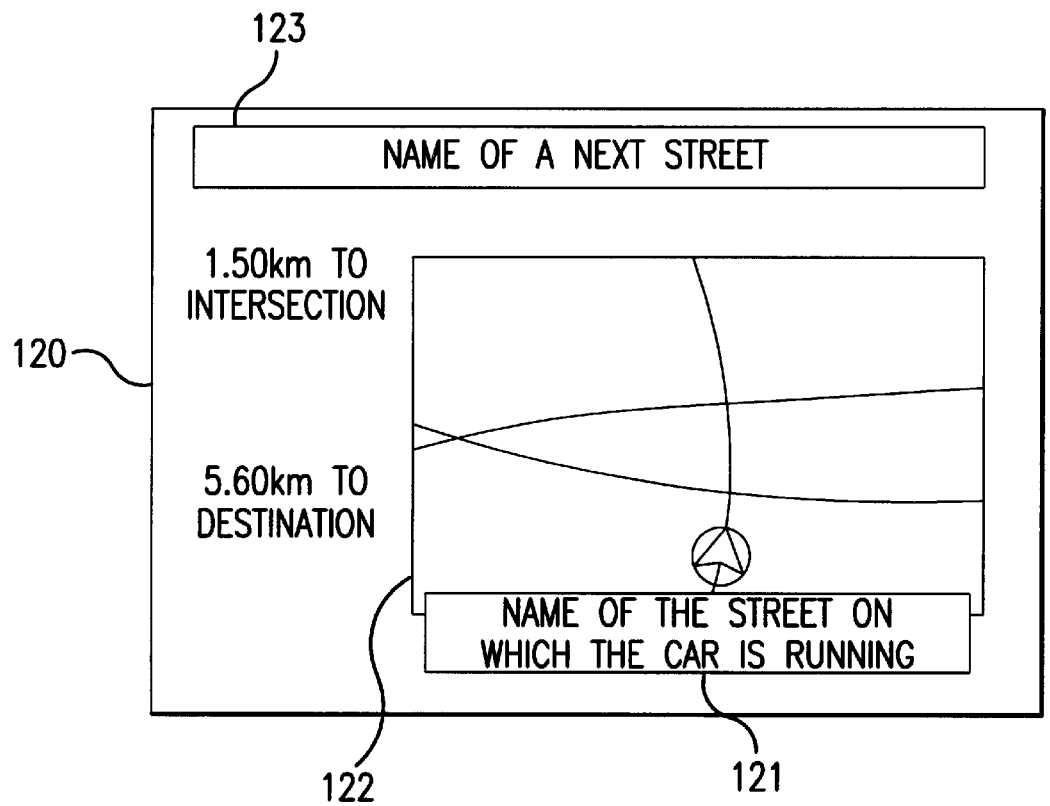

FIG. 52 shows the name of a street on which the car is now running presented on the display 33. A street name display area 121 is provided at the lower portion of the map display area 122. The road name data RND (characters) are displayed in the street name display area 121. Therefore, the street name display area 121 provides a correspondence between the car and the road of which the name is displayed (output). Thus, the street name of the road on which the car is now running is displayed by the processings of the steps SB3 to SB6.

Thereafter, the mode is a "mode for displaying street name of the road on which the car is running". Therefore, none of the steps SC1, SD1, SE1, SF1 or a series of processings of FIGS. 42, 43, 44 and 45 are executed, but "other guide/display processing" (step SF7) of FIG. 45 is executed. The processing displays, on the display 33, for example, a road map including the guide route or displays a distance up to a point where the course should be changed, such as turn to the right or turn to the left. Thereafter, the processing is returned back to the main flow of FIG. 6.

Next, when the voice of the mode-setting data MD is to select the "mode for displaying the name of a next street" (step SC1), the processings of the steps SC2 to SC8 of FIG. 42 are executed. First, a guide road adapted to the present position of the car is determined using the present position data MP in the RAM 4 and the road data stored in the data storage medium 37 (step SC2). Then, a road which connects straight to the present road and to which the street name changes is detected (step SC3) from the guide route found in the route search processing in the main flow (FIG. 6).

Here, a road is selected in which the road number RDN in the guide road data 50 (FIG. 34) is in agreement with the destination road number ERB in the destination data 65 (FIG. 37). There is further selected a destination road number ERB of the road of which the destination direction data ESA in the destination data 65 represent "go straight". Thus, a road is detected that adapted to the condition of step SC3.

When a road in which the street name changes is determined (picked up) at step SC3 (step SC4), the destination road name ERN of the thus detected road is read from the destination data 65 (FIG. 37) (step SC5). In this case, voice data of the road name are read from the memory region in the data storage medium 37 specified by the destination road name voice data address EDA and size EDS. Furthermore, a geographical distance from the present position to the detected road is found (step SC6).

The destination road name ERN and the calculated distance data are written into the picture memory 10 under control of the image processor 9. Therefore, the destination road name ERN and the distance of the road are displayed on the area for displaying the name of a next street on the display 33 (step SC7). Moreover, voice data of the road name data RND are sounded from the speaker 13 as controlled by the voice processor 11 (step SC8). The voice data may be repetitively sounded after passage of the predetermined distance or after the predetermined period of time until the next street is reached.

When the road is not detected in the guide route which connects straight to the present road and which undergoes a name change (step SC4), the processings of the steps SC5 to SC8 are not executed, and no road name is shown on the display 33. FIG. 52 illustrates an example where the street name of a next road is shown on the display 33. Referring to FIG. 52, the street name of a next road and the distance to the road are displayed on the display area 123 on the upper part of the display 33. Therefore, the street name display area 123 (street name) and the distance to the road present a correspondence between the car and the road of which the name is displayed (output).

Then, when step SC1 is no, the mode is determined (steps SD1, SE1, SF1), "other guide/display processing"(step SF7) is executed, a road map inclusive of the guide route is shown on the display 33, and a distance is displayed to a point where the course should be changed, such as turn to the right, turn to the left, etc. After the processing of the step SF7 is finished, the program returns to the main flow of FIG. 6.

When the display mode is "a mode for displaying the street name to which the car should turn next" (steps SB2 NO, SC1 NO, SD1 YES), the processings of the steps SD2 to SD8 are executed. First, a guide road that corresponds to the present position of the car is determined using the present position data MP from the RAM 4 and the road data stored in the data storage medium 37 (step SD2). A road into which the car should enter after having turned (step SD3) is determined from the guide route found in the route search processing of the main flow (FIG. 6). The direction of turn that is determined may be to turn to the right, turn to the left, turn to the rightwardly tilted direction, turn to the leftwardly tilted direction, etc.

The destination road name ERN of the detected road is read from the destination data 65 (FIG. 37) (step SD5). Voice data of the road name are read out from the memory region in the data storage medium 37 specified by the destination road name voice data address EDA and the size EDS. Furthermore, a geographical distance is found from the present position to the detected road onto which the car will proceed upon turning (step SD6).

The destination road name ERN and the calculated distance data are written into the picture memory 10 under control of the image processor 9. Thus, the destination road name ERN and the distance to the road are displayed on the area for displaying the name of the next street on the display 33 (step SD7). Furthermore, voice data or road name data RND are sounded from the speaker 13 as controlled by the voice processor 11 (step SD8). The voice data may be repetitively sounded after the predetermined distance or after the predetermined period of time until the street into which the car should turn next is reached. In particular, the voice data may be repetitively sounded as the vehicle approaches the intersection where the car should turn.

Figure 49:
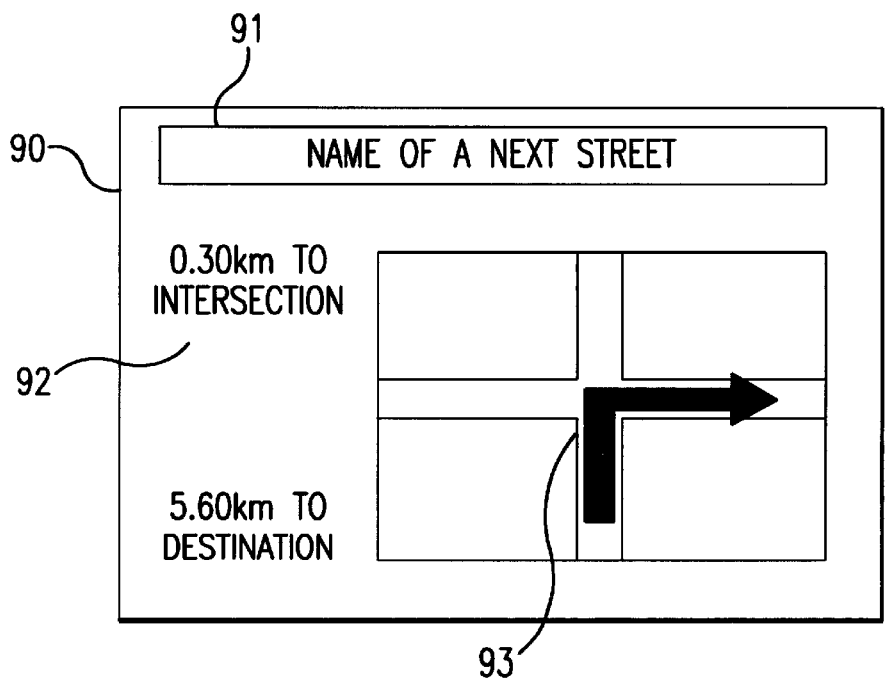
FIGS. 49 to 54 are diagrams illustrating examples of navigation displays.

When a road into which the car will proceed upon turning is not found in the guide route (step SD4), the processing of the steps SD5 to SD8 are not executed, and the street name of the road to which the car should turn is not displayed. FIG. 49 illustrates an example in which the street name of the road onto which the car should turn is shown on the display 33. As shown in FIG. 49, the street name of the road onto which the car should proceed next, upon turning, is displayed in the display area 91 at the upper portion of the display 33. Further, the distance to the road onto which the car should turn is shown in the display 33 as represented by a numerical value 92. In FIG. 49, the intersection where the car should turn is shown in an enlarged scale together with the street name of the road. Therefore, the display area 91 and the displayed numerical value 92 represent a correspondence between the car and the road whose name is displayed (output).

When the distance is greater from the present position of the car to the intersection where the car should turn, the intersection is not shown on an enlarged scale on the display 33. In this case, the display 33 shows a map including the guide route with the position of the car at a center. However, the street name of the road into which the car should proceed next upon turning may be displayed at all times on the display area 91 at the upper portion of the display 33.

In FIG. 49, the display area 91 of the display 33 shows only the street name of the road onto which the car should proceed upon turning. However, when the roads proceeding in all directions from the intersection 93 have different street names, as shown in FIG. 51, all street names of the roads may be displayed on the map picture on the display 33.

Figure 51:
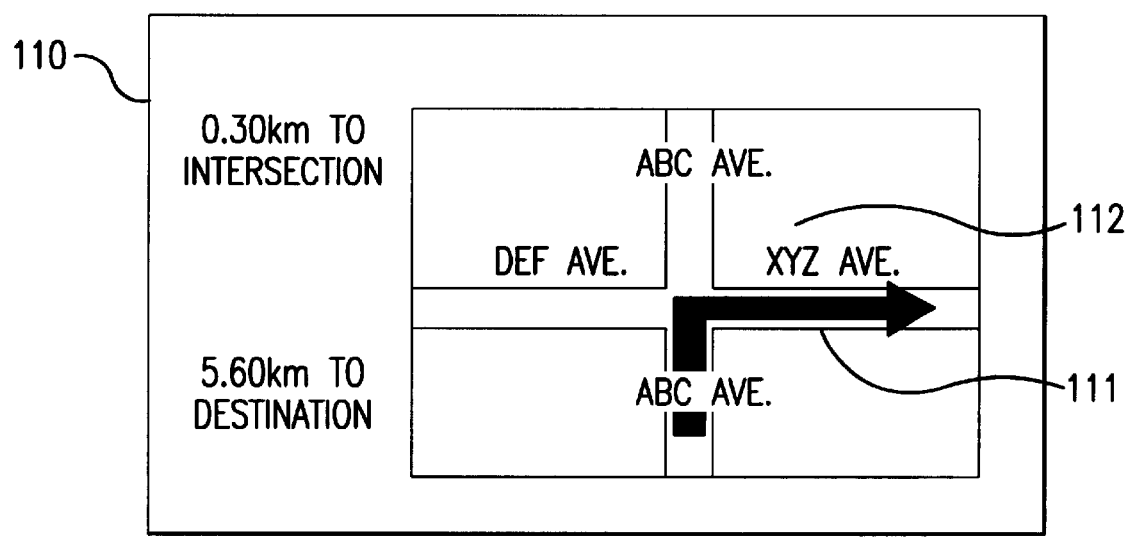

FIG. 51 illustrates an example showing all street names of the roads in all directions from the intersecting point. In this case, the destination road names ERN of a number k included in the destination data 65 are all read out in the processing at the step SD5. Furthermore, the road name data RND of the guide data 60 is read out as the street name of the road on which the car is now running. Thus, the destination road names ERN of the number k and the road name data RND are shown on the display 33, and the street names of all roads connecting to the intersection where the car should turn are shown on the map. Accordingly, the graphically displayed roads represent a correspondence (relationship) between the car and the roads of which the names are displayed (output).

When the destination road names ERN and the road name data RND are directly shown on the map picture on the display 33, they are shown at positions corresponding to the font size of the character data. That is, as shown in FIG. 51, the street names 112 of the roads 111 are shown maintaining a distance in proportion to the size of the font of the displayed characters. The roads 111 and the names 112 are shown close to each other, and can be easily recognized.

Next, when step SD1 is NO, a mode is determined (steps SE1, SF1), "other guide/display processing" (step SF7) is executed, the road map including the guide route is displayed on the display 33, and other necessary data are displayed on the display 33. Thereafter, the processing returns back to the main flow of FIG. 6.

When the display mode is "a mode for displaying the street name of an intersecting road" (steps SB2 NO, SC1 NO, SD1 NO, SE1 YES), the processings of the steps SE2 to SE6 are executed. First, a guide road adapted to the present position of the car is determined using the present position data MP of the RAM 4 and the road data stored in the data storage medium 37 (step SE2). Then, a plurality of intersecting roads are detected (step SE3) to the road of the present position and the guide route which connects to the road of the present position. The intersecting roads are detected using the guide road data 50 (FIG. 34) and the destination data 65 (FIG. 37). That is, the data of the guide roads connected to the present road are stored as destination data 65. A road intersecting the guide route is determined depending upon the destination data 65.

The destination road name ERN of the determined road, that is, the intersecting road nearest to the present position of the car, is read out from the destination data 65 (FIG. 37) (step SE4). In this case, voice data of the road name are read out from the memory region of the data storage medium 37 specified by the destination road name voice data address EDA and the size EDS. The destination road name ERN is written into the picture memory 10 as controlled by the image processor 9. Thus, the street name of the intersecting road is shown on the display 33 (step SE5).

Figure 50:
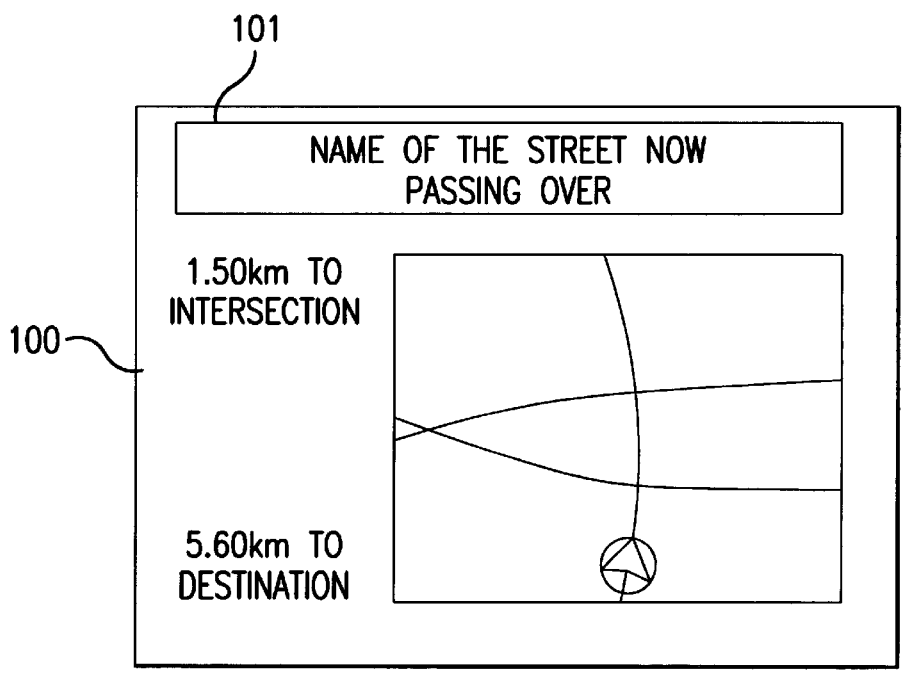

Moreover, voice data of the road name data RND are sounded from the speaker 13 as controlled by the voice processor 11 (step SE6). The voice data is sounded when the car has come within a predetermined distance of the intersecting road. The voice data may further be repetitively sounded after a second predetermined distance or after the predetermined period of time until the intersecting road is reached. The street name of the road may be sounded again even after the car has passed over the intersecting road. FIG. 50 illustrates an example of displaying the street name of the intersecting road, and the street name is displayed within the display area 101 at the upper part of the picture.

Figure 53:
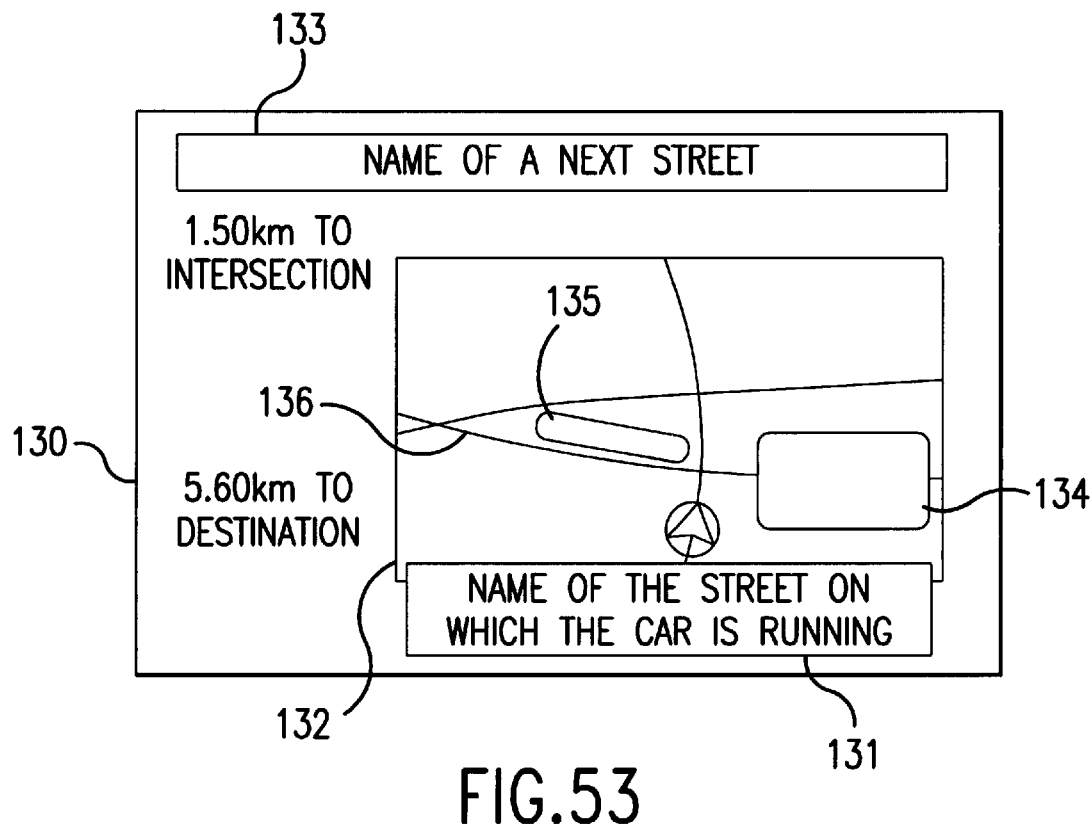

FIG. 53 illustrates another example of the picture. In FIG. 53, the street name of an intersecting road is displayed in an area 134 or in an area 135 of the picture 132. When the street name is displayed on the area 134, the intersecting road 136 is partly concealed. When the street name is displayed on the area 135, however, the intersecting road 136 is not concealed. Therefore, a one of the display methods is selected depending upon the scale of the map shown on the display 33. When the street name is directly displayed on the map picture as shown in FIG. 53, the street name of all roads intersecting the guide route may be displayed on the map being shown. The display areas 131, 134 and 135 represent a correspondence (relationship) between the car and the roads of which the names are displayed (output).

Then, when the step SE1 is NO, the mode is determined (step SF1), "other guide/display processing" (step SF7) is executed, and a road map including the guide route and other necessary data are shown on the display 33. Thereafter, the processing returns to the main flow of FIG. 6.

When the display mode is "a mode for displaying the street name of destination/drop-in place" (steps SB2 NO, SC1 NO, SD1 NO, SE1 NO, SF1 YES), the processings of the steps SF2 to SF7 are executed. First, a road in the guide route closest to the destination or the drop-in place is determined relying upon the end point ED of route data stored in the RAM 4 (step SF2). The road name data RND of the determined road is read out from the guide data 60 (FIG. 36) (step SF3). In this case, voice data of the road name are read out from the memory region of the data storage medium 37 specified by the road name voice data address ROA and the size ROS.

The road map near the destination/drop-in place is shown on the display 33 (step SF4). Then, the road name data RND read out at step SF3 is shown on the display 33 (step SF5). Thus, the street name of the guide route close to the destination or the drop-in place is displayed on the picture.

The street name may be shown in the display area provided at the upper part of the picture or may be directly shown on the map picture. Furthermore, the street names of all roads around the destination/drop-in place may be displayed. In this case, the street names are shown to correspond to the street figures. The street figures represent a correspondence (relationship) between the car and the roads of which the names are displayed (output). The destination/drop-in place represents a correspondence or a relationship to the car.

The street name of the road detected at the step SF2 is sounded (step SF6). The street name is sounded only once in compliance with the display of the map picture at the step SF4.

Then, "other guide/display processing" (step SF7) is executed, the road map including the guide route and other necessary data are shown on the display 33. After the processing at the step SF7, the processing returns to the main flow of FIG. 6.

In this embodiment as described above, one of the five modes is selected to display the street name on the picture. This, however, may be done as described below. As shown in, for example, FIG. 53, there may be displayed at all times the street name of the road on which the car is now running (FIG. 41), the street name into which the car should turn next (FIG. 43), and the street name of a road that intersects the road on which the car is now running (FIG. 44).

18. Guide/Display Processing (Step SA5 of FIG. 41)

Figure 47:
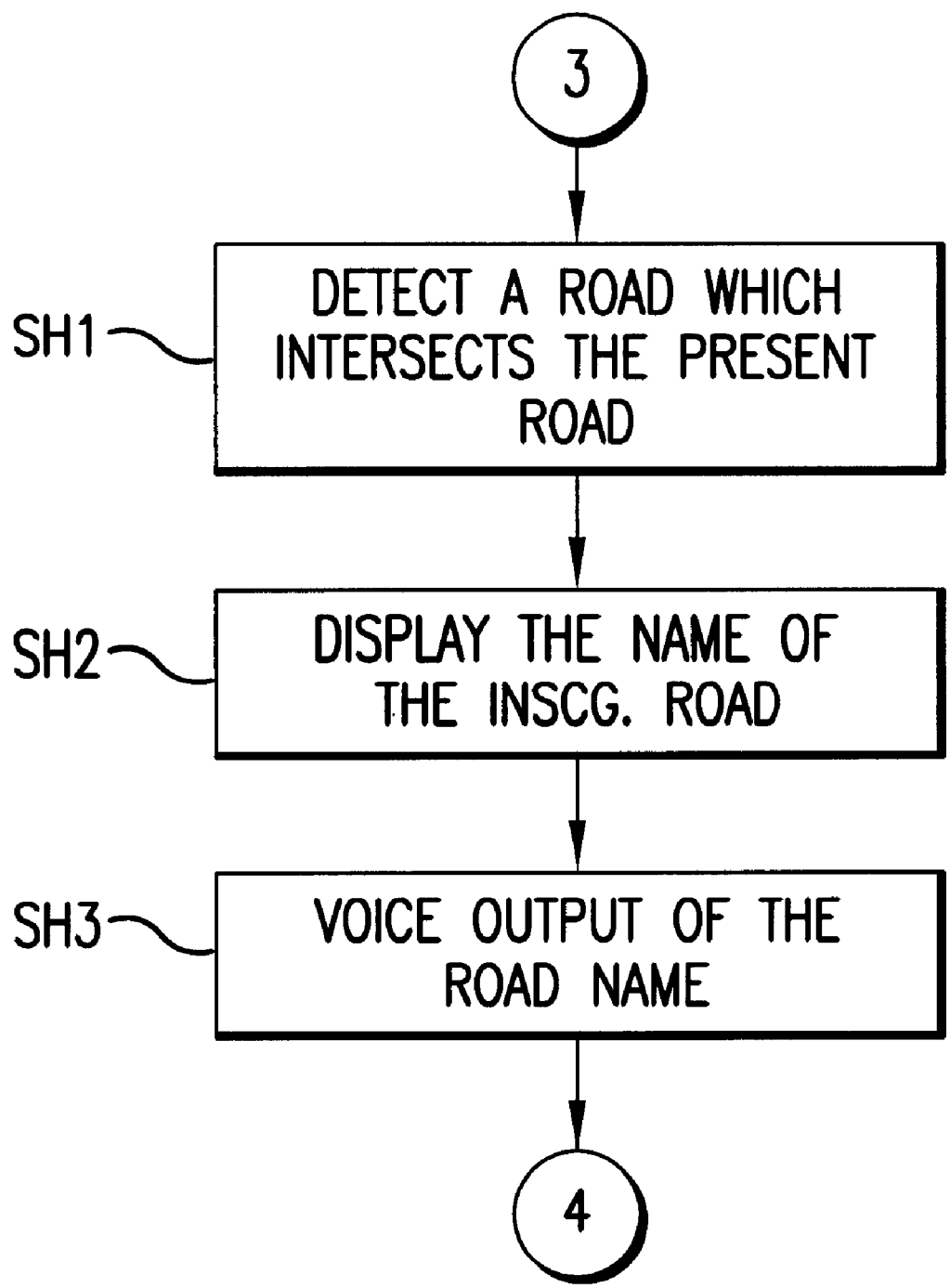

FIGS. 46 and 47 are flowcharts illustrating another embodiment of display processing. In a mode for displaying the street name of a road into which the car should turn next according to this embodiment, the content of the display is changed over depending upon the distance from the present position to the road onto which the car should turn. The main flowchart is the same as that of the above-mentioned embodiment and is shown in FIG. 6. In the flowchart of guide/display processing of this embodiment, the portions other than those of FIGS. 46 and 47 are the same as those of the above-mentioned embodiments. That is, FIGS. 41, 42 and 45 apply also to this embodiment. The portions are the same as those of the above-mentioned embodiment are not described here again, but the description of the above-mentioned embodiments applies thereto. Even in this embodiment, a mode can be selected for displaying the street name on the display 33 relying upon the mode setting data MD.

The flowcharts shown in FIGS. 46 and 47 are executed when the display mode is "a mode for displaying the street name to which the car should turn next". When the determination is YES at step SG1 in FIG. 46, the determined result is NO at step SB2 of FIG. 41 and at step SC1 of FIG. 42, and none of the processings of FIGS. 41 and 42 are executed.

A guide road corresponding to the present position of the car is selected using the present position data MP of the RAM 4 and the road data stored in the data storage medium 37 (step SG2). Next, a road onto which the car should enter upon turning is determined from the guide route selected by the route search processing in the main flow (see FIG. 6) (step SG3). The direction of progress upon turning that is determined may be a turn to the right, a turn to the left, proceed in the rightwardly tilted direction, proceed in the leftwardly tilted direction, etc.

When the road onto which the car should proceed upon turning is determined (YES at the step SG4), a geographical distance is found from the present position to the determined road onto which the car should proceed upon turning (step SG5). When the road to which the car should proceed upon turning is not detected (NO at the step SG4), the processings of the steps SH1 to SH3 of FIG. 47 are executed.

When the distance to the thus found road onto which the car should proceed upon turning is larger than a predetermined value and is long (NO at the step SG6), the street name of the road onto which the car should proceed upon turning is not displayed but the street name of an intervening, next intersecting road is displayed (steps SH1 to SH3).

However, when the distance to the road into which the car should proceed upon turning is smaller than the predetermined value, that is, is short (YES at the step SG6), the destination road name ERN of the determined road is read out from the destination data 65 (FIG. 37). In this case, voice data of the road name is read out from the memory region of the data storage medium 37 specified by the destination road name voice data address EDA and the size EDS. The destination road name ERN and the calculated distance data are written into the picture memory 10 under control by the image processor 9.

Thus, the destination road name ERN and the distance to the road are shown on the area for displaying the name of a next street on the display 33 (step SG7). Then, voice data of the road name data RND are sounded from the speaker 13 as controlled by the voice processor 11 (step SG8). The voice data may be repetitively sounded after the predetermined period of time. In particular, the voice data may be repetitively sounded when the car approaches the intersection where the car is expected to be turned.

When the road onto which the car should proceed upon turning is not detected in the guide route or when the distance is great to the road to which the car should proceed upon turning (NO at steps SG4 or SG6), the processings of the steps SG5, SG7 and SG8 are not executed and no street name of the road onto which the car should proceed upon turning is displayed. Then any roads on the way of the road of the present position and on the way of the guide route that connects straight to this road are determined (step SH1). Here, the guide road data 50 (FIG. 34) and the destination data 65 (FIG. 37) are used. The data of the guide roads connected to the present road are stored as destination data 65. By using the destination data 65, a road intersecting the guide route can be determined.

The destination road name ERN of the detected road is read out from the destination data 65 (FIG. 37). In this case, voice data of the road name is read from the memory region of the data storage medium 37 specified by the destination road name voice data address EDA and the size EDS. The destination road name ERN is written into the picture memory 10 under control of the image processor 9. Thus, the street name of the intersecting road is shown on the display 33 (step SH2).

Moreover, voice data of the road name data RND is sounded from the speaker 13 as controlled by the voice processor 11 (step SH3). The voice data are sounded only when the car has entered within a predetermined distance from the intersecting road. The voice data may be repetitively sounded after the predetermined distance or after the predetermined period of time until the intersecting road is reached. The street name of the intersecting road may be sounded again even after the car has passed over the intersecting road.

Then, a mode is determined (NO at the step SF1), "other guide/display processing" is executed, a road map including the guide route is shown on the display 33, and other necessary data are shown on the display 33. Thereafter, the processing returns back to the main flow of FIG. 6.

In the mode for displaying the street name of a road to which the car should turn next according to the current embodiment just described, the content of the display is changed over depending upon the distance from the present position to the road onto which the car should turn. That is, when the distance is long to the road onto which the car should turn, the street name of the road intersecting the road on which the car is now running is shown on the display 33. Conversely, when the distance is short to the road onto which the car should turn, the street name of the road onto which the car should turn is displayed. In displaying the street name, it is also discriminated whether the road of the displayed street name is the one which intersects or the one onto which the car should turn. Even in this embodiment, the street name of the road on which the car is now running (FIG. 41) may be displayed together with the street name of a road to which the car should turn next (FIGS. 46 and 47).

According to this embodiment as described above, a mode for displaying the street name can be selected, and a guide route can be easily confirmed. In particular, when every road has a street name, as in urban areas, the route is guided by the street name and the car can be driven more smoothly.

19. Guide/Display Processing (Step SA5 of FIG. 41)

Figure 48:
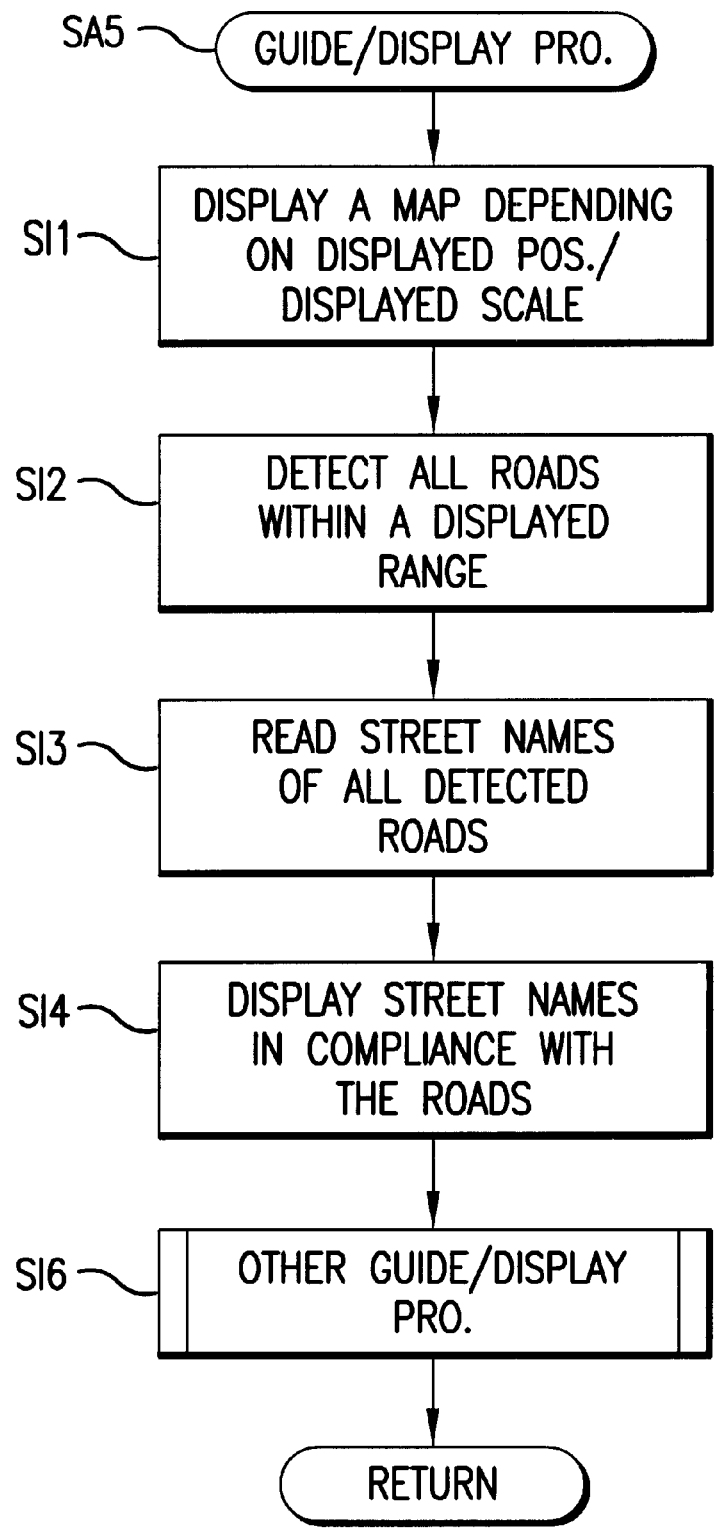
FIG. 48 is a flowchart of still another mode for displaying the name of a street.

FIG. 48 is a flowchart of a third embodiment of display processing. In this embodiment, the street names of the roads are displayed for all or part of the roads displayed. First, the road map, with the present position of the car at a center, is shown on the display 33 relying upon the present position data MP of the RAM 4 (step SI1). The reduced scale of the map can be cyclically selected by the operator from a plurality of reduced scales. Thus, a map of the largest scale, a map of an intermediate scale, a map of the smallest scale, etc. can be selected.

Figure 54:
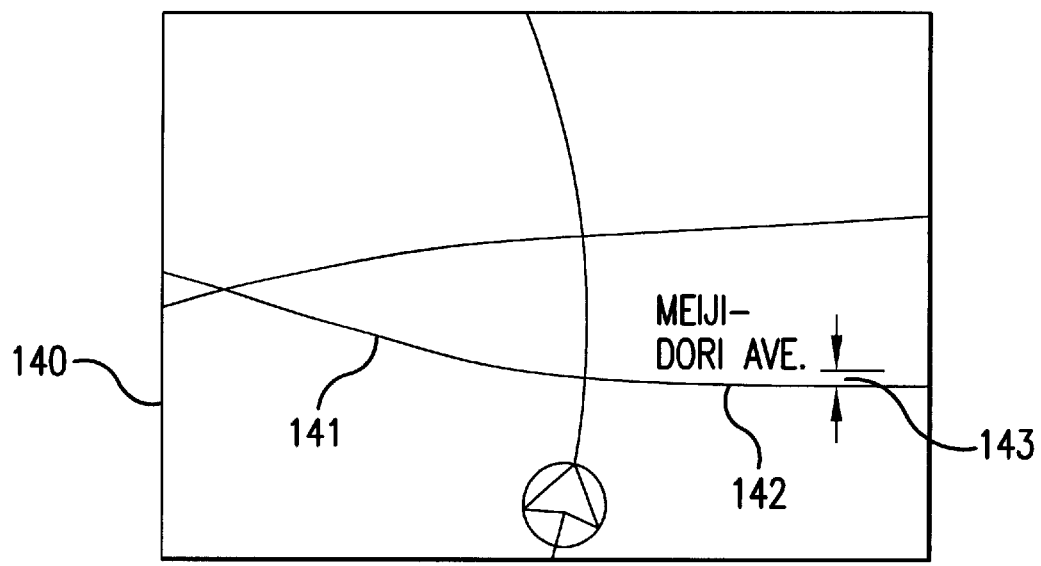

The road numbers RDN of the roads displayed on the map are detected using the data in the data storage medium 37 (step SI2). The street names of the roads are read based upon the road numbers RDN (step SI3). The street names of the roads are displayed (step SI4) on the map shown at the step SI1. As shown in FIG. 54, the street names are displayed at positions close to the corresponding roads. In FIG. 54, the street name 142 of the road 141 is displayed at a position in a picture 140 separated from the road 141 by a distance 143. This distance 143 may preferably be about 10 percent of the size of the font used for displaying the street name 142. Furthermore, the characters displaying the street name 142 may have a size that meets the reduced scale of the map displayed on the picture 140.

Then, "other guide/display processing" (step SI6) is executed to show the guide route and other necessary data on the display 33. Thereafter, the processing returns back to the main flow of FIG. 6.

According to this embodiment as described above, the street names are displayed for all roads displayed, and the present position of the car can be confirmed more easily. However, the roads of which the street names are displayed may be only some of all roads shown on the display 33. Examples may include main trunk roads, roads having many lanes, roads having small numbers of lanes, elevated roads, underpasses, ground roads, expressways, national roads, etc. In this case, the data of FIGS. 34, 36 to 38 can be used.

In the above-mentioned embodiment, the street names of roads near the end point ED of guide route may be displayed at all times at the upper part of the picture and the street name of the road on which the car is now running may be displayed at the lower part of the picture. In other words, at least two or more modes may be simultaneously executed among the modes shown in FIGS. 41 to 47, or all processings of FIGS. 41 to 47 may be executed unconditionally. In this case, the determination processings of the steps SB2, SC1, SD1, SE1, SF1 and/or SG1 may be partly or entirely omitted. At the steps SB2, SC1, SD1, SE1, SF1 and/or SG1, furthermore, the determined result becomes YES unconditionally. Thus, the street names of all roads are displayed on the picture.

20. Postal Code Number Selection Data

FIGS. 55 to 60 illustrate structures of various kinds of data stored in the data storage medium 37. FIG. 55 illustrates postal code number selection data 150. The postal code number selection data 150 includes postal code number PCN, street list address LA, size LD, facility genre list address NA, size NK, east longitude coordinate PEO of a representative point, and area shape data address EA. An area is determined by a postal code number (telephone number) PCN. A memory address in the data storage medium 38 storing a variety of data related to the determined area is specified by a street address LA, a facility genre list address NA, etc.

The street list address LA and the size LD specify a memory start address storing the street list and a memory size. Similarly, the facility genre list address NA and the size ND specify a memory start address storing a genre list of the facilities and a memory size. The genre represents public facilities, such as stations, museums, golf courses, bookstores, drugstores, restaurants, etc. traffic facilities, sports/leisure facilities, shopping facilities, as well as classifications and fields of the destinations and passing places or drop-in places, and their purposes, uses or businesses.

The east longitude coordinate PEO of a representative point and the north latitude coordinate PNO of a representative point represent substantially the center of the area depending upon the postal code number PCN. When the map data of the data storage medium 37 are shown on the display 33, the geographical coordinates specified by the east longitude coordinate PEO of the representative point and by the north latitude coordinate PNO of the representative point become substantially the center of the display 33. Thus, the area specified by the postal code number PCN is shown at the center of the display 33. In other words, the map data of the postal code number PCN area is shown substantially at the center of the display 33 without being deviated owing to the east longitude coordinate PEO of the representative point and the north latitude coordinate PNO of the representative point. Edges of the area may be partly cut depending upon the scale in which the map is displayed.

The area shape data address EA and the size ED specify a memory start address of data related to the outer shape of the area specified by the postal code number PCN and the memory size. The outer shape data include latitude data and longitude data (geographical coordinates) of a plurality of places along the outer edge of the area, and a postal code number PCN area is determined within a map depending upon the map data in the data storage medium 37. When the latitudes and longitudes are all included in the picture on the display 33, the edges of the area specified by the postal code number are not cut.

Thus, the postal code number selection data 150 consists of a group of data with the postal code number PCN, street list address LA, facility genre lists address NA, east longitude coordinate PEO of a representative point, north latitude coordinate PNO of a representative point and area shape data address EA as a unit. When a postal code number PCN is determined, therefore, an area is determined by the map data in the data storage medium 37.

Accordingly, the specified postal code number PCN (telephone number) area is displayed nearly at the center of the display output means based upon the data of representative points of the area, and an optimum scale is selected based upon the shape data of the area, so that the area is displayed on the display output means without cutting the edges.

Moreover, the east longitude coordinate of a representative point and a north latitude coordinate of a representative point may be selected depending upon a portion (some significant digits) of the postal code and the telephone number. That is, with part of the postal code number (telephone number) PCN being input, the area is determined for part of the postal code number (telephone number) PCN that is input. For example, when the two significant digits "12" only are input among the three digits "123" of the postal code number (telephone number) PCN, the area corresponding to the significant digits "12" of the postal code number or the telephone number that is input may be displayed. Like the postal code number (telephone number) PCN, a discrimination number may be imparted depending upon the sections, classifications or the sectionalized areas under predetermined conditions. Examples may be numbers or symbols depending upon prefectures, cities, towns and villages; numbers or symbols depending upon the states; numbers or symbols depending upon the time zones; or numbers or symbols depending upon the nations in the European community.

21. Street List Data

FIG. 56 illustrates the structure of the street list data 155. The street list data 155 comprises group data of the streets of a number SS(m) and are stored starting from a head address indicated by a street list address LA. The street list data 155 for each street comprises a street name SSN, an east longitude coordinate SEO of a representative point, a north latitude coordinate SNO of a representative point, shape data address SEA and size SED.

The street name SSN represents the name of an m-th street. The street name may include national road name (national road number), local road name (local road number) or expressway name (expressway number). The east longitude coordinate of SEO of the representative point and the north latitude coordinate SNO of the representative pint represent the longitude and latitude (geographical coordinates) of a representative point on the street. The representative point is at the center of the street but may be an end of the northeast side, an end of the southwest side, an end of the northwest side or an end of the southeast side.

The shape data address SEA and size SED specify a memory start address of the geographical coordinate data of the nodes of the street and a memory area. The outer shape of the street is determined depending upon the geographical coordinate data of the nodes. The shape of the street of the street name SSN is shown on the display 33 by using the east longitude coordinate SEO of the representative point, north latitude coordinate SNO of the representative point and geographical coordinate data of the nodes.

When a street runs through a plurality of postal code number PCN areas, the street list data 155 of the streets are stored for each of the postal code number PCN areas, the street names SSN being the same, but the east longitude coordinates SEO of the representative point, north latitude coordinates SNO of the representative point, shape data addresses SEA and sizes SED being different from each other.

22. Facility Genre List Data

FIG. 57 illustrates a structure of facility genre list data 160. The facility genre list data 160 comprises a group of data of facility genres of a number of NC(k). Each facility genre list data 160 comprises a facility genre name NM, a facility list address NLA and size SED. The facility genre name NM represents the name of a genre.

The list data of facilities of the genre are stored in a memory region specified by the size NLD starting from a memory start address specified by the facility list address NLA. Therefore, the geographical coordinates of the facilities pertaining to the facility genre name NM and names of the facilities are identified relying upon the data read from the memory specified by the facility list address NLA and the size NLD.

23. Street Shape Data

FIG. 58 illustrates a structure of street shape data 165. The street shape data 165 comprise a group of data of nodes of a number of ES(t). Each street shape data 165 is constituted by east longitude coordinate EEO, north latitude coordinate ENO, address EB and street name SSN. A geographical position of a node in the map data in the data storage medium 37 is determined by the east longitude coordinate EEO and the north latitude coordinate ENO. The address EB represents address data of the address of the node, which is displayed along the street (node) when the street is shown on the display 33, and whereby the address is recognized along the street.

24. Facility List Data

FIG. 59 illustrates a structure of facility list data 170. The facility list data 170 a group of data of facilities of a number of IS(u). The facility list data 170 represents a plurality of facilities pertaining to a genre in the facility genre list data 160 shown in FIG. 57.

Data for each facility of the facility list data 170 comprises a facility name IM, east longitude coordinate IEO, north latitude coordinate INO and address IB. The facility name IM is specific to a facility. The east longitude coordinate IEO and the north latitude coordinate INO represent the longitude and latitude (geographical position) of the facility. The position of the facility on the map is determined by the east longitude coordinate IEO and the north latitude coordinate INO. The address IB represents the address.

The street name SSN represents the name of a street (guide road) near the facility. Therefore, when there exist a plurality of streets (guide roads) around a facility, the plurality of street names SSN are stored in the data of the facility. The street names SSN are the same as the street names SSN in the street list data 155 of FIG. 56. The guide road stand for roads identified by the route search processing that will be described later.

25. Area Shape Data

FIG. 60 illustrates the structure of a data sequence in the area shape data 175. As described earlier, the area shape data 175 shows the outer edge of the postal code number PCN area on the map and determines the area shape. That is, the geographical range of the area determines the geographical shape (position) of the outer circumference using a plurality of nodes. Each point, or node, of the area shape data 175 comprises a longitude and a latitude, i.e., by an east longitude coordinate AEO and a north latitude coordinate ANO. The node number data ANC(v) represents the number of nodes.

26. Destination Setting Processing (Step 51 of FIG. 6)

Figure 61:
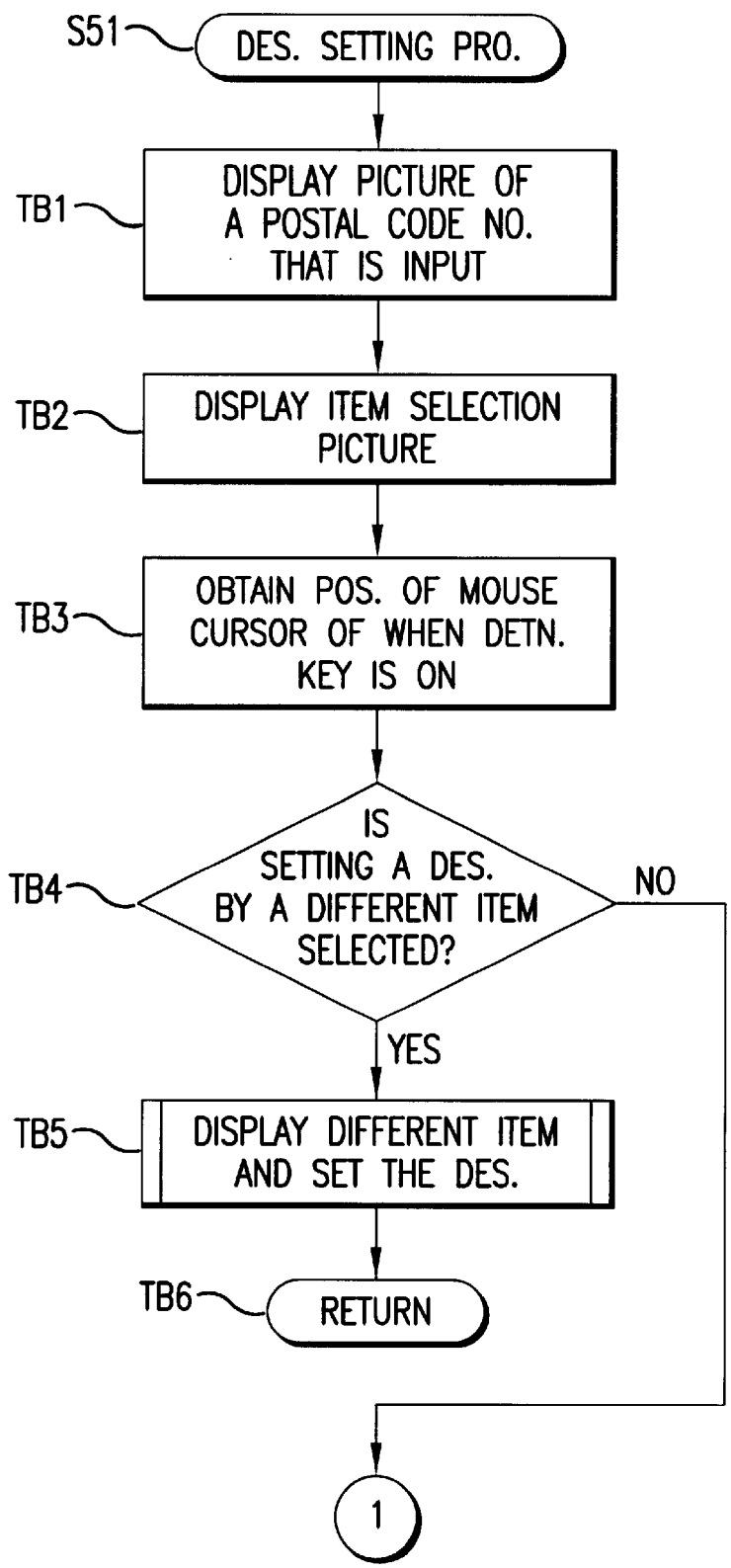
FIGS. 61 and 62 are a flowchart illustrating at the processing for setting a destination.
Figure 68:
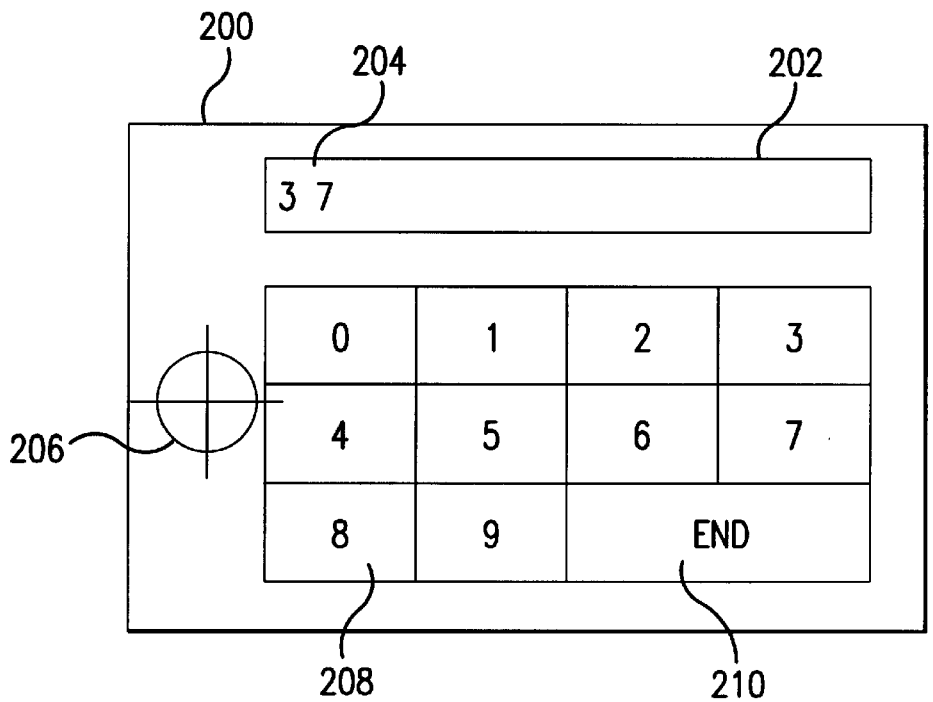
FIG. 68 is shows a display for inputting a postal code number.

FIGS. 61 to 65 are flowcharts of a destination setting processing executed by the CPU 2 in the navigation device of the invention. FIGS. 61 and 62 illustrate the entire destination setting processing (step 51 of FIG. 6). First, as shown in FIG. 68, a postal code number that is input is shown on the display 33 (step TB1), and on a picture 200 are displayed a row 202 for displaying input numerals, numerical FIGS. 208 of from 0 to 9, and a character "END" 210 for selecting the completion of input of numerals. There is further displayed a mouse cursor 206 capable of freely moving on the picture 200. As the mouse cursor 206 is moved over the numerals 208 and a determination input key is depressed, the numerical figure is recognized by the navigation device. The determination input key is a key switch provided on the navigation device.

The mouse cursor 206 may be moved by a small joy stick, and the determination input key may be replaced by a switching mechanism which works when the joy stick is depressed. In FIGS. 68, 69 70 and 71, the mouse cursor 206 may not be displayed, but the items displayed on the picture 200 may be selected by the joy stick, and the color in the frame of the selected item based on the position of the joy stick may be changed to identify the selection.

Figure 69:
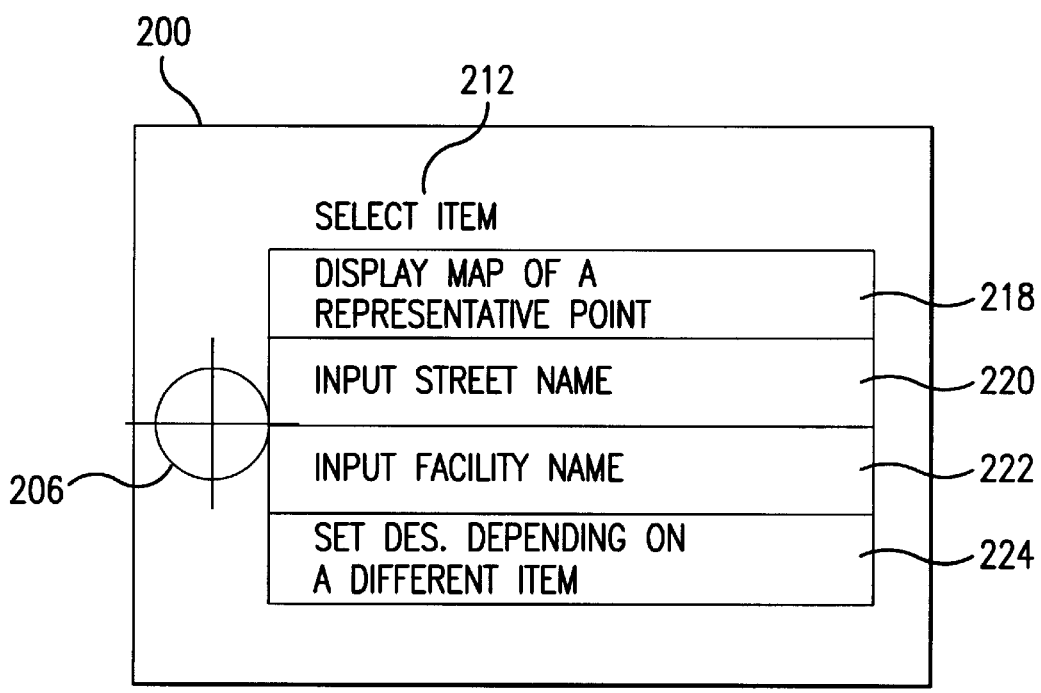
FIG. 69 illustrates display for selecting items.

A numeral input through the picture of FIG. 68 is treated as a postal code number PCN. A postal code number selection data 150 (FIG. 55), in agreement with the postal code number PCN that is input, is identified and is read from the data storage medium 37. Then, as shown in FIG. 69, the item selection picture is shown on the display 33 (step TB2) to display characters "DISPLAY MAP OF A REPRESENTATIVE POINT" 218, characters "INPUT STREET NAME" 220, characters "INPUT FACILITY NAME" 222 and characters "SET DESTINATION DEPENDING ON A DIFFERENT ITEM" 224.

When the mouse cursor 206 is moved by the operator and the determination is depressed, the position of the mouse cursor 206 on the picture 200 is discriminated and is obtained by the CPU 2 (step TB3). Thus, the data displayed at the position of the mouse cursor 206, or by the distinguishing color, is selected. For example, when the determination key is depressed in a state where the mouse cursor 206 is displayed being superposed on the characters "DISPLAY MAP OF A REPRESENTATIVE POINT" 218, the processing for displaying a map of a representative point is selected.

When setting a destination depending on a different item 224 is detected (step TB4), the processings of FIG. 62 are skipped, and no processing is executed to set a destination in the area specified by the postal code number PCN. Instead, a subroutine is executed for setting the destination based on a different item (step TB5) and the processing is executed to directly select the destination from, for example, the address of the destination. Thereafter, the processing returns back to the main flow of FIG. 6.

However, when setting the destination by a different item 224 is not detected (step TB4), any one of the processings for displaying a map of a representative point, the processing for inputting the street name, or the processing for inputting the facility name is selected in the process for selecting an item at steps TB2 and TB3. The selected result is stored in the mode setting data MD.

When a mode for displaying a map of a representative point has been selected (YES at step TC1) relying upon the mode setting data, a subroutine "DISPLAY MAP OF A REPRESENTATIVE POINT AND SET DESTINATION" is executed (step TC2). When a street input mode has been selected (YES at the step TC3), the subroutine "DISPLAY STREET NAME AND SET DESTINATION" is executed (step TC4). When a mode for setting depending on a genre has been selected (YES at the step TC5), a subroutine "DISPLAY GENRE LIST AND SET DESTINATION" is executed (step TC6).

Figure 63:
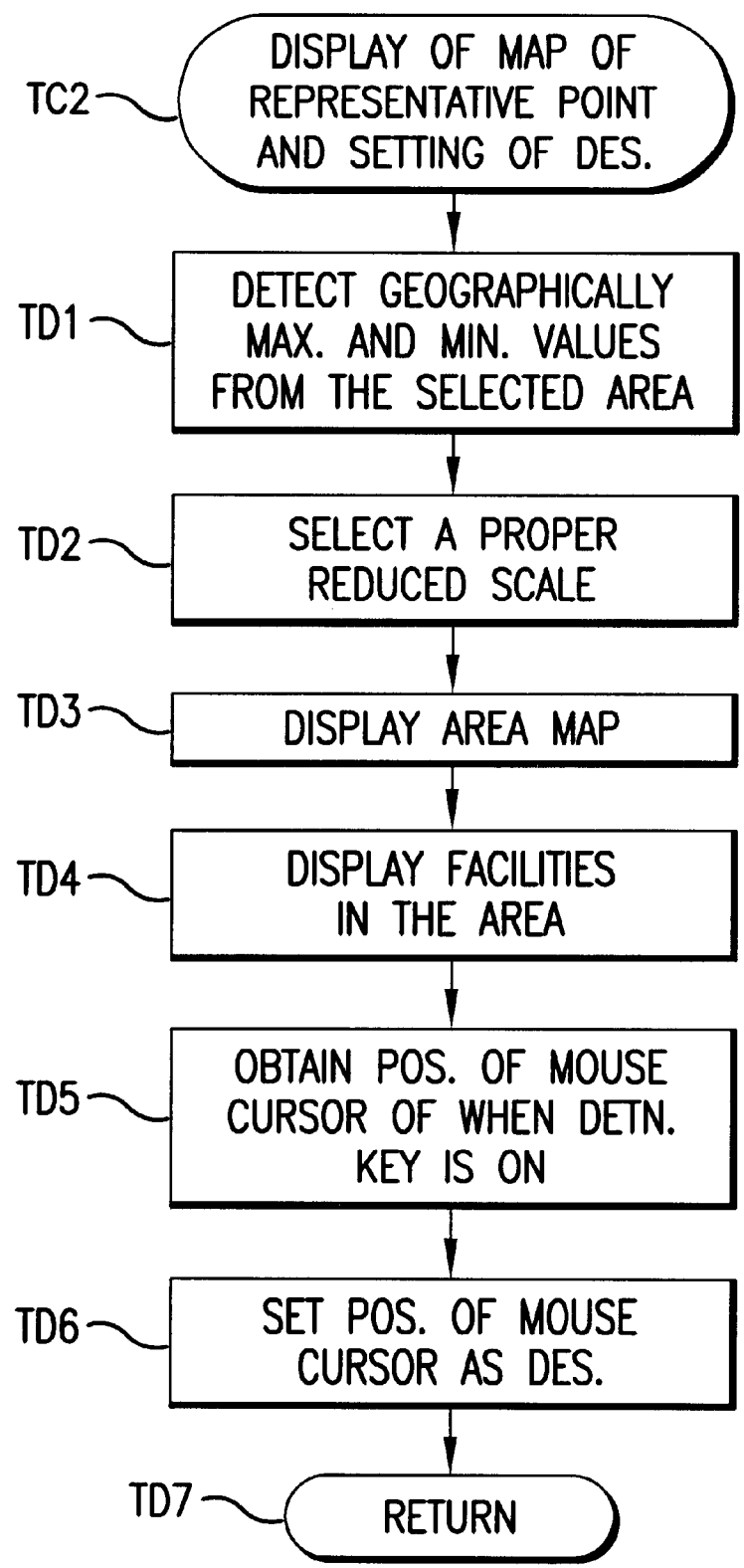
FIG. 63 is a flowchart of the processing for displaying a map of representative points and for setting a destination.

27. Subroutine for Displaying Map of a Representative Point and for Setting Destination FIG. 63 is a diagram of the subroutine for displaying map of a representative point and for setting a destination. The subroutine of FIG. 63 is executed when a mode for displaying map of a representative point is selected at steps TB2 and TB3 in FIG. 61. The postal code number selection data 150 specified by a postal code number PCN is read from the data storage medium 37. The postal code number PCN is input at step TB1. Furthermore, the area shape data address EA and size ED recorded in the postal code number selection data 150 are read.

East longitude coordinates AEO and north latitude coordinates ANO (FIG. 60) of the nodes defining the outer edge (outer circumference) of the area are read out from the memory region specified by the area shape data address EA and the size ED. Maximum values and minimum values are picked from the east longitude coordinates AEO and the north latitude coordinates ANO of the nodes (step TD1).

A scale of the map to be shown on the display 33 is found from the maximum values and minimum values of the east longitude coordinates AEO and north latitude coordinates ANO (step TD2). Accordingly, the edges of the area of the postal code number PCN are not cut, and the whole area is properly shown on the display 33. The geographical range of the area specified by the postal code number PCN is determined by the area shape data 175. The map data shown on the display 33 are stored in the data storage medium 37.

Figure 72:
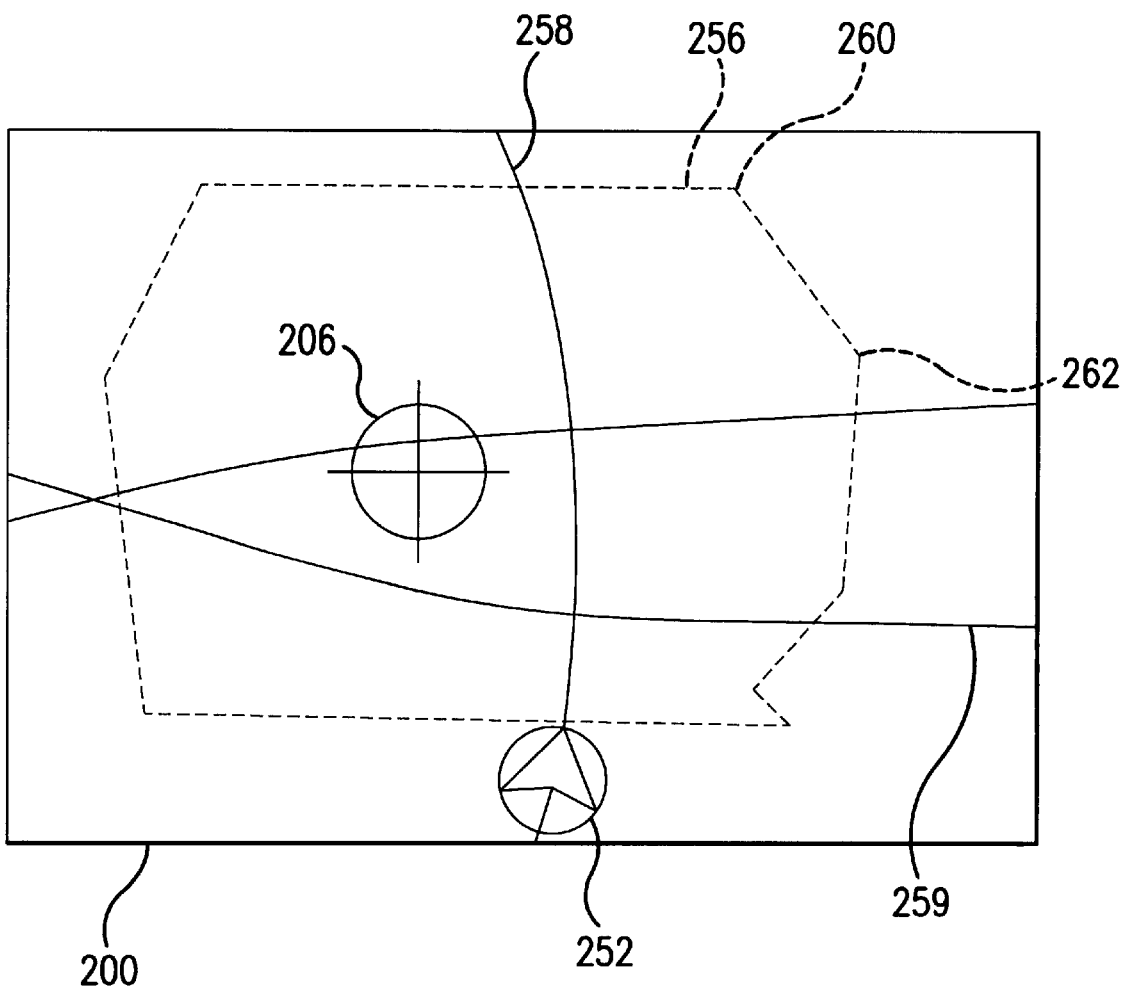
FIG. 72 shows the display of an area.

As shown in FIG. 72, the specified area is shown on the display 33 in the determined scale (step TD3). The specified area is surrounded by a dotted line 256. Turning points 260 and 262 represent nodes, symbol 252 represents the present position of the car, and curves 258 and 259 represent roads. Step TD3 uses the street shape data 265 of the areas of FIG. 58 to show the shapes of all streets or principal streets within the specified area.

The processing for selecting a proper scale of the display of step TD2 may be omitted, or the proper scale may be selected by the operator. When the processing of step TD2 is omitted, the area map shown on the display 33 is the one having the largest scale and the east longitude coordinate PEO and the north latitude coordinate PNO of a representative point (FIG. 55) of the specified area are located at the center of the display 33.

Symbols specific to the coordinates displayed, depending upon the geographical coordinates of the facilities, use map symbols stored in the ROM 5 and the facility list data 270 of FIG. 59, when the facilities within the specified area are displayed (step TD4). The symbols include star, circle, triangle, square, fork, cup, shoe, flag, house, etc. The facilities may be limited to display only when the area map is displayed on the display on the largest scale, i.e., the smallest area shown.

When the mouse cursor 206 indicated on the display 33 is moved by the operator and the determination key is depressed, a given point is specified on the displayed map area and becomes a desired destination (step TD5). A practical geographic coordinate position is found by calculation from the cursor position. The geographic coordinate position is stored as the registered destination data TP in the RAM 4 (step TD6).

Thereafter, the processing returns to the main flow of FIG. 6 (step TD7). Any drop-in place is set using a procedure the same as the one just described for designating a destination. The geographical coordinates of the drop-in place are also written as registered destination data TP. However, the geographical coordinates of the drop-in place may be stored in another memory region of the RAM 4.

28. Subroutine for Displaying Street Name and for Setting Destination

FIG. 64 is a diagram for a subroutine for displaying the street name and for setting the destination. The processing of FIG. 64 is executed in the mode for inputting street when the answer of step TC3, of FIG. 62, is YES. First, all streets in the area specified by the postal code number PCN are read out and are displayed (step TE1). All streets are listed using the street list data 155 of FIG. 56. The street list data 155 contains street names within the area specified by the postal code number PCN. Therefore, the streets are listed by the street names only from the street list data 155.

Figure 70:
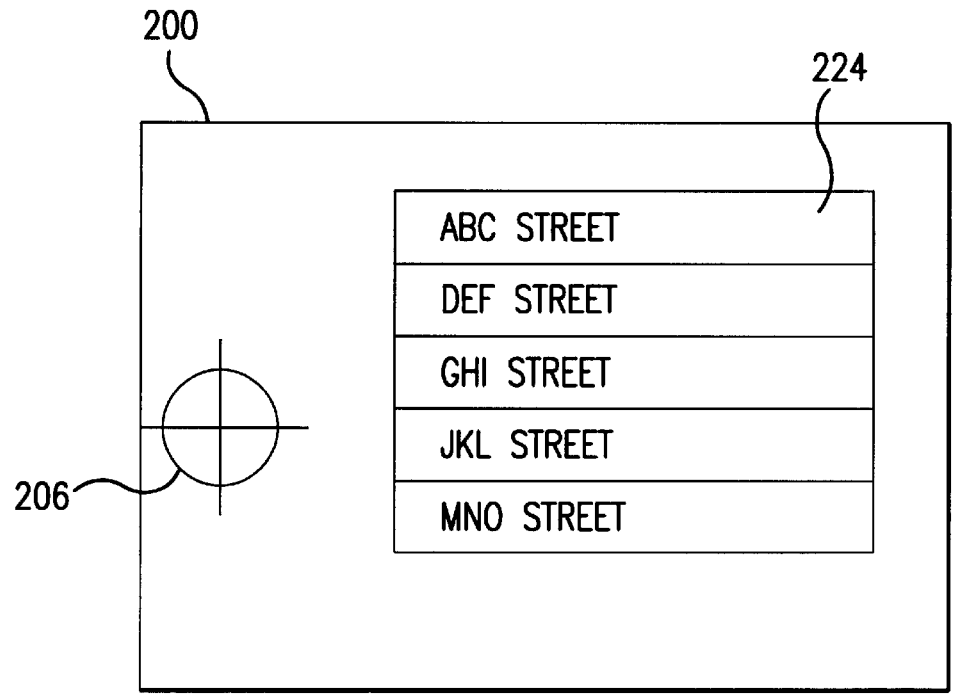
FIG. 70 shows the display of a street list.

A list of the street names identified at step TE1 is displayed on the display 33 as shown in FIG. 70 (step TE2). When there is a great number of streets SS(m), all streets cannot be displayed at one time on the display 33. Therefore, the street names are reviewed by scrolling the list on the display 33. The street names may also be presented by voice while they are being displayed. The position where the mouse cursor 206 is indicated is obtained at a moment when the determination key is depressed (step TE3) and the indicated street is selected (step TE4).

The east longitude coordinate SEO of a representative point and the north latitude coordinate SNO of a representative point of the selected street are read out from the street list data 155 (step TE5). In addition, the street shape data 165 of the selected street are read from the data storage medium 37. The street shape data 165 includes east longitude coordinates EEO and north latitude coordinates ENO of the nodes and determines the shape of the street. Maximum values and minimum values of the east longitudinal coordinates EEO and of the north latitude coordinates ENO of the nodes are also found (step TE6).

The maximum values and minimum values are calculated in the same manner as in step TD1 for displaying the area map. An appropriate scale for the map to be displayed on the display 33 is found from the maximum values and minimum values of the thus found east longitudes and north latitudes, and the streets are displayed on the display 33 in the thus determined scale (step TE7). Addresses accompanying the streets are displayed together with the streets. The street names may also be presented by voice while the streets are being displayed.

Figure 73:
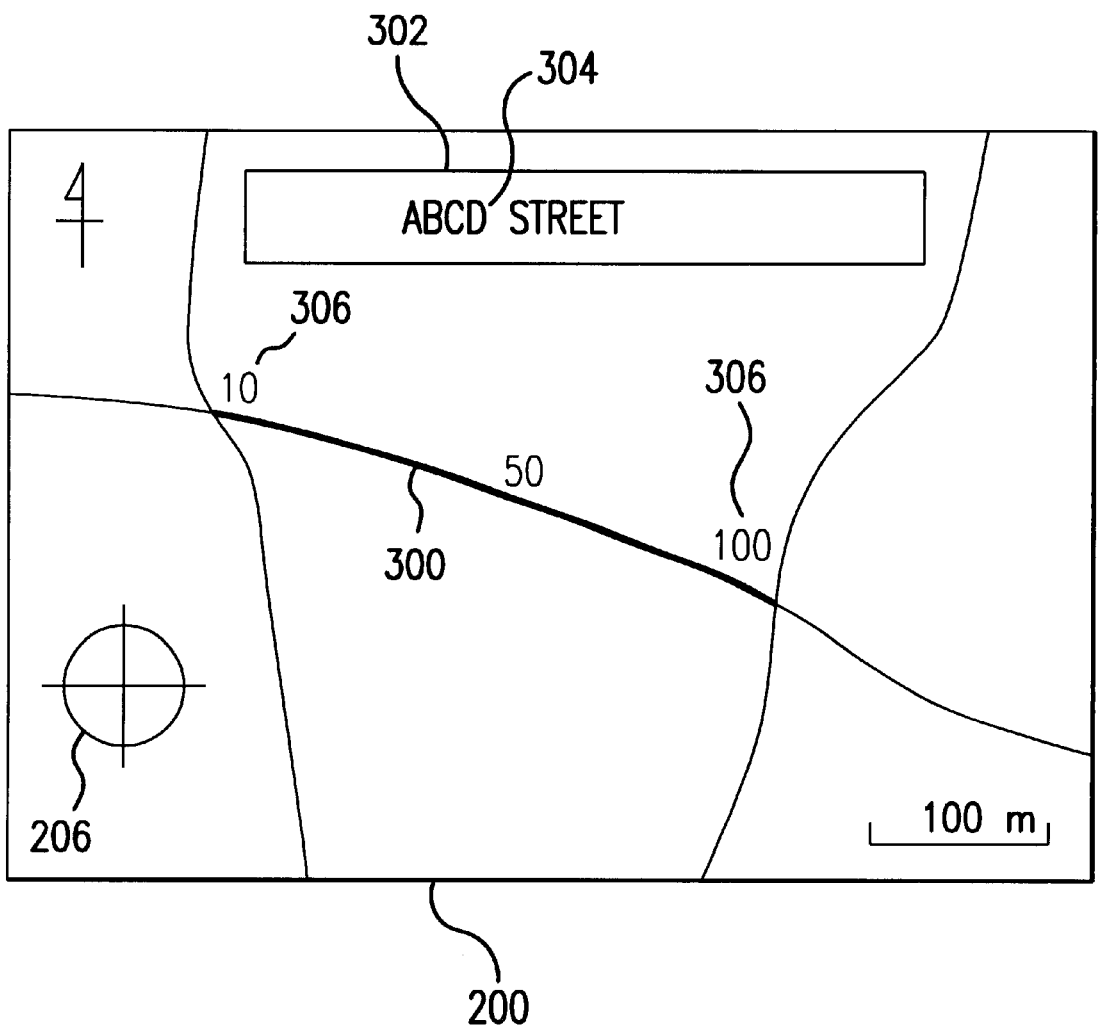
FIG. 73 shows the display of the streets.

FIG. 73 shows the streets displayed on the display 33. As shown, the street that is selected is distinguished from the other roads on the picture 200. In FIG. 73, the selected street is represented by a thick line 300. In practice, the selected street may be identified using a characteristic color that can be discriminated. The name of the selected street is indicated by characters 304 in a display region 302 at an upper part of the picture 200. The name of the displayed street is the street name SSN in the street list data 155. The characters 306, in FIG. 73, represent an address. The address is displayed by using data of address ENO in the street list data 155.

If the proper scale cannot be, or is not, calculated at step TE7, a map is displayed showing the street at the largest scale with a representative point of the street substantially at the center of the picture 200. The representative point of the street is determined based upon the east longitude coordinate SEO and the north latitude coordinate SNO of a representative point in the street list data 155.

When the mouse cursor 206 is moved and the determination key is depressed, a position of the mouse cursor 206 on the picture 200 is detected, and a destination is specified (step TE8). The practical geographic coordinate position of the destination is calculated, and the thus found geographic coordinate position is stored as registered destination data TP in the RAM 4 (step TE9).

Thereafter, the processing is returned to the main flow of FIG. 6 (step TE10). Any drop-in position is also set using a procedure substantially the same as the one for setting the destination. The geographic coordinates of the drop-in place are written as registered destination data TP or they may be stored in another memory region of the RAM 4. In displaying the street, at step TE7, the entire specified area inclusive of the street may be displayed.

29. Subroutine for Displaying Genre List and for Setting Destination

Figure 65:
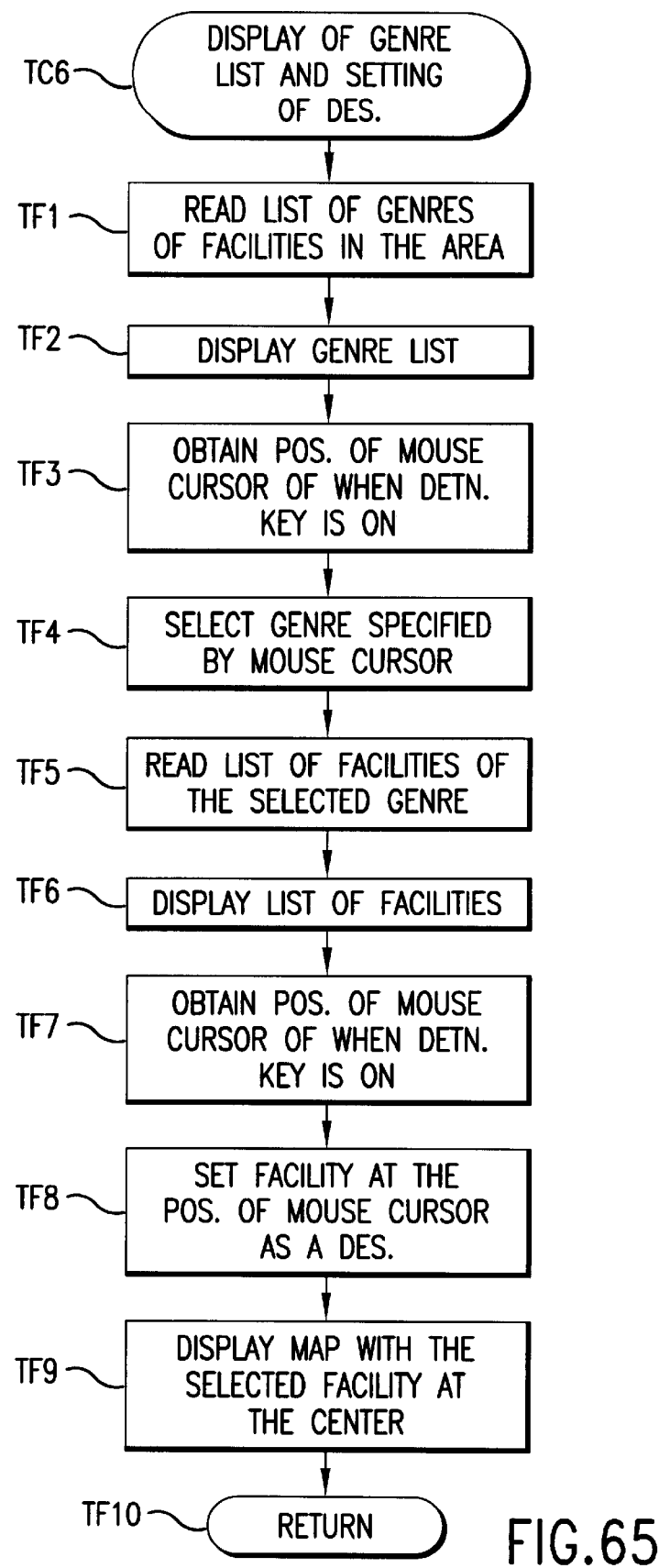
FIG. 65 is a flowchart of the processing for displaying a genre list and for setting a destination.

FIG. 65 is a flowchart for a subroutine for displaying a genre list and for setting a destination on that basis. First, genres of facilities in the area specified by a postal code number PCN are listed (step TF1). The genres are listed using the facility genre list data 160 of FIG. 57 with a memory region for storing the genre list data 160 in the data storage medium 37 specified by the facility genre list address NA of the postal code number selection data 150 and the size ND.

Figure 71:
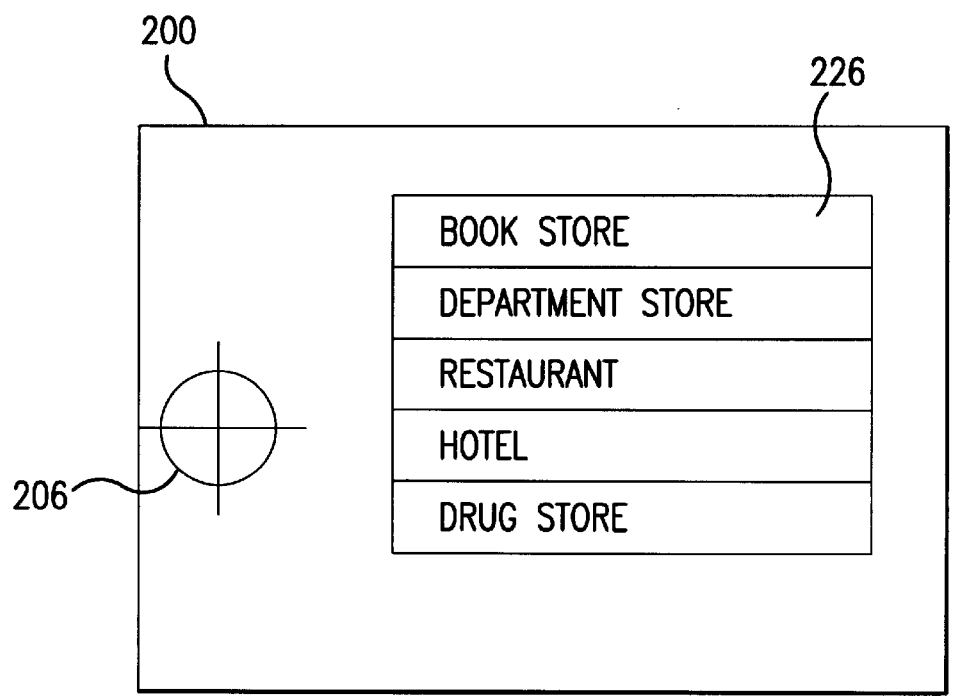
FIG. 71 shows the display of a genre list.

Next, facility genre names NM of a number of NC(k) are read from the facility genre list data 160, and the genre list is displayed on the display 33, as shown in FIG. 71 (step TF2). Then, when the determination key is depressed, the position of the mouse cursor 206 displayed on the picture 200 is obtained (step TF3).

When the genre of the displayed position is selected (step TF4), facilities pertaining to the selected genre are listed using the facility list data 170 of FIG. 59 (step TF5). The memory region of the facility list data 170 is specified by the facility list address NLA and the size NLD. The facility list address NLA and the size NLD are included in the facility genre list data 160. That is, when the genre is determined, a list of facilities pertaining to the genre and existing in the specified area is readily read from the data storage medium 37.

Next, the facility names IM only are drawn from the facility list data 170 and displayed on the display 33 (step TF6). When the determination key is depressed, the position of the mouse cursor 206 displayed on the picture 200 is obtained (step TF7), and the facility at the thus obtained position is set as a destination (step TF8).

Then, the east longitude coordinate IEO and the north latitude coordinate INO of the thus selected facility are read from the facility list data 170. Based upon the east longitude coordinate IEO and the north latitude coordinate INO, a map containing the specified facility is displayed on the display 33 (step TF9). Here, the scale may be such that the map is displayed at the largest scale or may be a scale selected by the operator. Further, the facility name may be presented by voice while the map around the specified facility is being displayed. Thereafter, the processing returns to the main flow of FIG. 6 (step TF10).

According to the embodiment just described, a particular area is specified by the postal code number PCN and, then, plural kinds of data (three kinds, three modes) are displayed on the display 33, making it easy to designate the destination.

30. A Further Embodiment

Figure 66:
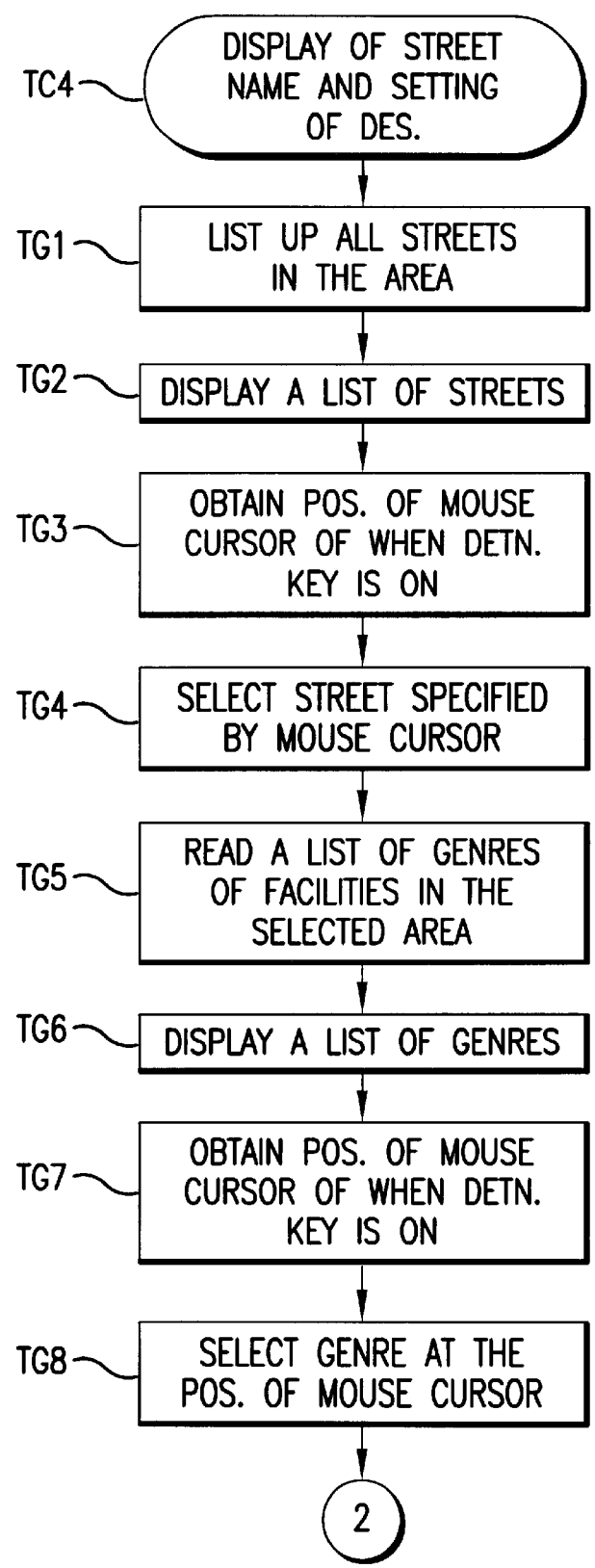
FIGS. 66 and 67 are a flowchart illustrating another processing for displaying street names and for setting a destination.
Figure 67:
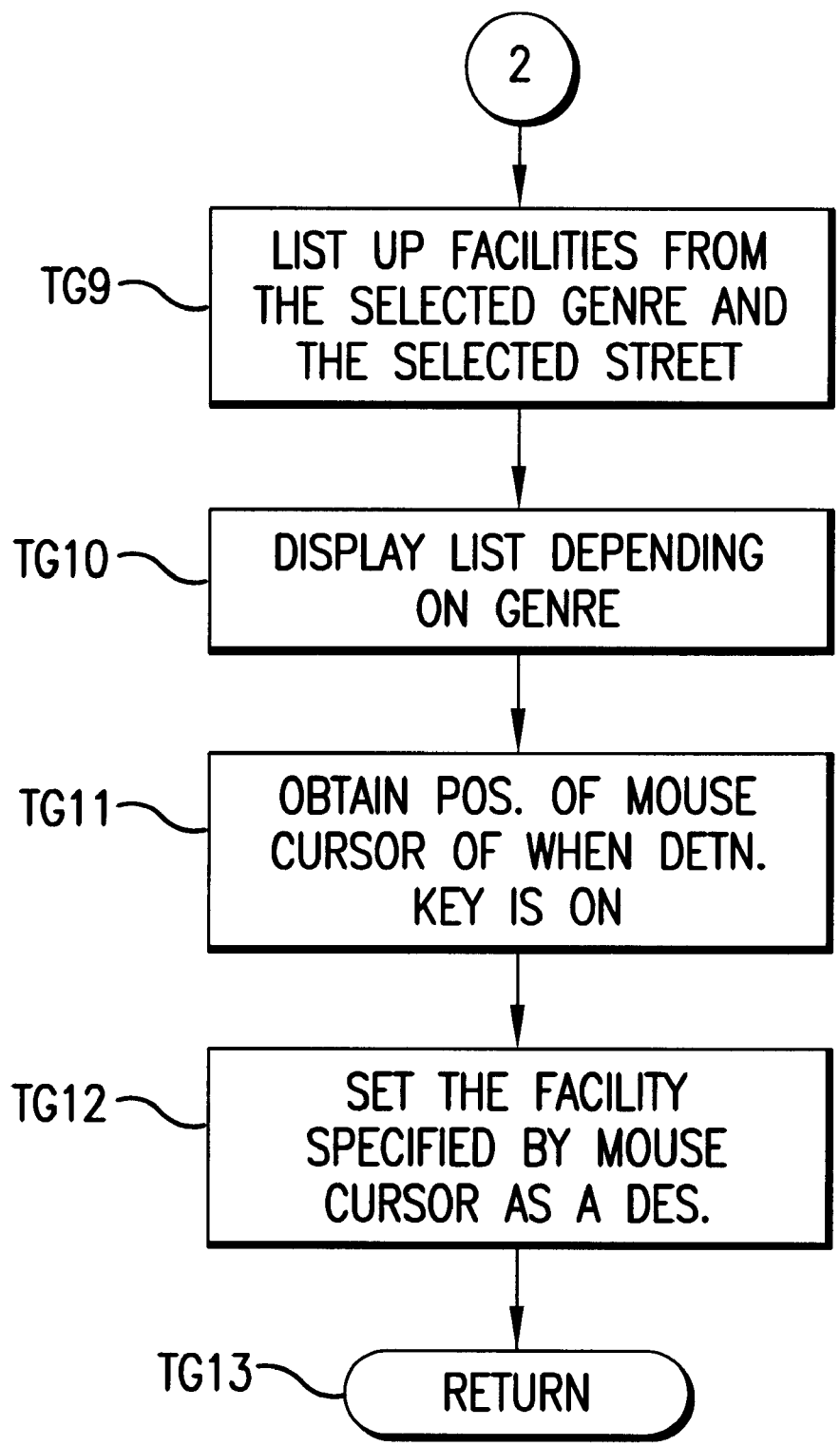

FIGS. 66 and 67 are a flowchart illustrating a further embodiment. In this embodiment, a particular area is specified by the postal code number PCN, a particular street is selected from the streets in the area, facilities around the selected street are listed, and a desired destination is selected from the facility names that are listed. The description of the previously described embodiments also applies unless excluded here.

The processing of FIGS. 66 and 67 is that of another embodiment of the subroutine for displaying the street name and for setting the destination of FIG. 64. Therefore, even this embodiment executes the destination setting processing of FIGS. 61 and 62, the subroutine for displaying the map of a representative point and for setting a destination of FIG. 63, and a subroutine for displaying the map of a representative point and for setting a destination of FIG. 63, and a subroutine for displaying a genre list and for setting a destination of FIG. 65. Therefore, the description related to FIGS. 61, 62, 63 and 65 is not repeated.

First, all streets in the area specified by the postal code number PCN are read using the street list data 155 of FIG. 56 (step TG1). The street list data 155 stores all street names within the area of the postal code number PCN, the street names only are drawn from the street list data 155, and those street names are made into a list.

Then, the list of the street names is displayed on the display 33 (step TG2). When there are so many streets SS(m) they cannot be displayed at one time on the display 33, the display 33 is scrolled so that all street names can be reviewed. The street names may also be presented by voice while they are being displayed. When the determination key is depressed, the position of the mouse cursor 206 on the list being displayed is obtained (step TG3) and the street designated by the cursor is selected (step TG4).

Next, a genre list of the specified area is formed by using the facility genre list data 160 (step TG5) and is displayed on the display 33 (step TG6). The processing for displaying the genre list is the same as the processing of the step TF6 of FIG. 65. When the determination key is depressed, a position of the mouse cursor 206 on the picture 200 is detected (step TG7), and the genre at that position is selected (step TG8). The facility list data 170 of FIG. 59 are read based upon the selected genre. Here, since the genre is determined, the facility list addresses NLA and the sizes NLD are, first, read from the facility genre list data 160 of FIG. 57, and the facility list data 170 are read from a group of addresses specified by the facility list addresses NLA and the sizes NLD. The facility list data 170 include addresses IB of the facilities.

On the other hand, the street shape data 165 are read depending upon the street name specified at the step TG4. The memory region of the street shape data 165 is specified by the shape data address SEA of the street list data 155 and the size SED. The street shape data 165 contain addresses ENO of nodes defining the street (FIG. 58).

The addresses ENO of the specified street are compared with addresses IB of facilities in the facility list data 170. Facilities of the addresses IB of values close to the addresses ENO of the street are listed (step TG9). In the comparison of the addresses IB with the addresses ENO, it is determined whether differences between the addresses IB and the addresses ENO are smaller than a predetermined value.

The facility names listed at step TG9 are selected from the facility list data 170 and are displayed on the display 33 (step TG10). Then, when the determination key is depressed, a position of the mouse cursor 206 on the picture 200 is detected (step TG11), and the facility at the position of the cursor is registered as a destination. That is, the east longitude coordinate IEO and the north latitude coordinate INO of the facility list data 170 are stored as registered destination data TP in the RAM 4 (step TG12).

Thereafter, the processing is returned to the main flow of FIG. 6 (step TG13). Any drop-in place is set according to a procedure substantially the same as the one described for setting a destination. The geographical coordinates of the drop-in place are written into the registered destination data TP or they may be stored in another memory region of the RAM 4.

After the facility is registered as a destination at the step TG12, the street selected at the step TG4 may be displayed on the display 33 with the registered destination at a center. At the time of displaying the street, the map may be displayed on a proper scale in the manner of steps TE5 and TE6 of FIG. 64 or the map may be displayed on the largest scale with the specified facility as the center. The facility name or the street name may also be presented by voice while the map around the specified facility is being displayed.

According to the invention as described above, a particular area is, first, specified by the postal code number PCN. Next, a particular street is selected from the streets in the area. Then, the facilities around the selected street are listed. Finally, a desired destination is selected from the facility names that are listed. Thus, a desired destination can be easily identified.

31. Still Further Embodiment

Figure 74:
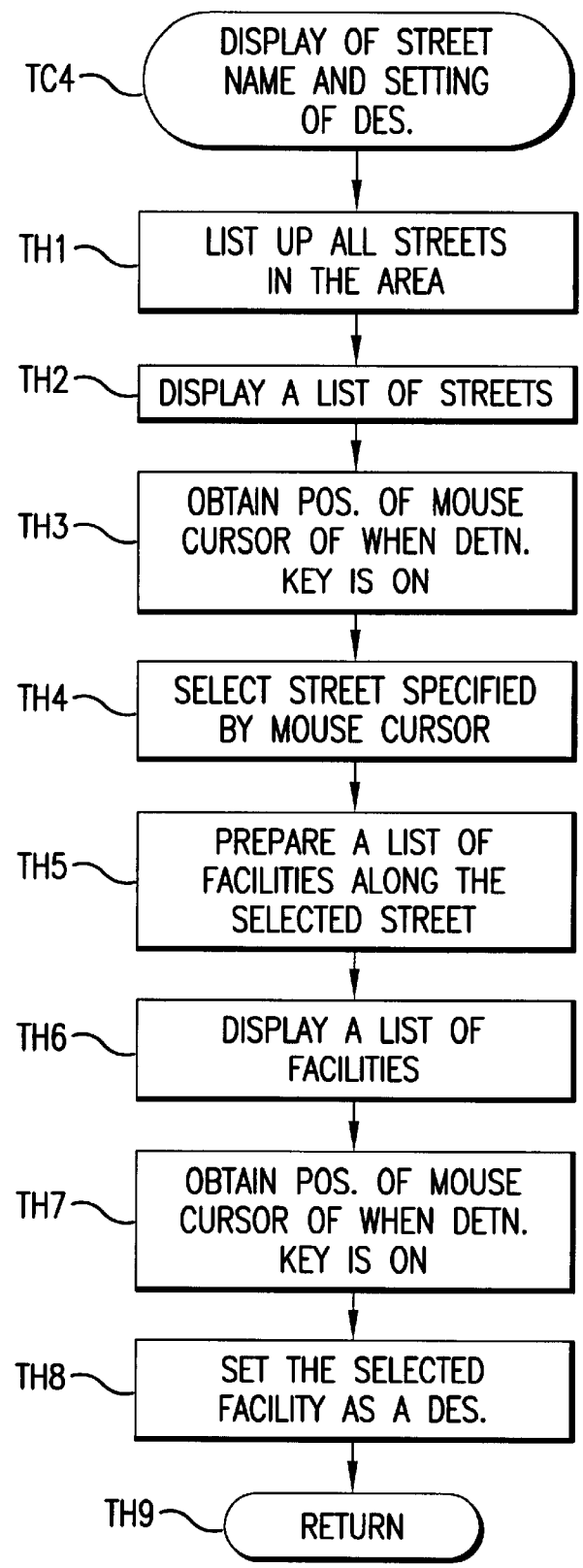
FIGS. 74 to 76 are flowcharts illustrating other examples.

FIG. 74 is a flowchart illustrating a further embodiment. In this embodiment, a particular area is specified by the postal code number PCN, a particular street is selected from the streets in the area, facilities along the selected street are listed, and a desired destination is selected from the facility names that are listed. The description of the aforementioned embodiments applies as incorporated into the embodiment described here. The processing of FIG. 74 is another embodiment of the subroutine for displaying the street name and for setting the destination of FIG. 64. Therefore, even this embodiment executes the destination setting processing of FIGS. 61 and 62, the subroutine for displaying the map of a representative point and for setting a destination of FIG. 63, and a subroutine for displaying a genre list and for setting a destination of FIG. 65. Therefore, the description related to FIGS. 61, 62, 63 and 65 is not repeated.

First, all streets in the area specified by the postal code number PCN are picked using the street list data 155 of FIG. 56 (step TH1). The street list data 155 include street names within the area specified by the postal code number PCN. The street names only are drawn from the street list data 155, and all streets are listed.

Then, a list of the thus listed street names is displayed on the display 33 (step TH2). When there are too many streets SS(m) to be displayed at one time on the display 33, the display 33 is scrolled so that all street names can be reviewed. The street names may also be presented by voice while they are being displayed on the list. When the determination key is depressed, the position of the mouse cursor 206 on the list being displayed is obtained (step TH3) and the street indicated by the cursor is selected (step TH4).

Next, the facilities along the selected street are listed (step TH5). Here, a facility name IM, having a street name selected at the step TH4 associated therewith, is picked from the street names included in the facility list data 170. The facility list data 170 comprises data related to a plurality of facilities within an area and pertaining to any genre. The data related to the facilities includes name data of streets which are close or closest to the facilities (FIG. 59). Therefore, the facility name IM can be reversely searched from the street name in the facility list data 170.

The facility list data 170 form lists of facilities depending upon the genres. Therefore, when a plurality of facilities pertaining to a street are to be identified by using the facility list data 170, the facility list data 170 must all be identified. When there is a margin in the capacity of the data storage medium 37, the data file may be formed as described below. Namely, a data file capable of readily displaying, from a street name, a list of facilities adjacent to the street.

Moreover, the facility name data IM or the facility address data IA may be stored for each of the street data in the street list data 155 of FIG. 56 or for each of the node data in the street shape data 165 of FIG. 58. In this case, the facility name data IM are name data of the facilities close to the streets or to the nodes. The facility address data IA represent stored addresses of data related to the facilities close to the streets or the nodes. The facility name data IM are listed, or the facility name data IM identified based upon the facility address data IA are listed (steps TH5 and TH6).

Further, between step TH4 and step TH5, a processing may be executed for selecting a genre of facilities of steps TF1 to TF4 or of steps TI1 to TI4 that will be described below. In this case, step TH5 executes the reverse searching for only a selected genre of facilities.

The genres of facilities having a street name selected at step TH4 may be reversely identified from the facility genre list data 170 of FIG. 57, and the genres of facilities may be displayed as a list. In this case, the street name data SSN or the street address data SA are stored for each of the facility genre data in the facility genre list data 160 of FIG. 57.

Next, a list of facility names prepared in step TH5 is displayed on the display 33 (step TH6). When the determination key is depressed, a position of the mouse cursor 206 is obtained (step TH7) and the facility designated by the cursor is selected. Here, based upon the facility name that is selected, the east longitude coordinate IEO and the north latitude coordinate INO in the facility list data 170 are registered as the registered destination data TP (step TH8).

Thereafter, the processing is returned to the main flow of FIG. 6 (step TH9). A drop-in place may be set by a procedure substantially the same as the one just described. The geographical coordinates of the drop-in place are written into the registered destination data TP or they may be stored in a separate memory region in the RAM 4.

Instead of displaying the list of facility names at step TH6, the selected street may be shown on the display 33 with the facilities along the street shown as symbols together with the facility names. Then, the symbol on the display designated by the mouse cursor 206 is registered as the facility at the destination. Then, the destination is set while looking at a position on the map, and the navigation device can be used more conveniently.

Further, the names of the facilities may be presented by voice while the list of facilities is being displayed at step TH6. When a facility is determined as a destination at step TH8, the name of the facility may be presented by voice.

According to this embodiment, as described above, a particular area is first specified by a postal code number PCN. Next, a particular street is selected from the streets in the area. Then, the facilities along the selected street are listed. Finally, a desired destination is selected from the facility names that are listed. Thus, a desired destination is easily identified.

32. Yet Further Embodiment

Figure 75:
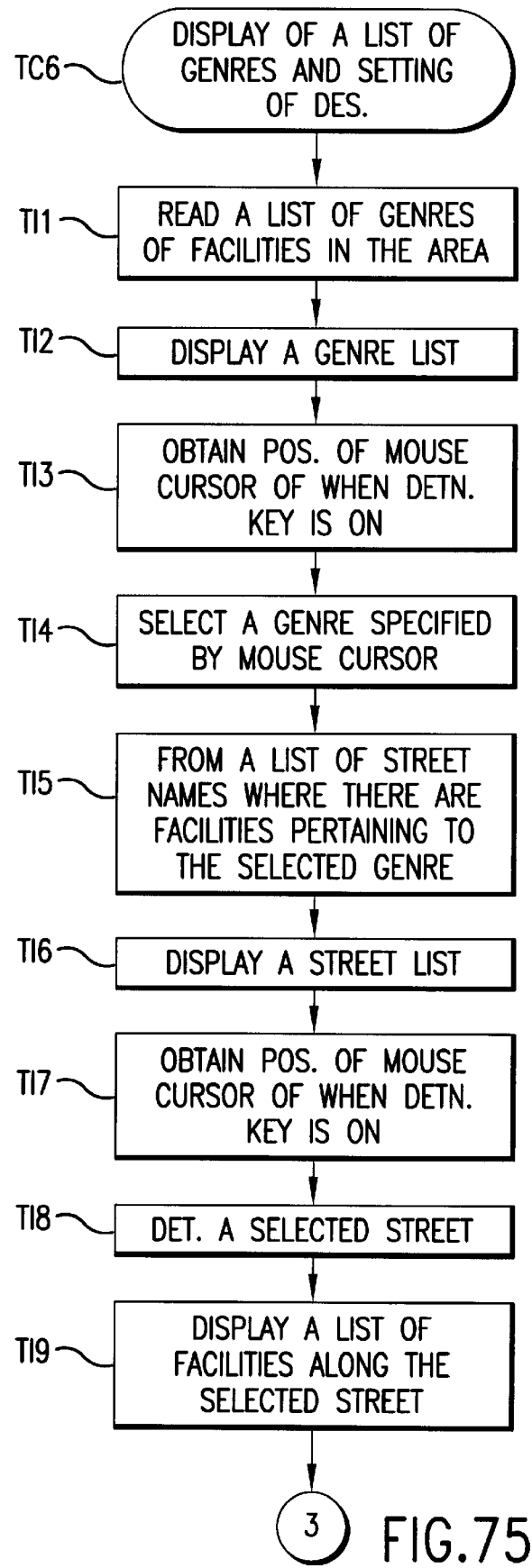
Figure 76:
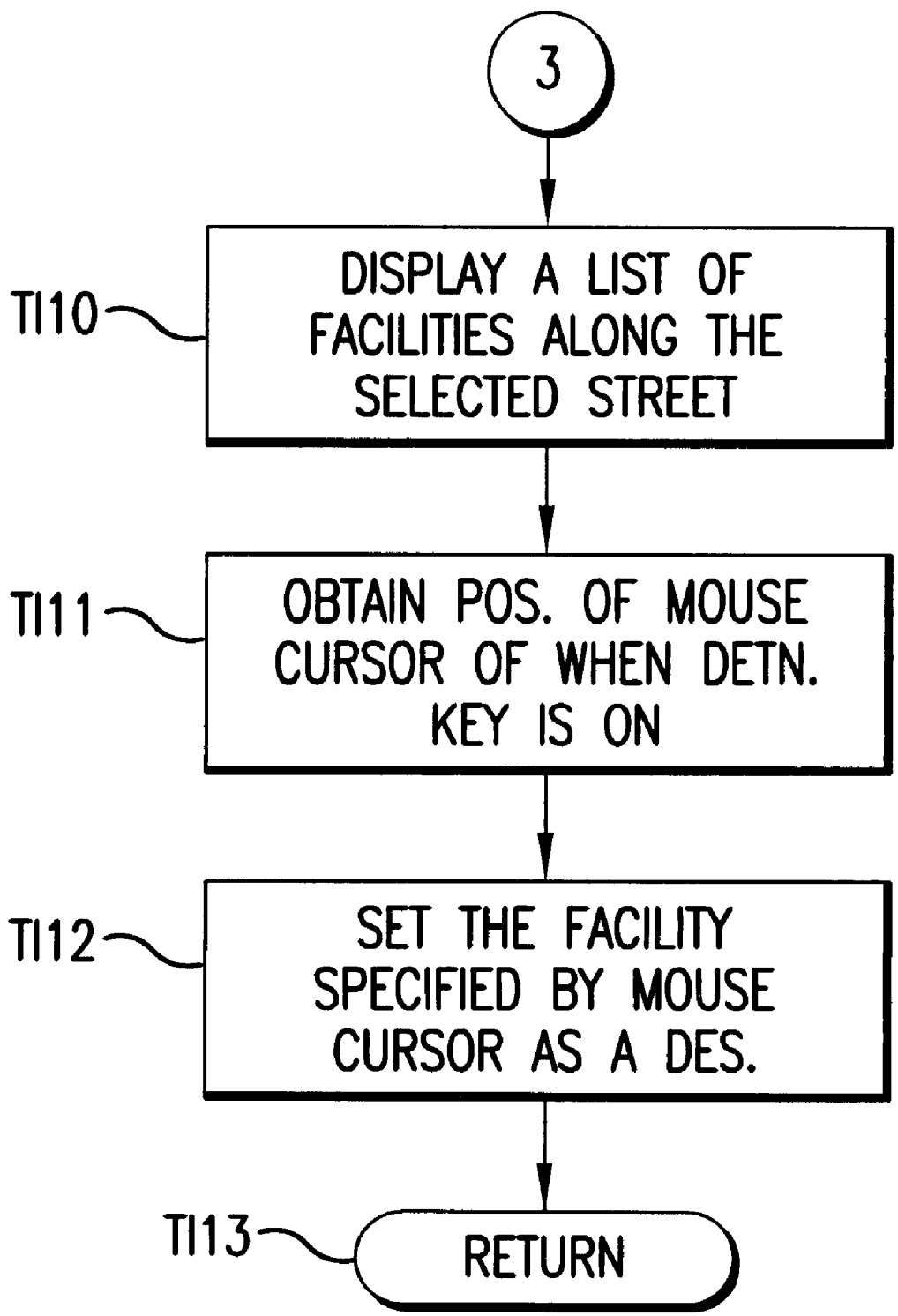

FIGS. 75 and 76 are a flowchart illustrating a yet further embodiment. In this embodiment, a particular area is specified by a postal code number PCN, a genre of facilities in the specified area is shown on the display 33, street names of the facilities in the specified genre are displayed, and the facilities are selected based upon the street names. The description of the aforementioned embodiments, as they are incorporated herein, applies to the contents other than those additionally described here. The processing of FIG. 74 is that of yet another embodiment of the subroutine for displaying the genre list and for setting the destination of FIG. 65. Therefore, even this embodiment executes the destination setting processing of FIGS. 61 and 62, the subroutine for displaying the map of a representative point and for setting a destination of FIG. 63, and a subroutine for displaying street names and for setting a destination of FIG. 64. Therefore, the description related to FIGS. 61, 62, 63 and 64 is not repeated.

First, the genres of facilities in an area specified by a postal code number PCN are listed by using the facility genre list data 160 of FIG. 57 (step TI1). The memory region of the facility genre list data 160 is specified by the facility genre list address NA and the size ND in the postal number selection data 150.

That is, the facility genre names NM of a number of NC(k) are read out from the facility genre list data 160, and a genre list is displayed on the display 33, as shown in FIG. 71 (step TI2). Thereafter, when the determination key is depressed, the location of the mouse cursor 206 as displayed on the picture 200 is obtained (step TI3) and the genre displayed at that position is selected (step TI4). The facility data pertaining to the specified genre are read as the facility list data 170. The street names SSN only included in the facility list data 170 are listed (step TI5).

The street name data SSN or the street address data SA may be stored for each of the facility genre data or the facility data in the facility genre list data 160 of FIG. 57 or in the facility list data 170 of FIG. 59. In this case, the street name data SSN are the name data of the facility genres or of the streets close to the facilities. The street address data SA represent addresses where the data related to the facility genres or related to the streets close to the facilities are stored. The street name data SSN are listed, or the street name data SSN identified relying upon the street address data SA are listed (steps TI5, TI6).

A list of street names that are listed is displayed on the display 33 (step TI6). When the determination key is depressed, a position of the mouse cursor 206 on the picture 200 is obtained (step TI7) and the street at that position is selected (step TI8).

A plurality of facilities pertaining to the same genre may often exist along a street. Therefore, when a street is selected at step TI8, the names IM of the facilities having the same street name are picked from the facility list data 170 (step TI9).

Then, a list formed at step TI9 is displayed on the display 33 (step TI10). Instead of this list, the facilities listed at step TI9 may be displayed. That is, a figure of the street is shown on the display 33. Along the street, the facilities picked at step TI9 are displayed on the display 33 as symbols together with their names. Thus, the positions of the facilities on the map are easily recognized.

When the determination key is depressed after the list of facilities is displayed at step TI10, a position where the mouse cursor 206 is displayed is obtained (step TI11) and a facility is selected. Here, based upon the selected facility name, the east longitude coordinate IEO and the north latitude coordinate INO in the facility list data 170 are registered as registered destination data TP (step TI2). Thereafter, the processing is returned to the main flow of FIG. 9 (step TI13).

According to this embodiment, a particular area is first specified by a postal code number PCN. Then, a genre of the specified area is shown on the display 33. Then, the street names of the facilities in the specified genre are displayed. The facility is selected based upon the street name. When a destination is to be set, therefore, the searching can be conducted in the order of areas, genres and streets, so that the destination is more quickly identified on the map.

33. Modified Embodiment

The invention is not limited to the above-mentioned embodiments only but can be modified in a variety of ways without departing from the spirit and scope of the invention. For example, in selecting a street at step TE4, in FIG. 64, the list of streets was displayed on the display 33, as shown in FIG. 70. However, it may be done as follows. That is, the area is displayed on the display 33, as shown in FIG. 72, and the street names are displayed together on the picture. When a given geographical coordinate on the displayed area is selected by the mouse cursor 206, an expanded area is readily displayed with the selected portion as a center. In this case, facilities within a range that can be displayed on the display 33 are also displayed. Therefore, the operator is allowed to search for facilities along a particular street in a particular area while looking at a map.

In the above-mentioned embodiments, the area was specified by a postal code number PCN. The postal code number PCN, however, may be replaced by a telephone number or by some significant digits of the telephone number. That is, the area may be specified by a toll (area code) number only or by a toll number and significant digits of a telephone number excluding the toll number. Further, only significant digits of the postal code number PCN may be input or the whole postal code number PCN may be used.

After step TD3 or TD4, the routine may go to one of steps TE1, TF1, TG1, TH1 or TI1. Then, a list or figures of the streets in the displayed area, or a list or positions of the facilities are displayed and/or are output by voice. The processing of the step TD3 may be executed at step TE2, TG2, TH2 or TI6, or the processing of the step TD4 may be executed in its place or in combination at steps TF6, TH6, TG10 or TI10. Then, figures of streets in the specified area or positions of facilities in the specified area are displayed. The order of step TF9 and step TF8 may be replaced.

The selection processing at steps TB3, TD5, TE3, TF3, TF7, TG3, TG7, TG11, TH3, TH7, TI3, TI7 and TI11 may be executed based on voice input by the operator. In this case, a desired item is selected from a list that is displayed and/or output by voice, and this item is pronounced by the operator.

In the above-mentioned embodiments, the destination or the drop-in place is searched for based upon a postal code number PCN prior to the route search processing (step 52). However, the processing for searching the destination or the drop-on place may be executed during the guide/display processing at step 53. That is, a new drop-in place or a destination is set by interruption on the guide route. However, these operations are executed when the car is halting. Thus, the destination or the drop-in place can be easily changed.

The RAM 4 may be a dynamic RAM, a static RAM or a readable/writable RAM, such as memory card or the like. The present position detector device 20 may not be provided with one or two of the GPS receiver unit 25, beacon receiver 26 and data receiver unit 27. Moreover, the printer 35 may not be provided.

The data store medium 37 can be used with a computer installed in a room, a portable computer, or any other computer. Thus, the aforementioned navigation processing can be executed in a place other than in the car. For instance, a map can be displayed, motion can be simulated from the present position to the destination, and distance can be calculated among all points along the roads on the map. The portable navigation device can also be carried for performing outdoor activities, such as cycling, traveling, mountain climbing, hiking, fishing, etc.

The program and/or the data may be sent (transmitted) to the flash memory 3 from an external system via the data transmitter/receiver unit 27. The external system is a system for feeding the present position data or a data processing center of ATIS (Advanced Traffic Information Service). The external system is installed remote from the navigation device. The program is sent to the navigation device and is designated so as to be installed (transferred/copied) in the flash memory 3.

The aforementioned route search processing (step 52), search-again processing (step 72), start point of guide route processing (step 64), end point of guide route determining processing (step 66), search area setting processing (step 224), and search area change processing (step 232) may be executed by the above-mentioned external system. The processed results and map data are sent (transmitted) to the navigation device from the external system. Based upon the processed results and map data that are received, the navigation device displays road data and the guide route. In this case, the road data, map data, facility data and traffic jam data are processed and controlled at one time by the external system, making it possible to search a route and to set points in an optimum manner.

The program is automatically executed when the data storage medium 37 is set to the navigation device, or when the power source circuit of the navigation device is closed, or on instruction by the operator. The program and the data are not stored in the RAM 4 in a nonvolatile manner and, hence, the installation is executed every time when the power source circuit is closed. When the data can be read at high speeds from the data storage medium 37, the CPU 2 may directly read the program from the data storage medium 37. The flash memory 3 may be a battery backed-up RAM, an IC memory card or an EPROM.

The invention can be further adapted as a navigation device for a man only to move and as a navigation device for vehicles other than the car, that is, for ships and for aircraft. Besides the map used for the navigation device can be a sea chart or a submarine map.

What is claimed is:

1. A navigation device for a vehicle, comprising:
   means for storing a plurality of road data including guided road data;
   means for detecting a present position;
   means for setting a destination;
   means for setting a first guide route to the set destination from the stored guided road data;
   means for outputting the first guide route and the detected present position;
   means for determining whether the present position deviates from the first guide route;
   means for determining whether the present position exists on any stored guided road when the present position deviates from the first guide route; and
   means for setting a second guide route to the set destination from a point on the guided road closest to the present position when the present position does not exist on the guided road from the stored guided road data.

2. The navigation device for a vehicle according to claim 1, further comprising:
   means for determining which guide route is advantageous between the second guide route and the first guide route;
   means for selecting either the first guide route or the second guide route as a new guide route;
   means for calculating a distance from the present position to a start point of the new guide route; and
   means for outputting the calculated distance.

3. The navigation device for a vehicle according to claim 2, wherein the calculated distance is one of a straight distance between the present position and a start point of the new guide route and a traveling distance between the present position and the start point of the new guide route.

4. The navigation device for a vehicle according to claim 1, further comprising:
   means for detecting a direction of movement in connection with the present position;
   means for setting a search area according to the detected direction of movement when the present position does not exist on the guide road;
   means for searching a point on the guide road closest to the present position in the set search area; and
   means for setting a route from the searched point to the set destination.

5. The navigation device for a vehicle according to claim 4, wherein the searched area is one of a predetermined area with a center point of a predetermined distance ahead of the present position and a predetermined area having a predetermined angle to the direction of movement.

6. A navigation device for a vehicle, comprising:
   means for storing position data, shape data and name data of streets in a geographic area which has telephone numbers or postal codes;
   means for inputting all or a part of the telephone numbers or postal codes;
   means for reading the name data of the streets in the area corresponding to the inputted telephone numbers or postal codes;
   means for outputting the read name data of the streets;
   means for selecting at least one of the outputted name data of the streets;
   means for reading out coordinates of at least both ends of the selected street from coordinates of the shape data of the streets;
   means for calculating a scale on the basis of the read out coordinates; and
   means for outputting information of the selected street including displaying the selected street on the calculated scale.

7. The navigation device for moving according to claim 6, wherein position data, shape data and name data of streets are stored in all geographic areas that the street extends to.

8. The navigation device for a vehicle according to claim 6, wherein selecting the name data of street/streets includes means for distinguishing selected street/streets from other output streets.

9. The navigation device for moving according to claim 6, wherein the distinguishing characteristics of the geographic area is one of at least a part of a postal code number or at least a part of a telephone number.

10. A navigation device for a vehicle, comprising:
    means for storing street name data of streets along with data related to facilities located along the streets;
    means for designating at least one street name from the street name data of streets;
    means for selectively reading the data related only to facilities located along the at least one designated street name from the data related to the facilities located along the streets;
    means for outputting the selectively read data related to the facilities located along the at least one designated street name, and
    means for displaying the selectively read data related to the facilities located along the at least one designated street name, independent of scale.

11. The navigation device for moving according to claim 10, wherein the data related to facilities are stored in every geographic area having distinguishing characteristics corresponding to at least a part of a postal code number or at least a part of a telephone number.

12. The navigation device for moving according to claim 10, wherein the navigation device outputs a list of the facilities or positions of the facilities on a map.

13. A navigation device according to claim 10, wherein the means for storing stores position data, shape data and name data of the streets in a geographic area which has telephone numbers or postal codes; and further comprising:

means for inputting all or a part of the telephone numbers or postal codes; wherein the means for reading reads the data of all the facilities located along at least one designated street name that are within the area corresponding to the input telephone numbers or postal codes.

14. A navigation device according to claim 10, wherein:

the means for selectively reading reads the data related to all facilities located along the at least one designated street name.

15. A navigation device according to claim 10, further comprising:

means for selecting a genre of facilities; and wherein the means for selectively reading reads the data of all the facilities within the selected genre located along the at least one designated street name.

16. A navigation device according to claim 10, wherein the means for displaying displays the selectively read data in the form of a list.

17. A navigation device for a vehicle, comprising:

means for storing street name data of streets based on a genre of the facilities located along the street;

means for designating a genre of the facilities;

means for selectively reading only the street name data of streets along which the designated genre of the facilities are located from the stored street name data of the streets; and means for outputting the selectively read street name data.

18. The navigation device for moving according to claim 17, wherein the name data of streets are stored in every geographic area having distinguishing characteristics corresponding to one of at least a part of a postal code number and at least part of telephone number.

19. The navigation device for moving according to claim 17, wherein the navigation device outputs a list of the streets or positions and shapes of the streets on a map.

* * * * *